(12) United States Patent
King et al.

(10) Patent No.: US 12,478,080 B2
(45) Date of Patent: *Nov. 25, 2025

(54) DIRECT-FED MICROBIALS AND METHODS OF THEIR USE

(71) Applicant: MICROBIAL DISCOVERY GROUP, LLC, Franklin, WI (US)

(72) Inventors: Michael R. King, Oak Creek, WI (US); Sona Son, Cudahy, WI (US); Nathan Robert Augspurger, Noblesville, IN (US); Joel Dean Spencer, Westfield, IN (US); Amy Lange, Greendale, WI (US); Michael D. Engelhardt, Arcadia, IN (US)

(73) Assignee: MICROBIAL DISCOVERY GROUP, LLC, Franklin, WI (US)

( * ) Notice: Subject to any disclaimer, the term of this patent is extended or adjusted under 35 U.S.C. 154(b) by 1197 days.

This patent is subject to a terminal disclaimer.

(21) Appl. No.: 17/131,000

(22) Filed: Dec. 22, 2020

(65) Prior Publication Data

US 2021/0360945 A1    Nov. 25, 2021

Related U.S. Application Data

(60) Continuation of application No. 16/454,585, filed on Jun. 27, 2019, now abandoned, which is a division of
(Continued)

(51) Int. Cl.
  *A23K 10/18*    (2016.01)
  *A23K 10/16*    (2016.01)
  (Continued)

(52) U.S. Cl.
  CPC .............. *A23K 10/18* (2016.05); *A23K 10/16* (2016.05); *A23K 50/10* (2016.05); *A23K 50/20* (2016.05);
  (Continued)

(58) Field of Classification Search
  CPC ........ A23K 10/18; A23K 10/16; A23K 50/10; A23K 50/20; A23K 50/30; A23K 50/60; A23K 50/75; A23K 50/80; A23K 20/00
  See application file for complete search history.

(56) References Cited

U.S. PATENT DOCUMENTS

4,673,638 A    6/1987  Grosch
5,587,475 A   12/1996  Helquist
(Continued)

FOREIGN PATENT DOCUMENTS

CN    101159102 A    4/2008
CN    103980535 A    8/2014
(Continued)

OTHER PUBLICATIONS

Abutarbush et al. (2004). Jejunal hemorrhage syndrome in 2 Canadian beef cows. Can. Vet. J. 45, 48-50.
(Continued)

*Primary Examiner* — Emily M Le
*Assistant Examiner* — Carrie Glimm
(74) *Attorney, Agent, or Firm* — Barnes & Thornburg LLP

(57) ABSTRACT

The present invention is directed to direct-fed microbials for use in improving the performance of an animal, improving the health of an animal, improving the environment of an animal, and combinations thereof. More particularly, the invention relates to isolated *Bacillus* strains 86 and 300, and strains having all of the identifying characteristics of these strains, for uses comprising the above-mentioned uses.

17 Claims, 15 Drawing Sheets

Related U.S. Application Data application No. 15/310,545, filed as application No. PCT/US2015/030578 on May 13, 2015, now Pat. No. 10,357,046.

(60) Provisional application No. 62/078,665, filed on Nov. 12, 2014, provisional application No. 61/992,607, filed on May 13, 2014.

(51) Int. Cl.
| | |
|---|---|
| A23K 50/10 | (2016.01) |
| A23K 50/20 | (2016.01) |
| A23K 50/30 | (2016.01) |
| A23K 50/60 | (2016.01) |
| A23K 50/75 | (2016.01) |
| A23K 50/80 | (2016.01) |

(52) U.S. Cl.
CPC .............. *A23K 50/30* (2016.05); *A23K 50/60* (2016.05); *A23K 50/75* (2016.05); *A23K 50/80* (2016.05)

(56) References Cited

U.S. PATENT DOCUMENTS

| | | |
|---|---|---|
| 7,807,185 B2 | 10/2010 | Farmer |
| 8,025,874 B2 | 9/2011 | Bellot |
| 8,540,981 B1 | 9/2013 | Wehnes |
| 2005/0255092 A1 | 11/2005 | Rehberger |
| 2006/0188978 A1 | 8/2006 | Grant |
| 2009/0280090 A1 | 11/2009 | Rehberger |
| 2010/0010080 A1 | 1/2010 | Mockett |
| 2010/0062021 A1 | 3/2010 | Winkelman |
| 2010/0092428 A1 | 4/2010 | Schmidt |
| 2013/0064927 A1* | 3/2013 | Davis ..................... A61K 35/74 435/252.5 |
| 2013/0136695 A1 | 5/2013 | Hargis |
| 2013/0295067 A1 | 11/2013 | Baltzley |
| 2015/0079058 A1 | 3/2015 | Nielsen |
| 2015/0111214 A1 | 4/2015 | Liu |
| 2015/0216203 A1 | 8/2015 | Isaksen |
| 2015/0216916 A1 | 8/2015 | Galbraith |
| 2017/0246224 A1 | 8/2017 | King |
| 2017/0327840 A1 | 11/2017 | Kijlstra |
| 2019/0021341 A1 | 1/2019 | Davis |

FOREIGN PATENT DOCUMENTS

| | | |
|---|---|---|
| GB | 1434582 A | 5/1976 |
| WO | 2014067081 A1 | 5/2014 |
| WO | 2015160960 A1 | 10/2015 |
| WO | 2018148847 A1 | 8/2018 |

OTHER PUBLICATIONS

Abutarbush et al. (2005). Jejunal hemorrhage syndrome in dairy and beef cattle: 11 cases (2001 to 2003). Can. Vet. J. Rev. Vét. Can. 46, 711-715.

Adaska et al. (2014). Jejunal hematoma in cattle: a retrospective case analysis. J. Vet. Diagn. Investig. Off. Publ. Am. Assoc. Vet Lab Diagn. Inc 26, 96-103.

Albini et al. (2010). Real-time multiplex PCR assays for reliable detection of Clostridium perfringens toxin genes in animal isolates, Veterinary Microbiology, 127 (1-2): 179-185.

Bae H.D., Yanke L.J, Cheng K.J., Selinger L.B., 1999, "A novel staining method for detecting phytase activity," Journal of Microbiological Methods, 39:1, 17-22.

Baines et al. (2011). Mouldy feed, mycotoxins and Shiga toxin—producing *Escherichia coli* colonization associated with Jejunal Hemorrhage Syndrome in beef cattle. BMC Vet. Res. 7, 24.

Canning et al., "Effect of direct-fed microbial Bacillus subtilis C-3102 on enteric health in nursery pigs after challenge with porcine epidemic diarrhea virus", Journal of Swine Health and Production, (May 3, 2017), vol. 25, No. 3, pp. 129-137, XP055741106.

Ceci, L., Paradies, P., Sasanelli, M., De Caprariis, D., Guarda, F., Capucchio, M. t., and Carelli, G. (2006). Haemorrhagic Bowel Syndrome in Dairy Cattle: Possible Role of Clostridium perfringens Type A in the Disease Complex. J. Vet. Med. Ser. A 53, 518-523.

Credille et al. (2014). Prevalence of bacteremia in dairy cattle with acute puerperal metritis. J Vet Intern Med, 28:1606-1612.

Dennison et al. (2002). Hemorrhagic bowel syndrome in dairy cattle: 22 cases (1997-2000). J. Am. Vet. Med. Assoc. 221, 686-689.

Dennison et al. (2005). Comparison of the odds of isolation, genotypes, and in vivo production of major toxins by Clostridium perfringens obtained from the gastrointestinal tract of dairy cows with hemorrhagic bowel syndrome or left-displaced abomasum. J. Am. Vet. Med. Assoc. 227, 132-138.

Extended European Search Report, European Application No. 15792802.9-1358 dated Nov. 8, 2017, 8 pages.

Fei et al. "A laboratory landfill simulator for physical, geotechnical, chemical and microbial characterization of solid waste biodegradation processes," Coupled Phenomena in Environmental Geotechnics, May 30, 2013 (May 30, 2013), Taylor & Francis Group, London, pp. 321-327.

Frydendahl et al. (2001). Automated 5' nuclease assay for detection of virulence factors in porcine *Escherichia coli*. Molec.Cell. Probes. 15: 151-160.

Harnentis et al. "Isolation, Characterization and Production of Mannanase from Thermophilic Bacteria to Increase the Feed Quality," Pakistan Journal of Nutrition 12 (4): 360-364, 2013.

International search report and written opinion for PCT/US2017/019941, dated May 26, 2017.

International Search Report and Written Opinion for PCT/US2018/058948, dated Jan. 18, 2019, 8 pages.

Jinneman et al. (2003). Multiplex Real-Time PCR Method To Identify Shiga Toxin Genes stx1 and stx2 and *Escherichia coli* O157:H7/H-Serotype. Appl. Environ. Microbiol. Oct. 2003 vol. 69 No. 10 6327-6333.

Johnson et al. (2012). A MIQE-Compliant Real-Time PCR Assay for Aspergillus Detection., PLOSone., 7(7): 1-8.

Karigar et al., "Role of Microbial Enzymes in the Bioremediation of Pollutants: A Review," Enzyme Research, vol. 2011, Article ID 805187, 11 pages.

Kiarie et al. "The Role of Added Feed Enzymes in Promoting Gut Health in Swine and Poultry," Nutrition Research Reviews, Jun. 1, 2013 (Jun. 1, 2013), vol. 26, pp. 71-88.

La Ragione et al. "Bacillus subtilis Spores Competitively Exclude *Escherichia coli* OO8: K80 in Poultry," Veterinary Microbiology, Mar. 20, 2001 (Mar. 20, 2001) vol. 79, pp. 133-142.

Mahar et al. "Modeling and simulation of landfill gas production from pretreated MSW landfill simulator," Frontiers of Environmental Science & Engineering, Apr. 15, 2014 (Apr. 15, 2014), vol. 10, Iss. 1, pp. 159-167.

Malinen et al. (2003). Comparison of real-time PCR with SYBR Green I or 5'-nuclease assays and dot-blot hybridization with rDNA-targeted oligonucleotide probes in quantification of selected faecal bacteria. Microbiology. 149: 269-277.

Miller et al. "Sanitary Landfill Simulation: Test Parameters and Simulator Conceptual Design," Naval Facilities Engineering Command: Civil Engineering Laboratory, Oct. 20, 1976 (Oct. 20, 1976), pp. 1-47.

Nielsen et al. (2003). Detection and characterization of verocytotoxin-producing *Escherichia coli* by automated 5 nuclease PCR assay, Journal of ClinicalMicrobiology, vol. 41, No. 7, pp. 2884 2893.

PCT Search Report and Written Opinion for PCT/US2015/030578, completed Jul. 9, 2015.

Peng et al., "Evaluation of antiviral activity of Bacillus licheniformis-fermented products against porcine epidemic diarrhea virus", AMB Express, (Dec. 3, 2019), vol. 9, No. 191, pp. 1-11, XP055852461.

Ramachandran et al., "A Broad-Spectrum Antimicrobial Activity of Bacillus subtilis RLID 12.1," 2014.

Schmidt et al., "New Concepts of microbial treatment processes for the nitrogen removal in wastewater," 2003.

(56) References Cited

OTHER PUBLICATIONS

Sheldon et al. (2009). Defining postpartum uterine disease and the mechanisms of infection and immunity in the female reproductive tract in cattle. Biol Reprod 81:1025-1032.
Souza et al. J. Anim. Sci. vol. 90, Suppl. 3/J. Dairy Sci. vol. 95, Suppl. 2 T281.
West et al. (2007) Rapid Detection of *Escherichia coli* Virulence Factor Genes using Multiplex Real-Time TaqMan® PCR Assays. Veterinary Microbiology 122(3-4): 323-331.
Yatsuyanagi et al. (2002). Characterization of enteropathogenic and enteroaggregative *Escherichia coli* isolated from diarrheal outbreaks, Journal of Clinical Microbiology, vol. 40, No. 1, pp. 294-297.

* cited by examiner

Growth performance of finishing pigs fed various DFM strain combinations

| Protocol | Treatment | Dose (cfu/g) | Live performance ||||| Performance change (%) |||
|---|---|---|---|---|---|---|---|---|---|---|
| | | | Start wt (lbs) | End wt (lbs) | ADG (lbs) | ADFI (lbs) | F/G (lb/lb) | ADG | ADFI | F/G |
| 12-F085 | 1. Control | — | 195.0 | 271.1 | 2.70 | 7.04 | 2.62 | — | — | — |
| | 2. Bs 86 | 7.35E+04 | 197.6 | 275.1 | 2.84 | 7.64 | 2.70 | 5.2 | 8.5 | 3.1 |
| | 3. Bs 86+552 | 7.35E+04 | 195.9 | 272.7 | 2.76 | 7.31 | 2.66 | 2.2 | 3.8 | 1.5 |
| | 4. Bs 300+552 | 7.35E+04 | 197.3 | 274.0 | 2.80 | 7.62 | 2.73 | 3.7 | 8.2 | 4.2 |
| | 5. Bs 86+300+552 | 7.35E+04 | 195.7 | 274.1 | 2.80 | 7.45 | 2.68 | 3.7 | 5.8 | 2.3 |
| | SEM | | 5.3 | 2.6 | 0.10 | 0.21 | 0.07 | | | |
| | Trt P-value | | 0.265 | 0.862 | 0.862 | 0.295 | 0.842 | | | |
| 13-F019 | 1. Control | — | 198.8 | 263.4 | 2.49 | 7.71 | 3.13 | — | — | — |
| | 2. Bs 86 | 7.35E+04 | 198.7 | 263.6 | 2.49 | 7.86 | 3.17 | 0.0 | 1.9 | 1.3 |
| | 3. Bs 86+300+552 | 7.35E+04 | 199.3 | 262.3 | 2.43 | 7.77 | 3.25 | (2.4) | 0.8 | 3.8 |
| | SEM | | 2.3 | 2.9 | 0.07 | 0.21 | 0.06 | | | |
| | Trt P-value | | 0.132 | 0.825 | 0.711 | 0.732 | 0.362 | | | |
| 13-F040 | 1. Control | — | 231.7 | 285.5 | 1.72 | 6.42 | 3.74 | — | — | — |
| | 2. Bs 86 | 7.35E+04 | 232.2 | 286.6 | 1.80 | 6.50 | 3.64 | 4.7 | 1.2 | (2.7) |
| | 3. Bs 86+300+552 | 7.35E+04 | 232.8 | 287.7 | 1.73 | 6.48 | 3.74 | 0.6 | 0.9 | 0.0 |
| | SEM | | 1.1 | 1.7 | 0.05 | 0.09 | 0.07 | | | |
| | Trt P-value | | 0.295 | 0.409 | 0.117 | 0.612 | 0.227 | | | |
| 13-F071 | 1. Control | — | 170.9 | 276.2 | 1.81 | 5.46 | 3.03 | — | — | — |
| | 2. Control + 3% fat | — | 170.6 | 279.9 | 1.89 | 5.44 | 2.88 | 4.4 | (0.4) | (5.0) |
| | 3. Bs 86 | 7.35E+04 | 170.8 | 277.0 | 1.83 | 5.49 | 3.01 | 1.1 | 0.5 | (0.7) |
| | 4. Bs 86+300+552 | 7.35E+04 | 171.5 | 277.7 | 1.81 | 5.53 | 3.05 | 0.0 | 1.3 | 0.7 |
| | SEM | | 1.3 | 1.3 | 0.02 | 0.05 | 0.03 | | | |
| | Trt P-value | | 0.445 | 0.088 | 0.002 | 0.52 | <0.001 | | | |
| 13-F072 | 1. Control | — | 208.8 | 274.9 | 1.72 | 5.64 | 3.28 | — | — | — |
| | 2. Bs 86 | 7.35E+04 | 209.6 | 276.7 | 1.76 | 5.72 | 3.26 | 2.3 | 1.4 | (0.6) |
| | 3. Bs 86+300 | 7.35E+04 | 210.5 | 277.8 | 1.78 | 5.82 | 3.28 | 3.5 | 3.2 | 0.0 |
| | 4. Bs 86+300+552 | 7.35E+04 | 209.6 | 274.8 | 1.73 | 5.71 | 3.30 | 0.6 | 1.2 | 0.6 |
| | SEM | | 2.9 | 1.9 | 0.03 | 0.07 | 0.04 | | | |
| | Trt P-value | | 0.750 | 0.372 | 0.265 | 0.212 | 0.829 | | | |

FIGURE 1

Table. Results of meta-analysis of DFM strain effect on growth performance across three commercial-type experiments[1].

| Response criteria | Treatment Control | Treatment Bs 86 | Treatment 3-strain | Pooled SEM | P-value[2] Trt | P-value[2] Bs86 | Covariable P-value StWt | Covariable P-value DOF |
|---|---|---|---|---|---|---|---|---|
| Live weights, lbs | | | | | | | | |
| Start | 204.3 | 204.6 | 204.9 | 9.2 | 0.573 | 0.544 | — | < 0.001 |
| End | 272.0 | 273.9 | 272.2 | 15.5 | 0.025 | 0.015 | < 0.001 | 0.011 |
| ADG, lbs | 1.75 | 1.80 | 1.76 | 0.02 | 0.053 | 0.018 | 0.263 | 0.458 |
| ADFI, lbs | 5.85 | 5.91 | 5.92 | 0.15 | 0.318 | 0.201 | 0.004 | 0.806 |
| F/G, lb/lb | 3.36 | 3.31 | 3.36 | 0.07 | 0.089 | 0.057 | < 0.001 | 0.103 |
| Carcass | | | | | | | | |
| Wt., lbs | 207.6 | 208.0 | 207.5 | 0.6 | 0.759 | 0.545 | < 0.001 | < 0.001 |
| ADG, lbs | 1.30 | 1.31 | 1.31 | 0.02 | 0.819 | 0.558 | 0.224 | 0.603 |
| F/G, lb/lb | 4.53 | 4.53 | 4.53 | 0.13 | 0.998 | 0.969 | 0.003 | 0.395 |
| Yield, % | 75.4 | 75.3 | 75.3 | 0.3 | 0.786 | 0.541 | 0.698 | 0.486 |
| Feed cost, $/lb gain | | | | | | | | |
| Live | 0.4875 | 0.4635 | 0.4815 | 0.0278 | 0.055 | 0.021 | 0.471 | 0.542 |
| Carcass | 0.6535 | 0.6319 | 0.6437 | 0.0444 | 0.320 | 0.133 | 0.978 | 0.941 |
| Carcass (adj to 75.4% yield)[3] | | | | | | | | |
| Wt., lbs | 207.2 | 208.0 | 207.7 | 1.2 | 0.460 | 0.215 | < 0.001 | < 0.001 |
| ADG, lbs | 1.30 | 1.32 | 1.31 | 0.03 | 0.559 | 0.282 | 0.584 | 0.834 |
| F/G, lb/lb | 4.53 | 4.51 | 4.55 | 0.05 | 0.692 | 0.650 | < 0.001 | 0.426 |

[1] Data are means from three experiments combined from which all three listed treatments appeared.
[2] Data were analyzed as a randomized complete-block design, including the main effect of treatment, random effects of experiment and replicate within experiment, and covariables start wt and days on feed.
[3] Since yield (carcass wt as a % of live weight at plant) was not different amongst the treatments, the grand mean yield (75.4%) was used to re-calculated carcass wt and carcass growth performance.

FIGURE 2

|  | 86 | 300 |
|---|---|---|
| E. coli K12 | Y | Y |
| E. coli 545 | Y | Y |
| E. coli 623 | Y | Y |
| E. coli 624 | Y | Y |
| S. pullorum | Y | Y |
| S. enterica 297 | Y | Y |
| S. enterica 299 | Y | Y |
| V. harveyii | Y | Y |
| V. campbelli | Y | Y |
| S. epidermidis | Y | Y |
| E. saccharolyticus | Y | Y |
| C. perfringens ATCC | Y | Y |
| C. perfringens 6481 | Y | Y |
| C. perfringens 3334 | N | N |
| C. difficile | Y | Y |
| C. jejuni | Y | Y |

FIGURE 4B

| Antibiotic |  |  | # 86 | # 300 |
|---|---|---|---|---|
| AMPICILLIN | Concentration | ug/ml | 12 | 1.5 |
| CHLORAMPHENICOL | Concentration | ug/ml | 6 | 12 |
| CIPROFLOXACIN | Concentration | ug/ml | .25 | .094 |
| CLINDAMYCIN | Concentration | ug/ml | 2 | 64 |
| ERYTHROMYCIN | Concentration | ug/ml | .25 | .75 |
| LEVOFLOXACIN | Concentration | ug/ml | .125 | .064 |
| RIFAMPICIN | Concentration | ug/ml | 2 | .25 |
| TETRACYCLINE | Concentration | ug/ml | 6 | .125 |
| TRIM/SULFA | Concentration | ug/ml | .064 | .047 |
| TRIMETHOPRIM | Concentration | ug/ml | .125 | .19 |
| VANCOMYCIN | Concentration | ug/ml | .50 | .25 |
| DAPTOMYCIN | Concentration | ug/ml | .016 | 1.5 |

FIGURE 5

| Antibiotic Susceptibility and Resistance Screening | | | |
|---|---|---|---|
| | # | 86 | 300 |
| Control | (TSA) | + | + |
| | 1x | - | - |
| CTC/Denagard (400+35g/ton) | 1/10x | + | + |
| | 1/100x | + | + |
| | 1x | + | + |
| BMD (30g/ton) | 1/10x | + | + |
| | 1/100x | + | + |
| | 1x | - | - |
| Stafac (10g/ton) | 1/10x | + | + |
| | 1/100x | + | + |
| | 1x | - | - |
| Tylan (20g/ton) | 1/10x | - | - |
| | 1/100x | - | - |
| | 2x | - | - |
| Pulmotil 18(181g/ton) | 1x | - | - |
| | 1/10x | - | - |
| | 1/100x | - | - |

Antibiotic legend:
-   No growth
+   Good growth beyond the size of the dot

FIGURE 6

86 and 300 Strain CFU growth on DDGS

| Name | Strain # | ~CFU(10^*) |
|---|---|---|
| 3166BE 14 | 86 | 1e10⁸ |
| 3843PJ 10 | 300 | 1e10⁴ |

DIRECT-FED MICROBIALS AND METHODS OF THEIR USE

CROSS-REFERENCE TO RELATED APPLICATIONS

This application is a Continuation Application of U.S. patent application Ser. No. 16/454,585, filed Jun. 27, 2019, which is a Divisional Application of U.S. patent application Ser. No. 15/310,545, filed Nov. 11, 2016, which is a U.S. National Stage Entry Application filed under 35 U.S.C. § 371 (b) of International Application Serial No. PCT/US2015/030578, filed May 13, 2015, which claims priority under 35 U.S.C. § 119 (e) to U.S. Provisional Application Ser. No. 61/992,607, filed May 13, 2014 and U.S. Provisional Application Ser. No. 62/078,665, filed Nov. 12, 2014, all of which are incorporated herein by reference in their entirety.

FIELD OF THE DISCLOSURE

The invention relates to direct-fed microbials for use in improving the performance of an animal, improving the health of an animal, improving the environment of an animal, and combinations thereof. More particularly, the invention relates to isolated *Bacillus* strains 86 and 300, and strains having all of the identifying characteristics of these strains, for uses comprising the above-mentioned uses.

BACKGROUND AND SUMMARY OF THE INVENTION

The present invention relates to direct-fed microbial (DFM) compositions and methods for improving the performance of an animal, improving the health of an animal, improving the environment of an animal, and combinations thereof. These improvements enhance commercial value of animal populations.

An animal's gastrointestinal tract is constantly challenged by large numbers of bacteria, viruses, and protozoa found in feed, bedding, and the environment. The gastrointestinal tract has a sophisticated system to counter these potential pathogens consisting of physical, chemical, and immunological lines of defense. Beneficial bacteria are an important part of this system. Pathogens, stress, metabolic upset, the use of antimicrobials, and other causes can upset the balance of intestinal bacteria, which may impair digestion and make the animal more susceptible to disease. Thus, providing the animal with bacteria that assist in establishment (or reestablishment) of a normal bacterial profile can help maintain optimal animal performance.

Direct-fed microbial products are products that contain live (viable) microorganisms (e.g., bacteria). Over time, many of the direct-fed microbial products previously considered useful for improving animal performance, either directly via feed conversion improvements or indirectly via environmental improvements, have lost overall efficacy. The change in efficacy may be associated with the increased use of dried distillers grain solubles (DDGS), or similar feed components, in the diets of animals. The use of DDGS in the diets of animals also affects manure waste pit systems. DDGS, along with any feed component that is high in nitrogen, lipids, and fiber, is difficult for the animal to digest and is often released into the manure pit, affecting manure handling, storage, and decomposition. Feeding animals high levels of DDGS, or other high fiber and/or lipid-containing diets, results in increased solids accumulation, as well as increased ammonia, methane, phosphine, and hydrogen sulfide gas in manure pits. Currently, commercially available products do not appear to help control the negative environmental effects associated with DDGS, or other high fiber and/or lipid-containing diets (e.g., corn-soy diets, and the like). Thus, direct-fed microbial strains are needed that work both in the animal and in the manure waste pit system. Microbial strains are also needed that will improve animal performance, including average daily feed intake, average daily gain, and feed conversion, which have been reduced in DDGS-fed animals.

Applicants have developed a direct-fed microbial composition that results in increased average daily gain, increased average daily feed intake, and improved feed conversion in an animal, improved metabolizable energy due to breakdown of difficult to digest feed components in the diet (e.g., DDGS), reduced negative environmental effects on animals due to ammonia volatilization, reduced disease concerns from animal pathogens (e.g., *E. coli*, *Salmonella*, and Clostridia), improved manure nitrogen value due to reduction in $NH_3$ ammonia volatilization, reduced disease spreading and nuisance manure pit foaming, and reduced explosive gases (e.g., methane, hydrogen, phosphine) in barns due to reduction in long chain fatty acid-containing foams. The direct-fed microbial compositions described herein offer a commercial benefit by providing all of these properties, or a combination thereof, in a single direct-fed microbial composition. In addition, the direct-fed microbial compositions described herein result in a reduction in the use of antibiotics, and an increase in feed efficiency, which reduces the overall cost of animal feed.

Methods and compositions are provided for improving the performance of an animal, improving the health of the animal, improving the environment of the animal, and combinations thereof. In various embodiments, the animal can be selected from the group consisting of a poultry species, a porcine species, a bovine species, an ovine species, an equine species, and a companion animal. In the embodiment where the animal is a poultry species, the poultry species can be a broiler chicken. In the embodiment where the animal is a porcine species, the porcine species can be selected from the group consisting of a grow finish pig, a nursery pig, a sow, and a breeding stock pig.

In various embodiments, the compositions for use in the methods described herein can be a commercial package, a feed additive for an animal feed composition, an additive for the drinking water of an animal, or an animal feed composition (e.g., a complete feed), each comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof.

In one embodiment of the methods described herein, a method is provided of feeding an animal. The method comprises the step of administering to the animal a feed composition or drinking water comprising an effective amount of an additive comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof, wherein the *Bacillus* strain causes an effect selected from the group consisting of improving the performance of the animal, improving the health of the animal, improving the environment of the animal, and combinations thereof.

In another embodiment of the methods described herein, a method is provided of controlling detrimental environmental effects of manure. The method comprises the steps of administering to an animal a feed composition or drinking water comprising an effective amount of an additive comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof, and controlling the detrimental environmental effects of the manure.

In yet another illustrative embodiment of the methods described herein, a method is provided of controlling detrimental environmental effects of manure. The method comprises the step of applying to manure, litter, a pit, or a manure pond a composition comprising an effective amount of an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof, and controlling the detrimental environmental effects of the manure.

The following clauses, and combinations thereof, provide various additional illustrative aspects of the invention described herein. The various embodiments described in any other section of this patent application, including the section titled "DETAILED DESCRIPTION OF ILLUSTRATIVE EMBODIMENTS" and the EXAMPLES are applicable to any of the following embodiments of the invention described in the numbered clauses below.

1. A method of feeding an animal, the method comprising the step of administering to the animal a feed composition or drinking water comprising an effective amount of an additive comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof, wherein the *Bacillus* strain causes an effect selected from the group consisting of improving the performance of the animal, improving the health of the animal, improving the environment of the animal, and combinations thereof.

2. The method of clause 1 wherein the animal is selected from the group consisting of a poultry species, a porcine species, a bovine species, an ovine species, an equine species, and a companion animal.

3. The method of clause 2 wherein the poultry species is a broiler chicken.

4. The method of clause 3 wherein the effect is improving the performance of the animal.

5. The method of clause 4 wherein the improvement in animal performance is selected from the group consisting of decreasing feed conversion, increasing average daily feed intake, increasing average daily gain, improving consistency of performance, and combinations thereof.

6. The method of clause 4 wherein the improvement in animal performance is increased breast meat weight.

7. The method of clause 4 wherein the improvement in animal performance is increased breast meat yield as a percent of live weight.

8. The method of clause 2 wherein the porcine species is selected from the group consisting of a grow finish pig, a nursery pig, a sow, and a breeding stock pig.

9. The method of any one of clauses 1 to 8 wherein the effect is improving the performance of the animal.

10. The method of clause 9 wherein the improvement in animal performance is selected from the group consisting of decreasing feed conversion, increasing average daily feed intake, increasing average daily gain, improving consistency of performance, and combinations thereof.

11. The method of clause 9 wherein the improvement in animal performance is selected from the group consisting of improving digestibility of a diet, improving the metabolizable energy to gross energy ratio, and combinations thereof.

12. The method of any one of clauses 1 to 11 wherein the *Bacillus* strain produces an enzyme selected from the group consisting of an α-galactosidase, a protease, a lipase, an amylase, a xylanase, a cellulase, and combinations thereof.

13. The method of clause 1 wherein the effect is improving the health of the animal.

14. The method any one of clauses 1 to 13 wherein at least one of the *Bacillus* strains has antimicrobial activity.

15. The method of clause 14 wherein the antimicrobial activity is against bacteria selected from the group consisting of *E. coli, Salmonella, Staphylococcus, Enterococcus, Clostridia, Campylobacter*, and combinations thereof.

16. The method of clause 1 wherein the effect is improving the environment.

17. The method of clause 16 wherein the improvement to the environment is selected from the group consisting of reducing the pH of manure, reducing the long chain fatty acid content of manure, reducing ammonia in manure, reducing manure pit foaming, reducing explosive gases in manure, reducing ammonia volatilization, and combinations thereof.

18. The method of clause 17 wherein the reduction in ammonia in the manure causes a reduction selected from the group consisting of a reduction in ammonia toxicity in the animal and a reduction in ammonia toxicity to natural flora in the environment of the animal.

19. The method of clause 17 wherein the reduction in ammonia in the manure reduces ammonia flashing in a barn.

20. The method of clause 17 wherein the reduction in long chain fatty acid content in the manure causes a reduction in explosive gases in the manure wherein the gases are selected from the group consisting of methane gas, hydrogen gas, phosphine gas, and combinations thereof.

21. The method of clause 17 wherein the reduction in ammonia in the manure improves nitrogen value in the manure wherein the manure is used as a fertilizer.

22. The method of any one of clauses 1 to 21 further comprising the step of administering to the animal another bacterial strain selected from the group consisting of another *Bacillus* strain, a lactic acid bacterial strain, and combinations thereof.

23. The method of any one of clauses 1 to 22 wherein the strain administered is *Bacillus* strain 86 (NRRL No. B-50944) or a strain having all of the identifying characteristics of *Bacillus* strain 86 (NRRL No. B-50944).

24. The method of any one of clauses 1 to 22 wherein the strain administered is *Bacillus* strain 300 (NRRL No. B-50943) or a strain having all of the identifying characteristics of *Bacillus* strain 300 (NRRL No. B-50943).

25. The method of any one of clauses 1 to 22 wherein *Bacillus* strain 86 (NRRL No. B-50944), or a strain having all of the identifying characteristics of *Bacillus* strain 86 (NRRL No. B-50944), and *Bacillus* strain 300 (NRRL No. B-50943), or a strain having all of the identifying characteristics of *Bacillus* strain 300 (NRRL No. B-50943), are administered in combination in a single composition.

26. The method of any one of clauses 1 to 22 wherein *Bacillus* strain 86 (NRRL No. B-50944), or a strain having all of the identifying characteristics of *Bacillus* strain 86 (NRRL No. B-50944), and *Bacillus* strain 300 (NRRL No. B-50943), or a strain having all of the identifying characteristics of *Bacillus* strain 300 (NRRL No. B-50943), are administered in combination in separate compositions.

27. The method of any one of clauses 1 to 26 wherein the *Bacillus* strain is administered in the feed composition at a dose of about $1.0 \times 10^3$ CFU/gram of the feed composition to about $5.0 \times 10^{12}$ CFU/gram of the feed composition.

28. The method of any one of clauses 1 to 27 wherein the *Bacillus* strain is administered in the feed composition at a dose of about $1.0 \times 10^3$ CFU/gram of the feed composition to about $1.0 \times 10^7$ CFU/gram of the feed composition.

29. The method of any one of clauses 1 to 28 wherein the *Bacillus* strain is administered in the feed composition at a dose greater than about $7.0 \times 10^4$ CFU/gram of the feed composition.

30. The method of any one of clauses 1 to 29 wherein the *Bacillus* strain is administered in the feed composition at a dose of about $7.3 \times 10^4$ CFU/gram of the feed composition.

31. The method of any one of clauses 1 to 30 wherein the *Bacillus* strain is isolated from a high performing grow finish pig.

32. The method of any one of clauses 1 to 31 further comprising the step of administering an antibiotic to the animal wherein the antibiotic is selected from the group consisting of Denagard™, BMD™, Carbadox™, and Stafac™.

33. The method of any one of clauses 1 to 32 further comprising the step of avoiding administering to the animal an antibiotic selected from the group consisting of erythromycin, levofloxacin, trimethoprim/sulfamethoxazole, trimethoprim, daptomycin, rifampicin, Tylan™, Pulmotil™, and vancomycin.

34. The method of any one of clauses 1 to 33 further comprising the step of administering to the animal an enzyme selected from the group consisting of a galactosidase, a protease, a lipase, an amylase, a hemicellulase, an arabinoxylanase, a xylanase, a cellulase, an NSPase, a phytase, and combinations thereof.

35. The method of any one of clauses 1 to 34 wherein the microbial balance in the animal is maintained.

36. The method of clause 2 wherein the animal is a companion animal.

37. The method of clause 36 wherein the animal is a canine species or a feline species.

38. The method of clause 2 wherein the animal is a sow and the *Bacillus* strain is administered during lactation.

39. The method of clause 2 wherein the animal is a sow and the *Bacillus* strain is administered during gestation.

40. The method of any one of clauses 1 to 39 wherein the feed composition is administered daily to the animal.

41. The method of clause 1 wherein the animal is selected from the group consisting of a chicken, a pig, a horse, a pony, a cow, a turkey, a goat, a sheep, a quail, a pheasant, an ostrich, a duck, a fish, a crustacean, and combinations thereof.

42. A method of controlling detrimental environmental effects of manure, the method comprising the steps of administering to an animal a feed composition or drinking water comprising an effective amount of an additive comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof, and controlling the detrimental environmental effects of the manure.

43. The method of clause 42 wherein the animal is selected from the group consisting of a poultry species, a porcine species, a bovine species, an ovine species, and an equine species.

44. The method of clause 42 wherein the *Bacillus* strain causes an effect selected from the group consisting of reducing the pH of manure, reducing the long chain fatty acid content of manure, reducing ammonia in manure, reducing manure pit foaming, reducing explosive gases in manure, reducing ammonia volatilization, and combinations thereof.

45. The method of clause 44 wherein the reduction in ammonia in the manure reduces ammonia flashing in a barn.

46. The method of clause 44 wherein the reduction in long chain fatty acid content in the manure results in a reduction in explosive gases in the manure wherein the gases are selected from the group consisting of methane gas, hydrogen gas, phosphine gas, and combinations thereof.

47. The method of clause 44 wherein the reduction in ammonia in the manure improves nitrogen value in the manure wherein the manure is used as a fertilizer.

48. The method of any one of clauses 42 to 47 further comprising the step of administering to the animal another bacterial strain selected from the group consisting of another *Bacillus* strain, a lactic acid bacterial strain, and combinations thereof.

49. The method of any one of clauses 42 to 48 wherein the strain administered is *Bacillus* strain 86 (NRRL No. B-50944), or a strain having all of the identifying characteristics of *Bacillus* strain 86 (NRRL No. B-50944).

50. The method of any one of clauses 42 to 48 wherein the strain administered is *Bacillus* strain 300 (NRRL No. B-50943), or a strain having all of the identifying characteristics of *Bacillus* strain 300 (NRRL No. B-50943).

51. The method of any one of clauses 42 to 50 wherein the *Bacillus* strain is administered in the feed composition at a dose of about $1.0 \times 10^3$ CFU/gram of the feed composition to about $5.0 \times 10^{12}$ CFU/gram of the feed composition.

52. The method of any one of clauses 42 to 51 wherein the *Bacillus* strain is administered in the feed composition at a dose of about $1.0 \times 10^3$ CFU/gram of the feed composition to about $1.0 \times 10^7$ CFU/gram of the feed composition.

53. The method of any one of clauses 42 to 52 wherein the *Bacillus* strain is administered in the feed composition at a dose greater than about $7.0 \times 10^4$ CFU/gram of the feed composition.

54. The method of any one of clauses 42 to 53 wherein the *Bacillus* strain is administered in the feed composition at a dose of about $7.3 \times 10^4$ CFU/gram of the feed composition.

55. A method of controlling detrimental environmental effects of manure, the method comprising the step of applying to manure, litter, a pit, or a manure pond a composition comprising an effective amount of an isolated *Bacillus* strain selected from the group consisting of *Bacillus* strain 86 (NRRL No. B-50944), *Bacillus* strain 300 (NRRL No.

B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof, and controlling the detrimental environmental effects of the manure.

56. The method of clause 55 wherein the method improves the health of the animal by effects selected from the group consisting of reducing respiratory problems of the animal, improving gut health of the animal, improving consistency of performance of the animal, reducing diseases related to environmental toxicity in the animal, and reducing pathogens in the animal.

57. The method of clause 55 wherein the animal is a poultry species and the method improves the health of the animal by an effect selected from the group consisting of reducing respiratory problems of the poultry species, reducing breast blisters of the poultry species, improving consistency of performance of the poultry species, and reducing damage to the feet of the poultry species.

58. The method of clause 55 wherein the manure is in an anaerobic digester.

59. The method of clause 55 wherein the manure is in an anaerobic lagoon.

60. The method of any one of clauses 55 to 59 wherein the applying step comprises spraying or adding a powder or a pumpable liquid.

61. The method of any one of clauses 55 to 60 wherein the pit is a swine pit.

62. The method of clause 32 wherein the antibiotic is Denagard™ and the Denagard™ is administered in combination with chlortetracycline.

63. The method of clause 11 wherein the diet includes a component selected from the group consisting of dried distillers grain solubles, corn, soy, and combinations thereof.

64. A commercial package comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof.

65. A feed additive for an animal feed comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof.

66. An additive for the drinking water of an animal comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof.

67. An animal feed composition comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof.

68. The commercial package, feed additive, feed composition, or additive for the drinking water of the animal of any one of clauses 64 to 67 wherein the *Bacillus* strain causes an effect selected from the group consisting of improving the performance of the animal, improving the health of the animal, improving the environment of the animal, and combinations thereof.

69. The commercial package, feed additive, feed composition, or additive for the drinking water of the animal of any one of clauses 64 to 68, wherein the *Bacillus* strain inhibits a pathogen selected from the group consisting of *E. coli, Salmonella, Staphylococcus, Enterococcus, Campylobacter,* and *Clostridium*.

70. The feed additive or additive for the drinking water of the animal of clause 65 or 66 in the form of a concentrate.

71. The feed additive or additive for the drinking water of the animal of clause 65 or 66 in the form of a superconcentrate.

72. The feed additive, feed composition, or additive for the drinking water of the animal of any one of clauses 65 to 67 in dry form.

73. The feed composition of clause 67 in pelleted form.

74. The commercial package of clause 64 comprising the *Bacillus* strains in a form for use in treatment of a pit, a manure pond, or for use in treatment of litter.

75. The commercial package of clause 74 wherein the strains are in a form selected from the group consisting of a powder, a liquid, and a pellet form.

76. The commercial package, feed additive, additive for the drinking water of the animal, or feed composition of any one of clauses 64 to 73 further comprising a carrier for the *Bacillus* strains.

77. The commercial package, feed additive, additive for the drinking water of the animal, or feed composition of clause 76 wherein the carrier is selected from the group consisting of a bran, rice hulls, a salt, a dextrin, and combinations thereof.

78. The commercial package, feed additive, additive for the drinking water of the animal, or feed composition of any one of clauses 64 to 77 in a bag.

79. The commercial package, feed additive, additive for the drinking water of the animal, or feed composition of clause 78 wherein the bag is a plastic bag.

80. The commercial package, feed additive, additive for the drinking water of the animal, or feed composition of any one of clauses 64 to 79 further comprising instructions for use of one or more of the *Bacillus* strains.

81. The commercial package, feed additive, or additive for the drinking water of the animal of any one of clauses 78 to 80 in a 20-pound bag.

82. The commercial package, feed additive, or additive for the drinking water of the animal of any one of clauses 78 to 80 in a 50-pound bag.

83. The feed additive or additive for the drinking water of the animal of any one of clauses 65, 66, 68, 69 to 72, or 76 to 82 in powder form.

84. The feed additive or additive for the drinking water of the animal of any one of clauses 65, 66, 68 to 71, or 78 to 80 in liquid form.

85. The commercial package, feed additive, additive for the drinking water of the animal, or feed composition of any one of clauses 64 to 84 in a container for commercial use.

86. The commercial package, feed additive, additive for the drinking water of the animal, or feed composition of clause 85 wherein the container comprises plastic.

87. The commercial package, feed additive, additive for the drinking water of the animal, or feed composition of clause 85 wherein the container comprises paper.

88. The method of clause 55 wherein the *Bacillus* strain is applied to litter and reduces ammonia in the litter.

89. The method of clause 1 wherein the animal is a chicken and the improvement in health of the chicken results in an increase in the number of eggs laid by the chicken, an increase in the number of chicks born to the chicken, or an increase in the number of live chicks born to the chicken.

90. The commercial package, feed additive, additive for the drinking water of the animal, or feed composition of any one of clauses 64 to 87 further comprising a binder.

91. The commercial package, feed additive, additive for the drinking water of the animal, or feed composition of clause 90 wherein the binder is selected from the group consisting of clay, yeast cell wall components, aluminum silicate, and glucan, or combinations thereof.

BRIEF DESCRIPTION OF THE DRAWINGS

FIG. 1 shows growth performance of finishing pigs fed various DFM strain combinations, including *Bacillus* strains 86 and 300. Bs 86+552 denotes a 50:50 (1:1) mixture of Bs strains 86 and 552; Bs 300+552 denotes a 50:50 (1:1) mixture of Bs strains 300 and 552; Bs 86+300+552 denotes a 33.3:33.3:33.3 (1:1:1) mixture of Bs strains 86, 300 and 552. In 13-F072, treatment 3 (Bs 86+300) is 80% strain 86 and 20% strain 300.

FIG. 2 shows meta-analysis of DFM strains, including *Bacillus* strain 86, for three (3) experiments. Three-strain denotes a 33.3:33.3:33.3 (1:1:1) mixture of Bs strains 86, 300 and 552.

FIG. 5 shows antibiotic susceptibility of *Bacillus* strains 86 and 300.

FIG. 6 shows susceptibility and tolerance of *Bacillus* strains 86 and 300 to antibiotics.

DETAILED DESCRIPTION OF ILLUSTRATIVE EMBODIMENTS

Figure 3:
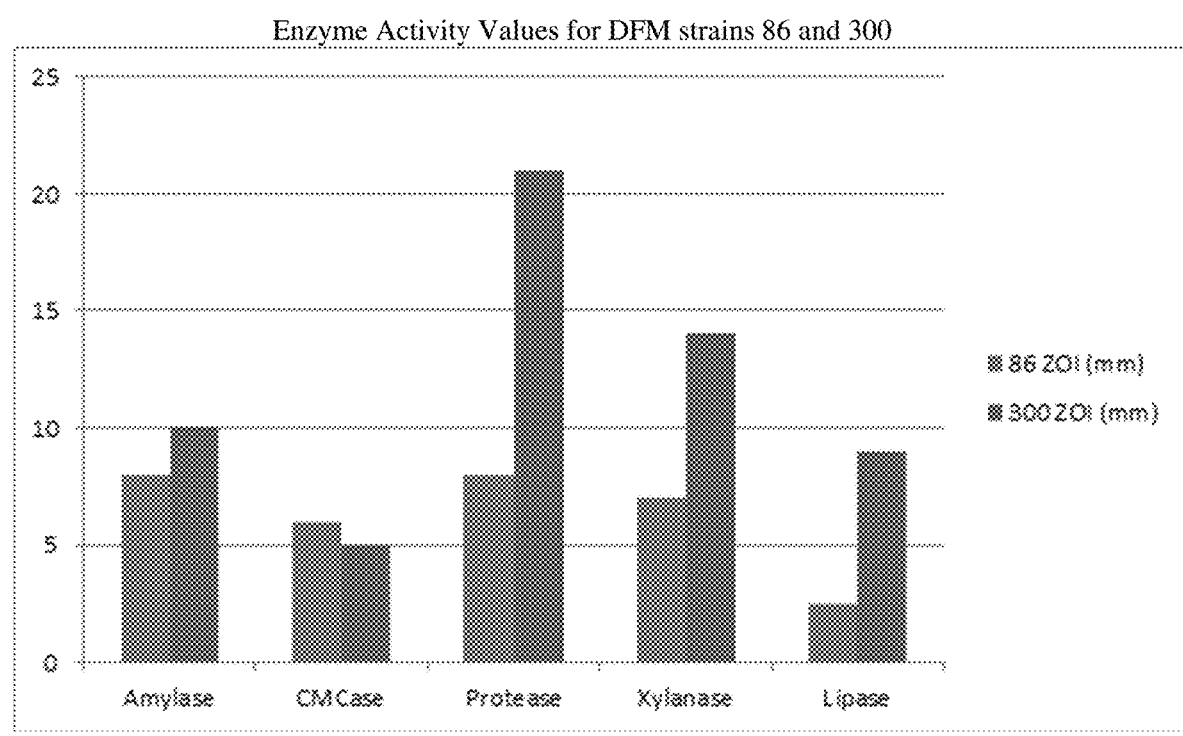
FIG. 3 shows enzymatic screening for strains 86 and 300 for amylase, CMCase, protease, xylanase, and lipase activities (strain 86 is the first bar in each set of two bars and strain 300 is the second bar).

Methods and compositions are provided for improving the performance of an animal, improving the health of the animal, improving the environment of the animal, and combinations thereof. In various embodiments, the compositions for use in the methods described herein can be a commercial package, a feed additive for an animal feed composition, an additive for the drinking water of an animal, or an animal feed composition (e.g., a complete feed), each comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof.

In one embodiment of the methods described herein, a method is provided of feeding an animal. The method comprises the step of administering to the animal a feed composition or drinking water comprising an effective amount of an additive comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof, wherein the *Bacillus* strain causes an effect selected from the group consisting of improving the performance of the animal, improving the health of the animal, improving the environment of the animal, and combinations thereof.

In another embodiment of the methods described herein, a method is provided of controlling detrimental environmental effects of manure. The method comprises the steps of administering to an animal a feed composition or drinking water comprising an effective amount of an additive comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof, and controlling the detrimental environmental effects of the manure.

In yet another illustrative embodiment of the methods described herein, a method is provided of controlling detrimental environmental effects of manure. The method comprises the step of applying to manure, litter, a pit, or a manure pond a composition comprising an effective amount of an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof, and controlling the detrimental environmental effects of the manure.

The following clauses, and combinations thereof, provide various additional illustrative aspects of the invention described herein. The various embodiments described in this section titled "DETAILED DESCRIPTION OF ILLUSTRATIVE EMBODIMENTS" are applicable to any of the following embodiments of the invention described in the numbered clauses below.

1. A method of feeding an animal, the method comprising the step of administering to the animal a feed composition or drinking water comprising an effective amount of an additive comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof, wherein the *Bacillus* strain causes an effect selected from the group consisting of improving the performance of the animal, improving the health of the animal, improving the environment of the animal, and combinations thereof.

2. The method of clause 1 wherein the animal is selected from the group consisting of a poultry species, a porcine species, a bovine species, an ovine species, an equine species, and a companion animal.

3. The method of clause 2 wherein the poultry species is a broiler chicken.

4. The method of clause 3 wherein the effect is improving the performance of the animal.

5. The method of clause 4 wherein the improvement in animal performance is selected from the group consisting of decreasing feed conversion, increasing average daily feed intake, increasing average daily gain, improving consistency of performance, and combinations thereof.

6. The method of clause 4 wherein the improvement in animal performance is increased breast meat weight.

7. The method of clause 4 wherein the improvement in animal performance is increased breast meat yield as a percent of live weight.

8. The method of clause 2 wherein the porcine species is selected from the group consisting of a grow finish pig, a nursery pig, a sow, and a breeding stock pig.

9. The method of any one of clauses 1 to 8 wherein the effect is improving the performance of the animal.

10. The method of clause 9 wherein the improvement in animal performance is selected from the group consisting of decreasing feed conversion, increasing average daily feed intake, increasing average daily gain, improving consistency of performance, and combinations thereof.

11. The method of clause 9 wherein the improvement in animal performance is selected from the group consisting of improving digestibility of a diet, improving the metabolizable energy to gross energy ratio, and combinations thereof.

12. The method of any one of clauses 1 to 11 wherein the *Bacillus* strain produces an enzyme selected from the group consisting of an α-galactosidase, a protease, a lipase, an amylase, a xylanase, a cellulase, and combinations thereof.

13. The method of clause 1 wherein the effect is improving the health of the animal.

14. The method any one of clauses 1 to 13 wherein at least one of the *Bacillus* strains has antimicrobial activity.

15. The method of clause 14 wherein the antimicrobial activity is against bacteria selected from the group consisting of *E. coli, Salmonella, Staphylococcus, Enterococcus, Clostridia, Campylobacter*, and combinations thereof.

16. The method of clause 1 wherein the effect is improving the environment.

17. The method of clause 16 wherein the improvement to the environment is selected from the group consisting of reducing the pH of manure, reducing the long chain fatty acid content of manure, reducing ammonia in manure, reducing manure pit foaming, reducing explosive gases in manure, reducing ammonia volatilization, and combinations thereof.

18. The method of clause 17 wherein the reduction in ammonia in the manure causes a reduction selected from the group consisting of a reduction in ammonia toxicity in the animal and a reduction in ammonia toxicity to natural flora in the environment of the animal.

19. The method of clause 17 wherein the reduction in ammonia in the manure reduces ammonia flashing in a barn.

20. The method of clause 17 wherein the reduction in long chain fatty acid content in the manure causes a reduction in explosive gases in the manure wherein the gases are selected from the group consisting of methane gas, hydrogen gas, phosphine gas, and combinations thereof.

21. The method of clause 17 wherein the reduction in ammonia in the manure improves nitrogen value in the manure wherein the manure is used as a fertilizer.

22. The method of any one of clauses 1 to 21 further comprising the step of administering to the animal another bacterial strain selected from the group consisting of another *Bacillus* strain, a lactic acid bacterial strain, and combinations thereof.

23. The method of any one of clauses 1 to 22 wherein the strain administered is *Bacillus* strain 86 (NRRL No. B-50944) or a strain having all of the identifying characteristics of *Bacillus* strain 86 (NRRL No. B-50944).

24. The method of any one of clauses 1 to 22 wherein the strain administered is *Bacillus* strain 300 (NRRL No. B-50943) or a strain having all of the identifying characteristics of *Bacillus* strain 300 (NRRL No. B-50943).

25. The method of any one of clauses 1 to 22 wherein *Bacillus* strain 86 (NRRL No. B-50944), or a strain having all of the identifying characteristics of *Bacillus* strain 86 (NRRL No. B-50944), and *Bacillus* strain 300 (NRRL No. B-50943), or a strain having all of the identifying characteristics of *Bacillus* strain 300 (NRRL No. B-50943), are administered in combination in a single composition.

26. The method of any one of clauses 1 to 22 wherein *Bacillus* strain 86 (NRRL No. B-50944), or a strain having all of the identifying characteristics of *Bacillus* strain 86 (NRRL No. B-50944), and *Bacillus* strain 300 (NRRL No. B-50943), or a strain having all of the identifying characteristics of *Bacillus* strain 300 (NRRL No. B-50943), are administered in combination in separate compositions.

27. The method of any one of clauses 1 to 26 wherein the *Bacillus* strain is administered in the feed composition at a dose of about $1.0\times10^3$ CFU/gram of the feed composition to about $5.0\times10^{12}$ CFU/gram of the feed composition.

28. The method of any one of clauses 1 to 27 wherein the *Bacillus* strain is administered in the feed composition at a dose of about $1.0\times10^3$ CFU/gram of the feed composition to about $1.0\times10^7$ CFU/gram of the feed composition.

29. The method of any one of clauses 1 to 28 wherein the *Bacillus* strain is administered in the feed composition at a dose greater than about $7.0\times10^4$ CFU/gram of the feed composition.

30. The method of any one of clauses 1 to 29 wherein the *Bacillus* strain is administered in the feed composition at a dose of about $7.3\times10^4$ CFU/gram of the feed composition.

31. The method of any one of clauses 1 to 30 wherein the *Bacillus* strain is isolated from a high performing grow finish pig.

32. The method of any one of clauses 1 to 31 further comprising the step of administering an antibiotic to the animal wherein the antibiotic is selected from the group consisting of Denagard™, BMD™, Carbadox™, and Stafac™.

33. The method of any one of clauses 1 to 32 further comprising the step of avoiding administering to the animal an antibiotic selected from the group consisting of erythromycin, levofloxacin, trimethoprim/sulfamethoxazole, trimethoprim, daptomycin, rifampicin, Tylan™, Pulmotil™, and vancomycin.

34. The method of any one of clauses 1 to 33 further comprising the step of administering to the animal an enzyme selected from the group consisting of a galactosidase, a protease, a lipase, an amylase, a hemicellulase, an arabinoxylanase, a xylanase, a cellulase, an NSPase, a phytase, and combinations thereof.

35. The method of any one of clauses 1 to 34 wherein the microbial balance in the animal is maintained.

36. The method of clause 2 wherein the animal is a companion animal.

37. The method of clause 36 wherein the animal is a canine species or a feline species.

38. The method of clause 2 wherein the animal is a sow and the *Bacillus* strain is administered during lactation.

39. The method of clause 2 wherein the animal is a sow and the *Bacillus* strain is administered during gestation.

40. The method of any one of clauses 1 to 39 wherein the feed composition is administered daily to the animal.

41. The method of clause 1 wherein the animal is selected from the group consisting of a chicken, a pig, a horse, a pony, a cow, a turkey, a goat, a sheep, a quail, a pheasant, an ostrich, a duck, a fish, a crustacean, and combinations thereof.

42. A method of controlling detrimental environmental effects of manure, the method comprising the steps of administering to an animal a feed composition or drinking water comprising an effective amount of an additive comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof, and controlling the detrimental environmental effects of the manure.

43. The method of clause 42 wherein the animal is selected from the group consisting of a poultry species, a porcine species, a bovine species, an ovine species, and an equine species.

44. The method of clause 42 wherein the *Bacillus* strain causes an effect selected from the group consisting of reducing the pH of manure, reducing the long chain fatty acid content of manure, reducing ammonia in manure, reducing manure pit foaming, reducing explosive gases in manure, reducing ammonia volatilization, and combinations thereof.

45. The method of clause 44 wherein the reduction in ammonia in the manure reduces ammonia flashing in a barn.

46. The method of clause 44 wherein the reduction in long chain fatty acid content in the manure results in a reduction in explosive gases in the manure wherein the gases are selected from the group consisting of methane gas, hydrogen gas, phosphine gas, and combinations thereof.

47. The method of clause 44 wherein the reduction in ammonia in the manure improves nitrogen value in the manure wherein the manure is used as a fertilizer.

48. The method of any one of clauses 42 to 47 further comprising the step of administering to the animal another bacterial strain selected from the group consisting of another *Bacillus* strain, a lactic acid bacterial strain, and combinations thereof.

49. The method of any one of clauses 42 to 48 wherein the strain administered is *Bacillus* strain 86 (NRRL No. B-50944), or a strain having all of the identifying characteristics of *Bacillus* strain 86 (NRRL No. B-50944).

50. The method of any one of clauses 42 to 48 wherein the strain administered is *Bacillus* strain 300 (NRRL No. B-50943), or a strain having all of the identifying characteristics of *Bacillus* strain 300 (NRRL No. B-50943).

51. The method of any one of clauses 42 to 50 wherein the *Bacillus* strain is administered in the feed composition at a dose of about $1.0 \times 10^3$ CFU/gram of the feed composition to about $5.0 \times 10^{12}$ CFU/gram of the feed composition.

52. The method of any one of clauses 42 to 51 wherein the *Bacillus* strain is administered in the feed composition at a dose of about $1.0 \times 10^3$ CFU/gram of the feed composition to about $1.0 \times 10^7$ CFU/gram of the feed composition.

53. The method of any one of clauses 42 to 52 wherein the *Bacillus* strain is administered in the feed composition at a dose greater than about $7.0 \times 10^4$ CFU/gram of the feed composition.

54. The method of any one of clauses 42 to 53 wherein the *Bacillus* strain is administered in the feed composition at a dose of about $7.3 \times 10^4$ CFU/gram of the feed composition.

55. A method of controlling detrimental environmental effects of manure, the method comprising the step of applying to manure, litter, a pit, or a manure pond a composition comprising an effective amount of an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof, and controlling the detrimental environmental effects of the manure.

56. The method of clause 55 wherein the method improves the health of the animal by effects selected from the group consisting of reducing respiratory problems of the animal, improving gut health of the animal, improving consistency of performance of the animal, reducing diseases related to environmental toxicity in the animal, and reducing pathogens in the animal.

57. The method of clause 55 wherein the animal is a poultry species and the method improves the health of the animal by an effect selected from the group consisting of reducing respiratory problems of the poultry species, reducing breast blisters of the poultry species, improving consistency of performance of the poultry species, and reducing damage to the feet of the poultry species.

58. The method of clause 55 wherein the manure is in an anaerobic digester.

59. The method of clause 55 wherein the manure is in an anaerobic lagoon.

60. The method of any one of clauses 55 to 59 wherein the applying step comprises spraying or adding a powder or a pumpable liquid.

61. The method of any one of clauses 55 to 60 wherein the pit is a swine pit.

62. The method of clause 32 wherein the antibiotic is Denagard™ and the Denagard™ is administered in combination with chlortetracycline.

63. The method of clause 11 wherein the diet includes a component selected from the group consisting of dried distillers grain solubles, corn, soy, and combinations thereof.

64. A commercial package comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof.

65. A feed additive for an animal feed comprising an isolated *Bacillus* strain selected from the group consisting of

*Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof.

66. An additive for the drinking water of an animal comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof.

67. An animal feed composition comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof.

68. The commercial package, feed additive, feed composition, or additive for the drinking water of the animal of any one of clauses 64 to 67 wherein the *Bacillus* strain causes an effect selected from the group consisting of improving the performance of the animal, improving the health of the animal, improving the environment of the animal, and combinations thereof.

69. The commercial package, feed additive, feed composition, or additive for the drinking water of the animal of any one of clauses 64 to 68, wherein the *Bacillus* strain inhibits a pathogen selected from the group consisting of *E. coli*, *Salmonella*, *Staphylococcus*, *Enterococcus*, *Campylobacter*, and *Clostridium*.

70. The feed additive or additive for the drinking water of the animal of clause 65 or 66 in the form of a concentrate.

71. The feed additive or additive for the drinking water of the animal of clause 65 or 66 in the form of a superconcentrate.

72. The feed additive, feed composition, or additive for the drinking water of the animal of any one of clauses 65 to 67 in dry form.

73. The feed composition of clause 67 in pelleted form.

74. The commercial package of clause 64 comprising the *Bacillus* strains in a form for use in treatment of a pit, a manure pond, or for use in treatment of litter.

75. The commercial package of clause 74 wherein the strains are in a form selected from the group consisting of a powder, a liquid, and a pellet form.

76. The commercial package, feed additive, additive for the drinking water of the animal, or feed composition of any one of clauses 64 to 73 further comprising a carrier for the *Bacillus* strains.

77. The commercial package, feed additive, additive for the drinking water of the animal, or feed composition of clause 76 wherein the carrier is selected from the group consisting of a bran, rice hulls, a salt, a dextrin, and combinations thereof.

78. The commercial package, feed additive, additive for the drinking water of the animal, or feed composition of any one of clauses 64 to 77 in a bag.

79. The commercial package, feed additive, additive for the drinking water of the animal, or feed composition of clause 78 wherein the bag is a plastic bag.

80. The commercial package, feed additive, additive for the drinking water of the animal, or feed composition of any one of clauses 64 to 79 further comprising instructions for use of one or more of the *Bacillus* strains.

81. The commercial package, feed additive, or additive for the drinking water of the animal of any one of clauses 78 to 80 in a 20-pound bag.

82. The commercial package, feed additive, or additive for the drinking water of the animal of any one of clauses 78 to 80 in a 50-pound bag.

83. The feed additive or additive for the drinking water of the animal of any one of clauses 65, 66, 68, 69 to 72, or 76 to 82 in powder form.

84. The feed additive or additive for the drinking water of the animal of any one of clauses 65, 66, 68 to 71, or 78 to 80 in liquid form.

85. The commercial package, feed additive, additive for the drinking water of the animal, or feed composition of any one of clauses 64 to 84 in a container for commercial use.

86. The commercial package, feed additive, additive for the drinking water of the animal, or feed composition of clause 85 wherein the container comprises plastic.

87. The commercial package, feed additive, additive for the drinking water of the animal, or feed composition of clause 85 wherein the container comprises paper.

88. The method of clause 55 wherein the *Bacillus* strain is applied to litter and reduces ammonia in the litter.

89. The method of clause 1 wherein the animal is a chicken and the improvement in health of the chicken results in an increase in the number of eggs laid by the chicken, an increase in the number of chicks born to the chicken, or an increase in the number of live chicks born to the chicken.

90. The commercial package, feed additive, additive for the drinking water of the animal, or feed composition of any one of clauses 64 to 87 further comprising a binder.

91. The commercial package, feed additive, additive for the drinking water of the animal, or feed composition of clause 90 wherein the binder is selected from the group consisting of clay, yeast cell wall components, aluminum silicate, and glucan, or combinations thereof.

In various embodiments, the animal to which a feed additive, a feed composition, or drinking water as described herein is administered can be selected from the group consisting of a poultry species, a porcine species, a bovine species, an ovine species, an equine species, and a companion animal. In the embodiment where the animal is a companion animal, the companion animal can be, for example, a canine species or a feline species. In the embodiment where the animal is a porcine species, the porcine species can be selected from the group consisting of a grow finish pig, a nursery pig, a sow, and a breeding stock pig. In various exemplary embodiments, the animal can be selected from the group consisting of a chicken (e.g., a broiler or a layer), a pig, a horse, a pony, a cow, a turkey, a goat, a sheep, a quail, a pheasant, an ostrich, a duck, a fish (e.g., a tilapia, a catfish, a flounder, or a salmon), a crustacean (e.g., a shrimp or a crab), and combinations thereof.

In one embodiment of the invention, an effective amount of the *Bacillus* strain can be administered to improve the performance of the animal, improve the health of the animal, improve the environment of the animal, or combinations thereof. By "effective amount" is meant an amount of the *Bacillus* strain (e.g., strain 86 or 300) capable of improving the performance of the animal, improving the health of the animal, improving the environment of the animal, or combinations thereof, by any mechanism, including those described herein.

In embodiments described herein wherein the compositions of the present invention comprising *Bacillus* strains 86 and/or 300 are administered to an animal, the compositions are preferably administered to animals orally in a feed composition or in drinking water, but any other effective method of administration known to those skilled in the art may be utilized. In one illustrative embodiment, the *Bacillus* strains 86 and/or 300 are provided in the form of an additive for addition to the drinking water of an animal.

In another illustrative embodiment, the *Bacillus* strains 86 and/or 300 are provided in the form of a feed additive for addition to a feed composition. The feed composition may contain *Bacillus* strain 86 and/or 300 in a mixture with an animal feed blend, including any art-recognized animal feed blend or any animal feed blend described herein. As used herein, "feed composition" or "animal feed composition" means a feed composition comprising *Bacillus* strain 86 and/or *Bacillus* strain 300 in a mixture with an animal feed blend, and, optionally any other components that could be used in a feed composition, including other bacterial strains, such as other *Bacillus* strains or *Lactobacillus* strains.

Any animal feed blend, including those known in the art and those described herein, may be used in accordance with the methods and compositions described in this patent application, such as rapeseed meal, cottonseed meal, soybean meal, cornmeal, barley, wheat, silage, and haylage. In various embodiments, the animal feed blend can be supplemented with *Bacillus* strain 86 and/or *Bacillus* strain 300, but other ingredients may optionally be added to the animal feed blend, including other bacterial strains, such as other *Bacillus* strains or *Lactobacillus* strains.

In various illustrative embodiments, optional ingredients of the animal feed blend include sugars and complex carbohydrates such as both water-soluble and water-insoluble monosaccharides, disaccharides, and polysaccharides. Other optional ingredients include dried distillers grain solubles, fat (e.g., crude fat), phosphorous, sodium bicarbonate, limestone, salt, phytate, calcium, sodium, sulfur, magnesium, potassium, copper, iron, manganese, zinc, ash, fish oil, an oil derived from fish meal, raw seed (e.g., flaxseed), an antioxidant, and starch. In another embodiment, minerals may be added in the form of a mineral premix.

Optional amino acid ingredients that may be added to the animal feed blend are arginine, histidine, isoleucine, leucine, lysine, cysteine, methionine, phenylalanine, threonine, tryptophan, valine, tyrosine ethyl HCl, alanine, aspartic acid, sodium glutamate, glycine, proline, serine, cysteine ethyl HCl, and analogs, and salts thereof. Vitamins that may be optionally added are thiamine HCl, riboflavin, pyridoxine HCl, niacin, niacinamide, inositol, choline chloride, calcium pantothenate, biotin, folic acid, ascorbic acid, and vitamins A, B, K, D, E, and the like. In another embodiment, vitamins may be added in the form of a vitamin premix. In yet another embodiment, protein ingredients may be added to the animal feed blend and include protein obtained from meat meal, bone meal, or fish meal, liquid or powdered egg, fish solubles, crude protein, and the like.

In another illustrative aspect, any medicament ingredients known in the art may be added to the animal feed blend or to an additive for the drinking water of the animal, such as antibiotics. In various embodiments, the antibiotic is selected from the group consisting of ampicillin, chloramphenicol, ciprofloxacin, clindamycin, tetracycline, chlortetracycline, Denagard™, BMD™, Carbadox™, Stafac™, and combinations thereof. In one embodiment of the methods described herein wherein a feed composition or drinking water is administered to the animal, the method may further comprise the step of avoiding administering to the animal an antibiotic selected from the group consisting of erythromycin, levofloxacin, trimethoprim/sulfamethoxazole, trimethoprim, daptomycin, rifampicin, Tylan™, Pulmotil™, vancomycin, and combinations thereof. In another embodiment, the animal feed blend, the feed composition, the feed additive, or the additive for the drinking water of the animal may contain no antibiotics.

In another illustrative embodiment, one or more enzymes may be added to the animal feed blend. In various embodiments, the enzymes that may be added include a galactosidase, a phytase, a protease, a lipase, an amylase, a hemicellulase, an arabinoxylanase, a xylanase, a cellulase, an NSPase, combinations thereof, and any other enzyme that improves the effectiveness of the feed composition for improving the performance or health of the animal or that is effective for improving the environment of the animal. In yet another embodiment, yeast, fungi (e.g., *Aspergillus* or *Trichoderma*), or micronutrients may be added to the animal feed. Any of the ingredients described above that are suitable for addition to an additive for the drinking water of the animal may be added as a component of the additive for the drinking water of the animal as described herein.

In various illustrative embodiments, the *Bacillus* strain (e.g., *Bacillus* strain 86 and/or 300), or any other bacterial strains added in addition to *Bacillus* strain 86 and/or 300, can be administered in the feed composition at a dose of about $1.0 \times 10^3$ CFU/gram of the feed composition to about $5.0 \times 10^{12}$ CFU/gram of the feed composition or at a dose of about $1.0 \times 10^3$ CFU/gram of the feed composition to about $1.0 \times 10^7$ CFU/gram of the feed composition. In other embodiments, the *Bacillus* strain (e.g., *Bacillus* strain 86 and/or 300) is administered in the feed composition at a dose greater than about $1.0 \times 10^3$ CFU/gram of the feed composition, at a dose greater than about $1.1 \times 10^3$ CFU/gram of the feed composition, at a dose greater than about $1.25 \times 10^3$ CFU/gram of the feed composition, at a dose greater than about $1.5 \times 10^3$ CFU/gram of the feed composition, at a dose greater than about $1.75 \times 10^3$ CFU/gram of the feed composition, at a dose greater than about $1.0 \times 10^4$ CFU/gram of the feed composition, at a dose greater than about $2.0 \times 10^4$ CFU/gram of the feed composition, at a dose greater than about $3.0 \times 10^4$ CFU/gram of the feed composition, at a dose greater than about $4.0 \times 10^4$ CFU/gram of the feed composition, at a dose greater than about $5.0 \times 10^4$ CFU/gram of the feed composition, at a dose greater than about $6.0 \times 10^4$ CFU/gram of the feed composition, at a dose greater than about $7.0 \times 10^4$ CFU/gram of the feed composition, at a dose greater than about $8.0 \times 10^4$ CFU/gram of the feed composition, at a dose greater than about $1.0 \times 10^5$ CFU/gram of the feed composition, at a dose greater than about $1.0 \times 10^6$ CFU/gram of the feed composition, at a dose greater than about $1.0 \times 10^7$ CFU/gram of the feed composition, at a dose greater than about $1.0 \times 10^8$ CFU/gram of the feed composition, at a dose greater than about $1.0 \times 10^9$ CFU/gram of the feed composition, at a dose greater than about $1.0 \times 10^{10}$ CFU/gram of the feed composition, at a dose greater than about $1.0 \times 10^{11}$ CFU/gram of the feed composition, or at a dose greater than about $1.0 \times 10^{12}$ CFU/gram of the feed composition. In yet another embodiment, the *Bacillus* strain (e.g., *Bacillus* strain 86 and/or 300) is administered in the feed composition at a dose of about $7.3 \times 10^4$ CFU/gram of the feed composition.

In various embodiments, the *Bacillus* strain (e.g., *Bacillus* strain 86 and/or 300) for use in accordance with the methods and compositions described herein can be selected from the group consisting of *Bacillus* strain 86, a strain having all of the identifying characteristics of *Bacillus* strain 86, *Bacillus* strain 300, and a strain having all of the identifying characteristics of *Bacillus* strain 300. *Bacillus* strain MDG86 and *Bacillus* strain MDG300 were deposited on Mar. 14, 2014 at the Agricultural Research Service Culture Collection (NRRL), National Center for Agricultural Utilization Research, Agricultural Research Service, USDA, 1815 North University Street, Peoria, Illinois 61604-3999, and were given accession numbers B-50944 and B-50943, respectively. The deposits were made under the provisions of the Budapest Treaty on the International Recognition of the Deposit of Microorganisms for the Purposes of Patent Procedure. The NRRL strain designations are MDG86 and MDG300, which are equivalent to Bacillus strain 86 and 300, respectively, as referred to in the application.

Any of these strains can be administered alone or in combination in the form of a feed composition (e.g., a complete feed comprising an animal feed blend) or drinking water for an animal. In one embodiment, multiple strains are administered in combination in a single composition. In another embodiment, multiple strains are administered in combination in separate compositions. In one illustrative embodiment, any of these strains is isolated from a high performing grow finish pig.

In another embodiment, one or more of the Bacillus strains described in the preceding paragraphs (e.g., Bacillus strain 86 and/or Bacillus strain 300) can be administered to the animal along with another bacterial strain selected from the group consisting of another Bacillus strain, a lactic acid bacterial strain, and combinations thereof. In yet another embodiment, one or more of the Bacillus strains described in the preceding paragraphs (e.g., Bacillus strain 86 and/or Bacillus strain 300) can be administered to the animal along with any other bacterial strain effective to improve the performance or health of the animal or that is effective to improve the environment of the animal.

As used herein "a strain having all of" the identifying characteristics of Bacillus strain 86 or Bacillus strain 300 can be a mutant strain having all of the identifying characteristics of Bacillus strain 86 or Bacillus strain 300 (e.g., a DNA fingerprint based on DNA analysis that corresponds to the DNA fingerprint of Bacillus strain 86 or Bacillus strain 300, enzyme activities that correspond to Bacillus strain 86 or Bacillus strain 300, antimicrobial activity that corresponds to Bacillus strain 86 or Bacillus strain 300, antibiotic sensitivity and tolerance profiles that correspond to Bacillus strain 86 or Bacillus strain 300, or combinations thereof). In alternate embodiments, the mutation can be a natural mutation, or a genetically engineered mutation. In another embodiment, "a strain having all of" the identifying characteristics of Bacillus strain 86 or Bacillus strain 300 can be a strain, for example, produced by isolating one or more plasmids from Bacillus strain 86 or Bacillus strain 300 and introducing the one or more plasmids into another bacterium, such as another Bacillus strain, as long as the one or more plasmids contain DNA that provides the identifying characteristics of Bacillus strain 86 or Bacillus strain 300 (e.g., a DNA fingerprint based on DNA analysis that corresponds to the DNA fingerprint of Bacillus strain 86 or Bacillus strain 300).

The feed composition or drinking water comprising Bacillus strain 86 and/or 300 may be administered to the animal for any time period that is effective to improve the performance of the animal, improve the health of the animal, improve the environment of the animal, or combinations thereof. For example, in one embodiment the feed composition or drinking water may be provided to the animal daily. In an alternate embodiment, the feed composition or drinking water may be administered to the animal during lactation and/or during gestation. The time periods for administration of the feed composition or drinking water described above are non-limiting examples and it should be appreciated that any time period or administration schedule determined to be effective to improve the performance of the animal, improve the health of the animal, improve the environment of the animal, or combinations thereof, may be used.

As described herein, one of the method embodiments is a method of feeding an animal by administering to the animal a feed composition or drinking water comprising an effective amount of an additive comprising an isolated Bacillus strain selected from the group consisting of Bacillus strain 86 (NRRL No. B-50944), Bacillus strain 300 (NRRL No. B-50943), a strain having all of the identifying characteristics of Bacillus strain 86 (NRRL No. B-50944), a strain having all of the identifying characteristics of Bacillus strain 300 (NRRL No. B-50943), and combinations thereof, wherein the Bacillus strain causes an effect selected from the group consisting of improving the performance of the animal, improving the health of the animal, improving the environment of the animal, and combinations thereof.

In the embodiment where the effect is improving the performance of the animal, the improvement in animal performance is selected from the group consisting of decreasing feed conversion (e.g., reducing the feed to gain ratio (F/G)), increasing average daily feed intake (ADFI), increasing average daily gain (ADG), improving consistency of performance, improving digestibility of a diet, improving the metabolizable energy to gross energy ratio, and combinations thereof. In one embodiment, Bacillus strain 86 and/or Bacillus strain 300 can increase the digestibility of a diet by producing enzymes that increase the digestibility of consumed nutrients where the enzymes are selected from the group consisting of an $\alpha$-galactosidase, a protease, a phytase, a lipase, an amylase, a xylanase, a cellulase, and combinations thereof. The enzyme can also be any other enzyme that degrades long chain fatty acids, such as enzymes that degrade stearic, palmitic, and/or oleic acid, but not limited to these fatty acids. Such an increase in digestibility of a diet leads to improvements in animal performance selected from the group consisting of decreasing feed conversion (e.g., reducing the feed to gain ratio (F/G)), increasing average daily feed intake (ADFI), increasing average daily gain (ADG), improving consistency of performance of the animal (e.g., reducing variation in performance such as reducing variation and increasing uniformity in F/G, ADFI, and ADG), improving the metabolizable energy to gross energy ratio, and combinations thereof.

In the embodiment where the effect is improving the health of the animal, the improvement can result from a mechanism including, but not limited to, antimicrobial activity of Bacillus strain 86 and/or Bacillus strain 300. In various embodiments, the antimicrobial activity is against bacteria selected from the group consisting of E. coli, Salmonella, Staphylococcus, Enterococcus, Clostridia, Campylobacter, and combinations thereof. Thus, Bacillus strain 86 and Bacillus strain 300 can improve gut health of the animal, and reduce pathogens in the animal, and the animal's environment. In yet another embodiment, the animal is a chicken and the improvement in the health of the chicken results in an increase in the number of eggs laid by the chicken, an increase in the number of chicks born to the chicken, or an increase in the number of live chicks born to the chicken.

Bacillus strain 86 and Bacillus strain 300 can also reduce high ammonia and high pH in manure. The reduction in high ammonia and high pH in manure reduces ammonia toxicity to the animal and toxicity to natural flora that degrade long chain fatty acids Ammonia toxicity to the animal is caused, in part, by $NH_4$ dissociation to $NH_3$ to produce ammonia gas in the environment of the animal. $NH_3$ is more toxic than $NH_4$ and can lead to respiratory diseases in the animal. Thus, *Bacillus* strain 86 and *Bacillus* strain 300 help to reduce toxicity to the animal, help to maintain the normal microbial balance in the animal, and help to reduce diseases related to environmental toxicity in the animal.

In the embodiment where the effect is improving the environment of the animal, the improvement to the environment is selected from the group consisting of reducing the pH of manure, reducing the explosive gas entrapping long chain fatty acid content of manure, reducing ammonia in manure, reducing ammonia volatilization, reducing manure pit foaming, reducing explosive gases in manure, and combinations thereof.

In these embodiments, high ammonia and high pH in manure may inhibit the growth of bacteria that degrade long chain fatty acids (e.g., lactic acid bacteria and *Syntrophomonas*). Long chain fatty acids are typically found in the manure of animals fed diets high in lipids where the lipids breakdown to long chain fatty acids (e.g., diets containing dried distillers grain solubles or diets containing soybeans, such as a soybean meal diet). A build up of long chain fatty acids in manure can be detrimental to the environment of the animal because long chain fatty acids entrap explosive gases leading to, for example, pit foaming and explosions in barns. Long chain fatty acids can also inhibit natural flora which would degrade the long chain fatty acids to produce less detrimental products.

*Bacillus* strain 86 and *Bacillus* strain 300 not only reduce high ammonia and high pH in manure, but these strains also degrade long chain fatty acids. The reduction in explosive gas entrapping long chain fatty acid content in the manure caused by *Bacillus* strain 86 and *Bacillus* strain 300 causes a reduction in explosive gases in the manure (e.g., methane gas, hydrogen gas, phosphine gas, and combinations thereof), and, thus, reduces explosions in barns. As discussed above, the reduction in high ammonia and high pH in manure improves the health of the animal by reducing $NH_3$ in the environment of the animal. The reduction in high ammonia and high pH in manure also inhibits ammonia flashing in barns (e.g., when $NH_3$ flashes off) which results in loss of nitrogen and a decrease in the value of the manure as a fertilizer. Thus, *Bacillus* strain 86 and *Bacillus* strain 300 increase the value of manure as a fertilizer.

As described herein, another method embodiment is a method of controlling detrimental environmental effects of manure. The method comprises the steps of administering to an animal a feed composition or drinking water comprising an effective amount of an additive comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof, and controlling the detrimental environmental effects of the manure.

In this embodiment, *Bacillus* strain 86 and/or *Bacillus* strain 300 causes an effect selected from the group consisting of reducing the pH of manure, reducing the long chain fatty acid content of manure, reducing ammonia in manure, reducing manure pit foaming, reducing explosive gases in manure, reducing ammonia volatilization, and combinations thereof. In these embodiments, as already discussed, high ammonia and high pH in manure may inhibit the growth of bacteria that degrade long chain fatty acids (e.g., lactic acid bacteria and *Syntrophomonas*). Long chain fatty acids are typically found in the manure of animals fed diets high in lipids where the lipids breakdown to long chain fatty acids. A build up of long chain fatty acids in manure can be detrimental to the environment of the animal because long chain fatty acids entrap explosive gases leading to explosions in barns. Long chain fatty acids can also inhibit natural flora which would degrade the long chain fatty acids to less detrimental products.

*Bacillus* strain 86 and *Bacillus* strain 300 not only reduce high ammonia and high pH in manure, but these strains also degrade long chain fatty acids. The reduction in long chain fatty acid content in the manure caused by *Bacillus* strain 86 and *Bacillus* strain 300 causes a reduction in explosive gases in the manure, and, thus, reduces explosions in barns. The reduction in high ammonia and high pH in manure inhibits ammonia flashing in barns which results in loss of nitrogen and a decrease in the value of the manure as a fertilizer. Thus, *Bacillus* strain 86 and *Bacillus* strain 300 increase the value of manure as a fertilizer.

In another method embodiment, a method of controlling detrimental environmental effects of manure is provided. The method comprises the step of applying to manure, litter, a pit, or a manure pond a composition comprising an effective amount of an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof, and controlling the detrimental environmental effects of the manure.

In this embodiment, *Bacillus* strain 86 and *Bacillus* strain 300 can be applied to the manure, litter, the pit (e.g., a swine pit), or the manure pond by any suitable method. For example, *Bacillus* strain 86 and *Bacillus* strain 300 can be applied to the manure, litter, pit, or the manure pond by spraying or in the form of a powder, liquid, or pellet or by adding a powder or a pumpable liquid. In the embodiment where *Bacillus* strain 86 and/or *Bacillus* strain 300 is applied to manure, the manure can be in an anaerobic digester, an anaerobic lagoon, or a grease trap. The strains can be applied to the anaerobic digester, an anaerobic lagoon, or a grease trap, for example, in the form of a powder, liquid, or a pellet. In this embodiment, the application of the *Bacillus* strain to the litter can result in ammonia reduction in the litter.

In this method embodiment, the method can improve the health of the animal by improving the animal's environment by effects selected from the group consisting of reducing respiratory problems of the animal, improving gut health of the animal, improving consistency of performance of the animal, reducing diseases related to environmental toxicity in the animal, and reducing pathogens in the animal. In an embodiment where the animal is a poultry species, the method can improve the health of the animal by an effect selected from the group consisting of reducing respiratory problems of the poultry species, reducing breast blisters of the poultry species, improving consistency of performance of the poultry species, and reducing damage to the feet of the poultry species. These mechanisms of improvement to the health of the animal are non-limiting examples.

In additional embodiments of the invention, compositions comprising *Bacillus* strain 86 and/or *Bacillus* strain 300 are provided. In one embodiment, a commercial package is provided comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof.

In another embodiment, a feed additive for an animal feed is provided comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof.

In yet another embodiment, an additive for the drinking water of an animal is provided comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof.

In yet another illustrative aspect of the invention, an animal feed composition is provided comprising an isolated *Bacillus* strain selected from the group consisting of *Bacillus* strain 86 (NRRL No. B-50944), *Bacillus* strain 300 (NRRL No. B-50943), a strain having all of the identifying characteristics of *Bacillus* strain 86 (NRRL No. B-50944), a strain having all of the identifying characteristics of *Bacillus* strain 300 (NRRL No. B-50943), and combinations thereof.

In one embodiment, the feed additive for addition to an animal feed blend to produce a complete feed composition can be mixed with the animal feed blend, for example, with an automated micro-nutrient delivery system, or, for example, by hand-weighing and addition to achieve any of the doses of *Bacillus* strain 86 and *Bacillus* strain 300 described herein, for administration to the animal in the form of a complete feed composition. The mixing can also be done by any other suitable method known in the art for combining direct-fed microbials with an animal feed blend to obtain a uniform mixture. In various embodiments, the mixing can be done for any suitable time period (e.g., about 1 to about 4 minutes). In the embodiment where *Bacillus* strain 86 and/or *Bacillus* strain 300 is in the form of an additive for the drinking water of the animal, the *Bacillus* strain 86 and/or *Bacillus* strain 300 can be in the form of, for example, a powder, a liquid, or pellets, and can be mixed with the drinking water using any suitable method known in the art to achieve any of the doses of *Bacillus* strain 86 and *Bacillus* strain 300 described herein, for administration to the animal in the drinking water of the animal. *Bacillus* strain 86 and/or *Bacillus* strain 300 can also be fed directly to the animal orally (i.e., by oral insertion) in the form of a powder, a liquid, or a pellet.

In any of the composition embodiments described herein, the *Bacillus* strain 86 and/or *Bacillus* strain 300 can cause an effect selected from the group consisting of improving the performance of the animal, improving the health of the animal, improving the environment of the animal, and combinations thereof. The commercial package, feed additive, feed composition, or additive for the drinking water of the animal described herein can also inhibit a pathogen selected from the group consisting of *E. coli*, *Salmonella*, *Staphylococcus*, *Enterococcus*, *Clostridia*, *Campylobacter*, and combinations thereof. These effects are non-limiting examples of the types of effects *Bacillus* strain 86 and/or *Bacillus* strain 300 can cause.

In one illustrative aspect, the feed additive, additive for the drinking water of the animal, or the feed composition can be in the form of a commercial package. In another illustrative embodiment, the feed additive or additive for the drinking water of the animal, or the *Bacillus* strain 86 and/or *Bacillus* strain 300 in the commercial package can be in the form of a concentrate (e.g., about $1 \times 10^8$ to about $5 \times 10^9$ CFU/g) or a superconcentrate (e.g., about $1 \times 10^{10}$ to about $5 \times 10^{12}$ CFU/g), or can be in the same form but can be for use in treatment of manure, litter, a pit, or a manure pond. In another embodiment, the feed additive, feed composition, or additive for the drinking water of the animal, or the *Bacillus* strain 86 and/or *Bacillus* strain 300 in a composition in a commercial package, can be in a dry form (e.g., a powder), a pelleted form, a liquid form, in the form of a top-dressing, or in the form of a gel, or any other suitable form.

In yet another embodiment, the strains in the form of a commercial package can be in a form for use in treatment of manure, in a form for treatment of a pit or in a form for use in treatment of litter. In this embodiment, the *Bacillus* strain 86 and/or *Bacillus* strain 300 can be, for example, in a dry form (e.g., a powder or freeze-dried form), in a pelleted form, or in a liquid form.

In another illustrative embodiment, the commercial package, feed additive, additive for the drinking water of the animal, or feed composition can further comprise a carrier for the *Bacillus* strain 86 and/or *Bacillus* strain 300. The carrier can be selected from the group consisting of a bran, rice hulls, a salt, mineral oil, a dextrin (e.g., maltodextrin), whey, sugar, limestone, dried starch, sodium silico aluminate, vegetable oil, and combinations thereof. In another embodiment, the carrier can be any suitable carrier known in the art for a direct-fed microbial. In another embodiment, the commercial package, feed additive, additive for the drinking water of the animal, or feed composition can further comprise a binder such as clay, yeast cell wall components, aluminum silicate, glucan, or other known binders.

In yet other embodiments, the commercial package, feed additive, additive for the drinking water of the animal, or feed composition comprising *Bacillus* strain 86 and/or *Bacillus* strain 300 is in a container for commercial use. In various embodiments the container can be, for example, a bag (e.g., a 20-pound bag, a 50-pound bag, a 2-ounce bag, a 1-pound bag, or a 1-kilogram bag), a pouch, a drum, a bottle, or a box. In illustrative aspects, the container for the commercial package, feed additive, additive for the drinking water of the animal, or feed composition comprising *Bacillus* strain 86 and/or *Bacillus* strain 300 can comprise plastic, metal, foil, paper, fiber, or cardboard (e.g., a plastic pail, a paper bag, a foil bag, a fiber drum, etc.). The commercial package, feed additive, additive for the drinking water of the animal, or feed composition can further comprise instructions for use of one or more of the *Bacillus* strains.

The following examples are for illustrative purposes only. The examples are non-limiting, and are not intended to limit the invention in any way.

Example 1

Efficacy of Strain Combinations for Increasing Live Growth Performance of Broiler Chickens The objective of the instant example was to determine the efficacy of several *Bacillus* species strain combinations for promoting weight gain and feed/energy conversion in broiler chickens. The growth performance responses of broiler chickens fed diets supplemented with various strain combinations (DFMs) were evaluated.

For this investigation, a total of 60 pens were utilized, with a group size of 35 birds per pen. The litter utilized in the pens was wood shavings that were previously used (but had no previous DFM use).

Approximately 2100 hatch chickens (Cobb 500 genetics) were evaluated, including roosters and hens in mixed-sex pens. Chickens received an anti-coccidia vaccine at hatch (mist application). The start weight of the chickens was about 50 grams, and the end weight of the chickens was about 2.75 kg.

In the investigation, the chickens were divided into four groups as shown in Table 1:

TABLE 1

Experimental Treatment Groups

| Treatment Group | Experimental Treatment |
|---|---|
| A | Corn-SBM-5% Dried Distillers Grain Solubles (DDGS; Positive Control) |
| B | Corn-SBM-5% DDGS + 1.84 × $10^5$ CFU/g DFM combo MDG-1 (Bs 4-way combo) |
| C | Corn-SBM-5% DDGS + 7.35 × $10^4$ CFU/g DFM combo MDG-3 (Bs 86 + 300, 80/20%) |
| D | Corn-SBM-5% DDGS + 1.84 × $10^5$ CFU/g DFM combo MDG-3 (Bs 86 + 300, 80/20%) |

For the allotment of chickens to the experiment, birds were weighed by pen, and pens were grouped into replicates of six (6) similar-weight pens. Pens were randomly allotted to dietary treatment from within replicate and immediately started on the study, and remained on dietary treatments until the end of the experimental period. Daily management of the animals followed standard operating procedures on farms. Birds requiring medicinal treatment for 3 straight days were removed from the experiment. The day of the investigation and body weight of the bird at removal were recorded for proper accounting in the performance of that pen.

Measurements of litter compositions were obtained and evaluated. Samples of litter were taken from four (4) replicates (two in each half of the barn) prior to chick placement, during week 3 of the investigation, and at the end of the investigation. Litter samples underwent analyses for coliforms, pH, moisture, and ammonia, and were retained for possible future analyses.

Measurements of live performance were also obtained and evaluated. Total pen weights were recorded at the beginning of the investigation and at biweekly intervals, corresponding to dietary phase changes, thereafter until the end of the experimental period. Experimental feeds were manufactured, delivered, and recorded by hand. The feed-in-feeder at the end of the experimental period was removed and weighed, and that weight was used to calculate total feed disappearance by pen. Pen weights, feed delivered, and feed-in-feeder for each pen were used to calculate body weights, feed intakes, and feed conversion ratios (grams feed/grams body weight). Caloric efficiency (kcal/lb gain) was calculated from the total feed intake per pen, metabolizable energy (ME) content of each diet, and the total live gain per bird. All morbidity and mortality events were recorded, along with any major health issues. Any bird that became morbid was removed from the study and weighed and its individual identification number, gender, room, pen, date of removal, and reason of removal were recorded.

Evaluations of economic performance were also assessed. The cost of feed per pen was calculated as the sum-product of total feed consumed per pen and the cost per each diet. Feed cost per bird was calculated as the total feed cost per pen divided by the total number of birds present at the end of the experiment. Feed cost per 100 pound gain was calculated as the product of feed/gain (F/G) and the cost/100 pound feed (total feed cost/total carcass weight (cwt) feed). Revenue per bird was calculated as the product of carcass weight (cwt) and meat price ($/pound). Margin-over-feed per bird was calculated as the difference between revenue and feed cost per bird.

The experimental diet formulation used in the instant example included yellow dent corn (Producers Cooperative, Bryan, TX) and poultry fat (Griffin Industries). The test materials DFM strains were provided by Microbial Discovery Group (Franklin, WI). The control diet contained supplemental fat (poultry), 5% DDGS, and 3% meat-and-bone meal. Identification information of DFM materials was as follows:

| DFM additive | CFU/g |
|---|---|
| Combo MDG-1 | 8.30 × $10^8$ |
| Combo MDG-3 | 1.82 × $10^{10}$ |

Chickens were fed diets in three phases according to the following age ranges: Phase 1—Week 1-2; Phase 1—Week 3-4; and Phase 3—Week 5-6.

All diets were formulated to be adequate in SID Lys (%, NRC, 1994) and the other essential amino acids (AA), available phosphorus (P), calcium (Ca), and sodium (Na) (see Table 2).

TABLE 2

Dietary nutrient formulation constraints of experimental diets by phase of production.

| Nutrient | Wk 1-2 | Wk 3-4 | Wk 5-6 |
|---|---|---|---|
| DDGS, % | 5.0 | 5.0 | 5.0 |
| Meat-and-bone meal (pork), % | 3.0 | 3.0 | 3.0 |
| ME, kcal/lb | 1,385 | 1,410 | 1,443 |
| SID AA, % | | | |
| Lys | 1.18 | 1.04 | 0.90 |
| Met | 0.57 | 0.53 | 0.43 |
| Total AA, % | | | |
| SAA | 0.92 | 0.88 | 0.75 |
| Thr | 0.72 | 0.62 | 0.55 |
| Trp | 0.22 | 0.20 | 0.18 |
| Arg | 1.40 | 1.25 | 1.10 |
| Phosphorus, available, % | 0.45 | 0.40 | 0.38 |
| Calcium, % | 0.92 | 0.80 | 0.75 |
| Sodium, % | 0.20 | 0.20 | 0.20 |

Diets were devoid of feed-grade antibiotics and coccidiostats. The test DFM materials were supplemented to the final diets at the expense of corn (see Table 3).

TABLE 3

Dietary formulations for experimental diets.

| Ingredient (lbs/ton) | Starter (wk 1-2) | Grower (wk 3-4) | Finisher (wk 5-6) |
|---|---|---|---|
| Corn | 1,150.65 | 1,259.89 | 1,347.92 |
| Soybean meal | 592.10 | 491.67 | 396.71 |

TABLE 3-continued

Dietary formulations for experimental diets.

| Ingredient (lbs/ton) | Starter (wk 1-2) | Grower (wk 3-4) | Finisher (wk 5-6) |
| --- | --- | --- | --- |
| DDGS | 100.00 | 100.00 | 100.00 |
| Meat & bone meal | 60.00 | 60.00 | 60.00 |
| Fat, poultry | 44.75 | 43.82 | 54.71 |
| Limestone | 20.44 | 16.52 | 15.04 |
| Salt | 8.11 | 5.76 | 3.54 |
| Monocalcium phosphate | 7.65 | 3.53 | 2.28 |
| Sodium bicarbonate | 0.20 | 3.47 | 6.57 |
| DL-methionine | 5.23 | 4.86 | 3.27 |
| L-Lysine•HCl | 4.62 | 4.24 | 3.72 |
| Trace mineral premix | 1.00 | 1.00 | 1.00 |
| Vitamin premix | 5.00 | 5.00 | 5.00 |
| Phytase (OptiPhos 2000) | 0.25 | 0.25 | 0.25 |
| Nutrient composition | | | |
| ME, kcal/lb | 1,385 | 1,410 | 1,443 |
| Crude protein, % | 22.5 | 20.5 | 18.5 |
| Crude fat, % | 5.45 | 5.56 | 6.23 |
| NDF, % | 8.2 | 8.2 | 8.2 |
| Phosphorus | | | |
| Total, % | 0.57 | 0.51 | 0.48 |
| Phytate-P, % | | | |
| Available, % | 0.45 | 0.40 | 0.38 |
| Phytase, FTU/kg | 250 | 250 | 250 |
| Calcium, % | 0.92 | 0.80 | 0.75 |
| Sodium, % | 0.20 | 0.20 | 0.20 |
| Lysine, total, % | 1.31 | 1.16 | 1.01 |
| Lysine, SID, % | 1.18 | 1.04 | 0.90 |
| Methionine, SID, % | 0.57 | 0.53 | 0.43 |
| TSAA, SID, % | 0.85 | 0.79 | 0.67 |
| Threonine, SID, % | 0.70 | 0.63 | 0.56 |
| Tryptophan, SID, % | 0.21 | 0.19 | 0.16 |
| Arginine, SID, % | 1.31 | 1.16 | 1.02 |
| Isoleucine, SID, % | 0.81 | 0.72 | 0.64 |
| Valine, SID, % | 0.91 | 0.83 | 0.75 |

Diet components were mixed in a horizontal mixer. An amount of corn was added to the mixer for purposes of flushing the system between each batch of DFM-supplemented diets. Each diet was pelleted at 185° F. following 30 seconds of conditioning. The diets for Week 1-2 were crumbled following pelleting. Experimental diets were delivered to each pen by hand, and the addition was recorded manually.

Samples of corn, SBM, and DDGS were taken at each time of diet manufacture. Final experimental diets were sampled at the time of manufacture. Samples of both feedstuffs (pooled) and experimental diets were split into five (5) samples, of which one was retained and the remaining four were available for submission for the following analyses: proximate components and minerals, amino acids, microbial counts, and mycotoxins.

Initial data analysis was performed for all metrics to determine homogeneity of variance, normal distribution, and outliers ($\pm>3$ standard deviations in difference from the grand mean).

Feed Conversion Ratio (FCR):

Table 4 shows the mortality-corrected feed conversion ratio (FCR) of straight-run broilers in the various treatment groups at the starter, grower, and finisher phases.

TABLE 4

Mortality corrected feed conversion ratio (FCR) of straight-run broilers fed standard corn-soy diets with the inclusion of a direct fed microbial.

| Treatment | Starter | Grower | Finisher |
| --- | --- | --- | --- |
| Control (C) | $1.370^a$ | 1.541 | 1.919 |
| C + MDG-1 ($1.84^5$) | $1.346^{ab}$ | 1.540 | 1.934 |
| C + MDG-3 ($7.35^4$) | $1.309^b$ | 1.500 | 1.907 |
| C + MDG-3 ($1.84^5$) | $1.376^a$ | 1.521 | 1.903 |
| Pooled SEM | 0.006 | 0.006 | 0.011 |

$^{a,b}$Means with different groupings differ significantly at $P \leq 0.05$.

In the starter phase, the inclusion of DFM in all treatments yielded similar results to the control, except for MDG-3 ($7.35^4$), which resulted in a significant decrease compared to the control. Throughout the growth and finisher phase, no significant differences in FCR were observed.

Table 5 shows the mortality-corrected feed conversion ratio (FCR) of straight-run broilers in the various treatment groups from Days 1-28 of the treatment phase and for Days 1-41 of the treatment phase.

TABLE 5

Mortality corrected cumulative feed conversion ratio (FCR) of straight-run broilers fed standard corn-soy diet with DFM inclusion.

| Treatment | Day 1-28 | Day 1-41 |
| --- | --- | --- |
| Control (C) | $1.499^a$ | 1.702 |
| C + MDG-1 ($1.84^5$) | $1.492^{ab}$ | 1.707 |
| C + MDG-3 ($7.35^4$) | $1.457^c$ | 1.673 |
| C + MDG-3 ($1.84^5$) | $1.486^{abc}$ | 1.690 |
| Pooled SEM | 0.004 | 0.005 |

$^{a,b}$Means with different groupings differ significantly at $P \leq 0.05$.

Through day 28, the inclusion of MDG-1 and MDG-3 ($1.84^5$) yielded similar FCR to the control diet. A significant decrease in FCR was observed with the inclusion of MDG-3 ($7.35^4$) compared to the control diet. At the conclusion of the trial (i.e., through day 41), no significant differences were observed between treatments.

Body Weights:

Table 6 shows the calculated body weights of straight-run broilers fed a standard corn-soy diet in the various treatment groups at day 1, day 14, day 28, and day 41 of treatment.

TABLE 6

Body weights (kg) of straight-run broilers fed a standard corn-soy diet with the inclusion of a direct fed microbial.

| Treatment | Day 1 | Day 14 | Day 28 | Day 41 |
| --- | --- | --- | --- | --- |
| Control (C) | 0.034 | 0.338 | 1.274 | 2.460 |
| C + MDG-1 ($1.84^5$) | 0.034 | 0.324 | 1.236 | 2.413 |
| C + MDG-3 ($7.35^4$) | 0.034 | 0.340 | 1.280 | 2.438 |
| C + MDG-3 ($1.84^5$) | 0.033 | 0.316 | 1.239 | 2.419 |
| Pooled SEM | 0.000 | 0.003 | 0.008 | 0.013 |

As shown in Table 6, no significant differences were observed in body weight associated with treatment throughout the duration of the trial.

Mortality:

Table 7 shows the mortality of straight-run broilers fed standard corn-soy diet in the various treatment groups at the starter, grower, and finisher phases.

TABLE 7

Mortality (%) of straight-run broilers fed standard corn-soy diet with the inclusion of a direct fed microbial.

| Treatment | Starter | Grower | Finisher | Total |
|---|---|---|---|---|
| Control (C) | 5.1 | 0.6 | 0.6 | 6.3 |
| C + MDG-1 (1.84$^5$) | 5.1 | 1.1 | 0.9 | 7.1 |
| C + MDG-3 (7.35$^4$) | 4.3 | 1.1 | 1.1 | 6.6 |
| C + MDG-3 (1.84$^5$) | 6.0 | 0.6 | 0.9 | 7.4 |
| Pooled SEM | 0.4 | 0.2 | 0.2 | 0.4 |

As shown in Table 7, no differences in mortality were observed between treatments throughout the trial.

In conclusion for the experiments in this investigation, DFM products resulted in improved feed conversion ratio in coccidiosis vaccinated broilers. The improvements reached the level of significance through 28 days of age and were 3 points improved at day 41 with the inclusion of MDG-3 (7.35$^4$).

Example 2

Growth Performance Studies of Finishing Pigs Used to Determine Ideal DFM Strain Combinations FIG. 1 shows the growth performance of finishing pigs fed various DFM strain combinations. FIG. 1 suggests that strain 86 alone performed better than in combination with other strains in relation to ADFI and ADG. However, an additional trial described at the end of Example 3 suggests that a combination of strain 86 plus strain 300 performed better than strain 86 alone on ADFI and ADG. The ratios for 86+300+552 were 33.3%, 33.3%, and 33.3%, respectively. The ratios for 86+552 and 300+552 were 50:50.

Example 3

Growth Performance of Finishing Pigs Fed Various DFM Strain Combinations

The objective of this investigation was to determine the efficacy of several *Bacillus* species DFM strain combinations for promoting weight gain and growth performance in finishing pigs.

Three different groups were evaluated in the instant example: 13-F040, 13-F071, and 13-F072. In the example, PIC 337×Camborough 29 pigs were evaluated, including barrows and gilts in mixed-sex pens. The parameters for each group are shown in Table 8 as follows:

TABLE 8

Parameters for Treatment Protocols

| | 13-F040 | 13-F071 | 13-F072 |
|---|---|---|---|
| Facility | BRF C&D FIN | BRF A&B FIN | DEO W2M N |
| Group Size | 22 pigs | 26 pigs | 12 pigs |
| Age | ~23 wk | ~18 wk | ~19 wk |
| Start Weight | 232 ± 5 lbs | 171 ± 5 lbs | 210 ± 11 lbs |
| End Weight | 284 ± 8 lbs | 277 ± 7 lbs | 276 ± 7 lbs |
| Duration | 29 days | 60 days | 38 days |

In this investigation, the pigs were divided into three groups as shown in Table 9:

TABLE 9

Experimental Treatment Groups

| Treatment Group | Experimental Treatment |
|---|---|
| A | Corn-SBM (Positive Control) |
| B | Corn-SBM + 7.35 × 10$^4$ cfu/g Bs strain 86 |
| C | Corn-SBM + 7.35 × 10$^4$ cfu/g Bs strain 86 + 300 + 552 combination |

At the start of each experiment, mixed-sex pens of pigs were sorted by weight into replicates based on body weight. Pens were then randomly allotted to dietary treatment from within replicates and immediately started on the study. Pens remained on dietary treatments until the end of the experimental period.

Daily management followed standard operating procedures within each farm. Pigs were visually inspected daily to ensure that individual pigs were meeting the standard for body condition and criteria for the standard operating procedures of the farm. Pigs not meeting such criteria were medicated per standards of the farm and recommendations of the attending veterinarian. Pigs requiring medicinal treatment for 3 consecutive days and not showing signs of improvement were immediately removed from the experiment.

All morbidity and mortality events were recorded, along with any major health issues. Any pig that became morbid and was removed from the study was weighed and its gender, room, pen, date of removal, and reason for removal was recorded. Pigs that were removed from trial were classified as a nutritional or a non-nutritional reason for removal (see Table 10).

TABLE 10

Identification of causes for removals.

| Cause | Nutritional | Non-nutritional |
|---|---|---|
| Respiratory Disease[1] | | X |
| Gastrointestinal Disease[2] | | X |
| Other Disease[3] | | X |
| Injury[4] | | X |
| Structural Defects[5] | | X |
| Hernia[6] | | X |
| Emaciation[7] | X | |
| NANI[8] | | X |
| Can't find feed or water[9] | X | |
| Low body weight[10] | X | |
| Other[11] | | X |

[1]Respiratory disease = PRRS; pneumonia; influenza; or thumping.
[2]Gastrointestinal disease = ileitis; hemorrhagic bowel; obstructed bowel; or ulcers.
[3]Other disease = strep or greasy pig.
[4]Injury = broken bones; cannibalism; abscesses; or swollen joints
[5]Structural defects = broken top; leg soundness issues; or spraddle legs
[6]Hernia = scrotal or umbilical hernia
[7]Emaciation = fall-off; anorexia; or general unthriftiness
[8]Non-Ambulatory, Non-Injured (NANI) = downers and stress related issues
[9]Can't find feed or water
[10]Low body weight
[11]Other reason not listed Measurements of carcass performance were also obtained and evaluated. Carcass weights, back fat and loin depths at the 10th rib, calculated lean content, sort discounts, and lean premiums were collected. Carcass yield was calculated as the carcass weight divided by live weight as measured at the plant, multiplied by 100. Carcass ADG was calculated as the difference between carcass weight and the weight of the carcass at the beginning of the experiment, defined as start weight×0.75; carcass F/G was calculated as ADFI/carcass ADG. Carcass caloric efficiency (kcal/pound carcass gain) was calculated from the total ingredient intake per pen, ME content of each ingredient used, and the total carcass gain per pen.

Evaluations of economic performance were also assessed. The cost of feed per pen was calculated as the sum-product of total ingredient consumed per pen and the cost per unit of each ingredient. Feed cost per pig was calculated as the total feed cost per pen divided by the total number of pigs present at the end of the experiment. Feed cost per pound gain (both live and carcass) was calculated as the product of F/G and the cost/pound feed (total feed cost/total pound feed). Revenue per pig was calculated as the product of carcass weight (cwt) and the sum of base price and lean premium (S/cwt). Margin-over-feed (MOF) per pig was calculated as the difference between revenue and feed cost per pig.

The experimental diet formulation used in the instant example included feedstuffs such as yellow dent corn (Co-Alliance, Frankfort, IN), soybean meal (ADM, Frankfort, IN), DDGS (The Andersons, Clymers, IN), choice white grease (IPC, Delphi, IN), and basemixes (JBS United, Inc., Sheridan, IN). Loading values for corn, soy bean meal (SBM), and DDGS are shown in Table 11.

TABLE 11

Nutrient loading values and analyses of feedstuffs.

| | Corn | | | SBM | | | DDGS | | |
|---|---|---|---|---|---|---|---|---|---|
| Exp: | 40 | 71/72 | An. | 40 | 71/72 | An. | 40 | 71/72 | An. |
| DM, % | 84.3 | 84.9 | 85.1 | 88.1 | 88.2 | 88.3 | 89.5 | 88.2 | 88.2 |
| ME, kcal/lb | 1,474 | 1,487 | — | 1,500 | 1,461 | — | 1,475 | 1,439 | — |
| Fat, % | 3.25 | 3.33 | 3.30 | 1.90 | 1.71 | 1.95 | 8.08 | 7.37 | 6.12 |
| CP, % | 7.63 | 7.98 | 8.18 | 47.50 | 47.88 | 46.88 | 27.94 | 30.98 | 31.26 |
| Ile, total, % | 0.27 | 0.28 | 0.28 | 2.12 | 2.13 | 2.14 | 1.03 | 1.15 | 1.21 |
| Ile, SID, % | 0.21 | 0.22 | — | 1.91 | 1.92 | — | 0.78 | 0.87 | — |
| Lys, total, % | 0.24 | 0.24 | 0.24 | 2.92 | 2.95 | 2.98 | 0.89 | 0.98 | 1.06 |
| Lys, SID, % | 0.17 | 0.17 | — | 2.63 | 2.66 | — | 0.56 | 0.62 | — |
| SAA, total, % | 0.33 | 0.34 | 0.34 | 1.37 | 1.38 | 1.37 | 1.00 | 1.11 | 1.12 |
| SAA, SID, % | 0.27 | 0.27 | — | 1.19 | 1.20 | — | 0.71 | 0.87 | — |
| Thr, total, % | 0.28 | 0.29 | 0.29 | 1.84 | 1.85 | 1.85 | 0.97 | 1.14 | 1.14 |
| Thr, SID, % | 0.21 | 0.21 | — | 1.61 | 1.62 | — | 0.69 | 0.81 | — |
| Trp, total, % | 0.06 | 0.06 | 0.06 | 0.65 | 0.65 | 0.65 | 0.21 | 0.21 | 0.22 |
| Trp, SID, % | 0.05 | 0.05 | — | 0.59 | 0.59 | — | 0.14 | 0.15 | — |
| Val, total, % | 0.36 | 0.38 | 0.38 | 2.23 | 2.23 | 2.24 | 1.33 | 1.45 | 1.57 |
| Val, SID, % | 0.28 | 0.30 | — | 1.97 | 1.97 | — | 1.00 | 1.09 | — |
| P, % | 0.26 | 0.26 | 0.25 | 0.71 | 0.70 | 0.71 | 0.83 | 0.85 | 0.89 |
| P, avail, % | 0.04 | 0.04 | — | 0.18 | 0.17 | — | 0.58 | 0.60 | — |
| Ca, % | 0 | 0.01 | 0 | 0.31 | 0.34 | 0.35 | 0.01 | 0.02 | 0.03 |
| Na, % | 0 | 0 | 0 | 0.02 | 0.02 | 0.04 | 0.17 | 0.23 | 0.19 |
| S, % | 0.09 | — | 0.09 | 0.40 | — | 0.39 | — | — | 0.75 |
| K, % | 0.36 | 0.31 | 0.29 | 2.28 | 2.26 | 2.26 | 0.87 | 0.99 | 1.03 |
| Cu, mg/kg | 2 | 3 | 3 | 15 | 15 | 15 | 4 | 6 | 6 |
| Zn, mg/kg | 18 | 21 | 19 | 48 | 50 | 52 | 54 | 63 | 65 |
| ADF, % | 2.4 | 2.4 | 2.2 | 5.2 | 5.3 | 4.9 | 9.9 | 11.7 | 12.3 |
| NDF, % | 6.6 | 7.0 | 6.6 | 7.5 | 6.9 | 7.2 | 21.6 | 23.7 | 27.8 |
| Ash, % | 0.96 | 0.80 | 1.0 | 5.75 | 6.00 | 6.0 | 4.3 | 4.1 | 4.2 |
| Starch, % | 59.7 | 60.8 | 60.1 | 1.2 | 0.8 | 0.9 | 4.9 | 2.3 | 2.4 |
| DON, mg/kg | — | — | 2.24 | — | — | — | — | — | 1.62 |
| Zer, mg/kg | — | — | 0.02 | — | — | — | — | — | 0 |
| AfB1, ug/kg | — | — | 0 | — | — | — | — | — | 0 |
| FumB1, mg/kg | — | — | 1.57 | — | — | — | — | — | 6.25 |

Each of the *Bacillus* (Bs) strain combinations was manufactured and provided by Microbial Discovery Group (Franklin, WI). Treatment B comprised Bs strains 86 and 300, while Treatment C comprised Bs strains 86, 300, and 552. Each strain combination was premixed with corn prior to addition to experimental diets. Pigs were fed experimental diets by weight range according to the budgets for each experiment outlined in Table 12.

TABLE 12

Dietary feedstuff and formulation constraints for experimental diets.

| Nutrient | 160-200 lbs | 200-240 lbs | 240-280 lbs |
|---|---|---|---|
| Basemix | R&D DG40L | R&D DG40L | R&D DG40L |
| ID code (JBS United, Inc.) | 30881 | 30881 | 30881 |
| Inclusion rate, lbs/ton | 42 | 40 | 40 |

TABLE 12-continued

Dietary feedstuff and formulation constraints for experimental diets.

| Nutrient | 160-200 lbs | 200-240 lbs | 240-280 lbs |
|---|---|---|---|
| DDGS, % | 30 | 30 | 30 |
| SID Lysine, g/Mcal ME | 2.12 | 1.91 | 1.80 |
| Minimum ratios to SID Lys, % | | | |
| SAA | 57 | 57 | 57 |
| Thr | 63 | 64 | 65 |
| Trp | 17 | 17 | 17 |
| Val | 65 | 65 | 65 |
| Ile | 54 | 54 | 54 |
| P, available, % | 0.24 | 0.22 | 0.20 |
| Ca, % | 0.48 | 0.45 | 0.45 |
| Na, % | 0.22 | 0.21 | 0.21 |

All diets were formulated to be adequate in essential amino acids, available P, Ca, and Na using recommended values. Diets were constructed using corn and soybean meal, and included DDGS at 30% of the diet within each experiment. Diets did not contain supplemental fat.

Diet manufacture and delivery parameters are shown in Table 13. For the 13-F040 and 13-F071 groups, diet components were mixed and delivered to each feeder through an electronic feed mixing, delivery, and recording system. For the 13-F072 group, final experimental diets were mixed in a feed mill and were delivered to each feeder through an electronic feed mixing, delivery, and recording system.

TABLE 13

Formulations of experimental diets.

| | 13-F040 | | 13-F071 & 13-F072 | | |
|---|---|---|---|---|---|
| Ingredients | 200-240 lbs | 240-280 lbs | 160-200 lbs | 200-240 lbs | 240-280 lbs |
| Corn | to 2,000 | to 2,000 | to 2,000 | to 2,000 | to 2,000 |
| Soybean meal, dehulled | 129.2 | 100.7 | 193.1 | 145.6 | 117.4 |
| DDGS | 600.0 | 600.0 | 600.0 | 600.0 | 600.0 |
| Basemix | 40.0 | 40.0 | 42.0 | 40.0 | 40.0 |
| DFM premixes | +/− | +/− | +/− | +/− | +/− |
| Nutrient composition | | | | | |
| ME, kcal/lb | 1,448 | 1,448 | 1,449 | 1,451 | 1,451 |
| Crude protein, % | 16.15 | 15.58 | 18.56 | 17.63 | 17.06 |
| Crude fat, % | 4.54 | 4.57 | 4.32 | 4.36 | 4.38 |
| NDF, % | 11.5 | 11.5 | 11.9 | 11.9 | 12.0 |
| Lysine | | | | | |
| Total, % | 0.78 | 0.74 | 0.85 | 0.78 | 0.74 |
| SID, % | 0.61 | 0.57 | 0.68 | 0.61 | 0.58 |
| SID, g/Mcal ME | 1.91 | 1.80 | 2.12 | 1.91 | 1.80 |
| SID AA/Lys, % | | | | | |
| SAA | 82 | 85 | 78 | 83 | 86 |
| Thr | 77 | 78 | 75 | 78 | 79 |
| Trp | 19 | 18 | 19 | 19 | 19 |
| Ile | 85 | 86 | 83 | 85 | 86 |
| Val | 105 | 107 | 99 | 104 | 106 |
| Phosphorus, % | | | | | |
| Total | 0.49 | 0.48 | 0.47 | 0.46 | 0.46 |
| Bioavailable | 0.27 | 0.27 | 0.27 | 0.26 | 0.26 |
| Phytase, FTU/kg | 100 | 100 | 106 | 100 | 100 |
| Calcium, % | 0.45 | 0.44 | 0.48 | 0.45 | 0.44 |
| Sodium, % | 0.23 | 0.23 | 0.22 | 0.21 | 0.21 |

Each feedstuff was sampled for nutrient and mycotoxin analyses according to standard protocol. Final experimental diets were sampled bi-weekly from a minimum of 5 feeders per dietary treatment and pooled together for each treatment. Feedstuff and experimental diet samples were submitted for the following analyses if deemed necessary: proximate components and minerals, amino acids, and mycotoxins.

Each experiment was statistically analyzed separately from the others, as well as through a meta-analysis, and within each, data from the three experiments were combined using an additional class variable of 'Exp'. Initial data analysis was performed for all metrics for both the individual and combined datasets to determine normality of distribution and outliers (±>3 standard deviations in difference from the grand mean).

The grand means of performance metrics across experiments is shown in Table 14.

TABLE 14

Grand means of performance metrics across experiments.

| Live weights, lbs | Performance metrics | | |
|---|---|---|---|
|  | 13-F040 | 13-F071 | 13-F072 |
| Start | 232.2 | 171.1 | 209.5 |
| Final | 286.6 | 275.8 | 275.5 |
| ADG, lbs | 1.75 | 1.82 | 1.73 |
| ADFI, lbs | 6.47 | 5.49 | 5.68 |
| F/G, lb/lb | 3.73 | 3.03 | 3.28 |
| Carcass weight, lbs | 211.0 | 205.0 | 206.0 |
| Lean, % | 55.6 | 56.4 | 55.9 |
| Carcass yield, % | 74.9 | 75.3 | 75.7 |
| Carcass ADG, lbs | 1.27 | 1.35 | 1.29 |
| Carcass F/G, lb/lb | 5.14 | 4.08 | 4.41 |
| Feed costs, $/lb gain |  |  |  |
| Live Carcass |  |  |  |

Growth performance of pigs fed different DFM combinations in late-finishing is shown in Table 15. Comparison of strain 86 alone and in combination with two other strains in a three strain combination shows that strain 86 alone was significantly improved over the control on average daily gain. Strain 86 alone was trending toward significance with a p=0.057, but significant when starting weight is considered as covariable. Ending weight of strain 86 was not considered significant compared to the control, but was considered significant in consideration of starting weight as a covariable. Carcass weight of strain 86 alone was trending, with p=0.051 but considered significant with starting weight as a co-variable.

Accounting for start weight and days on feed differences across experiments, the effect of DFM addition on average daily gain (Trt P=0.053) was dependent on DFM formulation, as the Bs strain 86 alone increased (P=0.018) ADG 3% over the control, but the 3-strain combination had no effect. Similarly, DFM addition affected feed/gain ratio (Trt P=0.089) in a formulation-dependent manner, with the Bs strain 86 alone reducing (P=0.057) feed/gain ratio 1.5% and the 3-strain formulation having no impact.

FIG. 2 shows a meta-analysis of DFM strain effect on growth performance across three experiments. A total of three (3) separate trials were conducted using DFM strains 86 and 300 in combination, individually or in combination with other *Bacillus* or lactic acid bacteria strains. A universal dose of $7.35 \times 10^4$ CFU/gram was utilized.

As shown in FIG. 2, treatment with DFM strain 86 alone increased gain approximately 3% (P=0.05) and reduced F/G approximately 2% (P=0.06). The combination of DFM strains 86 and 300 in experiment 13-F072 (80% strain 86 and 20% strain 300) was numerically better than DFM strain 86 alone for ADG.

Example 4

Enzymatic Activity Screening

This example describes the use of plate media screening methods to detect enzymatic activity in DFM strains 86, 300, and other related isolates. Enzyme assay media plates were prepared by supplementing tryptic soy agar with between 0.5% and 1% of various substrates, including polysaccharides (corn starch, carboxymethylcellulose, or xylan), proteins (casein), and lipids (tributyrin). *Bacillus* strains of interest (including DFM strains 86 and 300) obtained from fresh overnight cultures were spotted onto plates (5 μL) and incubated at 32° C. for up to 48 hours. For protein and lipid agar plates, zones of clearing around enzyme-producing colonies were visible without further treatment. Polysaccharide-containing plates were stained

TABLE 15

Growth performance of pigs fed different DFM combinations in late-finishing.

| Response criteria[1] | Treatment | | | Pooled SEM | P-value[2] | | Covariable P-value | |
|---|---|---|---|---|---|---|---|---|
|  | Control | Bs86 | 3-strain |  | Trt | Bs86 | StWt | DOF |
| Live weights, lbs |  |  |  |  |  |  |  |  |
| Start | 204.3 | 204.6 | 204.9 | 9.2 | 0.573 | 0.544 | — | <0.001 |
| End | 279.3 | 280.2 | 280.0 | 2.1 | 0.524 | 0.273 | <0.001 | 0.011 |
| ADG, lbs | 1.75 | 1.80 | 1.76 | 0.02 | 0.053 | 0.018 | 0.263 | 0.458 |
| ADFI, lbs | 5.85 | 5.91 | 5.92 | 0.15 | 0.318 | 0.201 | 0.004 | 0.806 |
| F/G, lb/lb | 3.36 | 3.31 | 3.36 | 0.07 | 0.089 | 0.057 | <0.001 | 0.103 |
| Carcass |  |  |  |  |  |  |  |  |
| Wt., lbs | 207.8 | 208.0 | 207.6 | 0.6 | 0.784 | 0.821 | <0.001 | <0.001 |
| ADG, lbs | 1.30 | 1.31 | 1.31 | 0.02 | 0.819 | 0.558 | 0.224 | 0.603 |
| F/G, lb/lb | 4.53 | 4.53 | 4.53 | 0.13 | 0.998 | 0.969 | 0.003 | 0.395 |
| Yield, % | 75.4 | 75.3 | 75.3 | 0.3 | 0.786 | 0.541 | 0.698 | 0.486 |
| Feed cost, $/lb gain[3] |  |  |  |  |  |  |  |  |
| Live | 0.361 | 0.363 | 0.368 | 0.003 | 0.058 | 0.570 | <0.001 | 0.092 |
| Carcass | 0.486 | 0.497 | 0.496 | 0.005 | 0.087 | 0.051 | <0.001 | 0.354 |
| Income, $/pig[4] | 166.27 | 166.38 | 166.05 | 0.51 | 0.784 | 0.821 | <0.001 | <0.001 |
| Income over feed, $/pig | 139.22 | 139.21 | 138.39 | 0.39 | 0.083 | 0.972 | <0.001 | <0.001 |

[1]Data are means from three experiments combined from which all three listed treatments appeared.
[2]Data were analyzed as a randomized complete-block design, including the main effect of treatment, random effects of experiment and replicate within experiment, and covariables start wt and days on feed.
[3]Feed costs were calculated based on the following feedstuff costs: corn, $4.25/bu; soybean meal, $500/ton; DDGS, $225/ton; basemix, $900/ton; and the DFMs were valued at a cost equivalent to $5/treated ton of feed.
[4]Income was calculated as the carcass wt (cwt/pig) multiplied by a base meat price of $80/cwt.

with Gram's iodine for 1 minute to visualize zones of clearing. DFM strains 86 and 300 were both observed to be positive for protease, amylase, and carboxymethylcellulose (CMCase) activity after 48 hours and strong positives on tributyrin agar (lipase) after 72 hours were observed.

As shown in FIG. 3, the *Bacillus* strains have enzymatic activity including but not limited to amylase, carboxymethylcellulose, protease, xylanase and lipase.

Example 5

Substrate Testing Summary

In the instant example, a comparison of DFM strain 86 and DFM strain 300 was performed to determine the variations in substrate utilization. A number of parameters were tested, including enzyme activity, pathogen antimicrobial activity, digestion of DDGS, and tolerance of certain production antibiotics.

A list of carbohydrate and carboxylic acid carbon sources utilized for DFM strain 86 and DFM strain 300 is presented in Table 16.

TABLE 16

Utilized Carbohydrate and Carboxylic Acid Carbon Sources.

|  | DFM strain 86 | DFM strain 300 |
|---|---|---|
| 2-deoxy-D-ribose | x | x |
| 3-0-b-galactopyranosyl-d-arabinose | x | x |
| 5-keto-d-gluconic aid | x | x |
| a-D-glucose | x | x |
| a-D-lactose |  | x |
| Amydalin | x | x |
| Arbutin | x | x |
| b-methyl-d-glucoside | x | x |
| Bromosuccinic acid | x | x |
| Citric acid | x |  |
| D,L-a-glycerol phosphate | x | x |
| D,L-Malic acid | x | x |
| D-arabinose | x | x |
| D-cellobiose | x | x |
| Dextrin |  | x |
| D-fructose | x | x |
| D-fructose-6-phosphate | x | x |
| D-galacturonic acid | x | x |
| D-glucosamine | x | x |
| D-glucuronic acid | x | x |
| D-mannitol | x | x |
| D-mannose | x | x |
| D-melibiose | x |  |
| D-Psicose | x | x |
| D-raffinose | x |  |
| D-ribose | x | x |
| D-saccharic acid | x |  |
| D-sorbitol | x | x |
| D-tagatose | x | x |
| D-trehalose | x | x |
| D-xylose | x | x |
| Fumaric acid | x | x |
| Gelatin | x | x |
| Gentiobiose | x | x |
| Glycerol |  | x |
| Glycogen | x | x |
| L-arabinose | x | x |
| L-lactic acid | x | x |
| L-lyxose | x | x |
| L-Malic acid | x | x |
| L-rhamnose |  | x |
| Maltose |  | x |
| Maltotriose |  | x |
| Methylpyruvate | x | x |
| Mono-methylsuccinate |  | x |
| Mucic acid | x |  |
| N-acetyl-d-glucosamine |  | x |

TABLE 16-continued

Utilized Carbohydrate and Carboxylic Acid Carbon Sources.

|  | DFM strain 86 | DFM strain 300 |
|---|---|---|
| Palatinose | x | x |
| Pectin | x | x |
| Pyruvic acid | x | x |
| Salicin | x | x |
| Stachyose | x |  |
| Starch | x | x |
| Succinic acid |  | x |
| Sucrose | x | x |
| Thymidine |  | x |
| Turanose | x | x |
| Uridine | x | x |

A list of phosphate and sulfur sources utilized by DFM strain 86 and DFM strain 300 is presented in Table 17.

TABLE 17

Utilized Phosphate and Sulfur Sources.

|  | DFM strain 86 | DFM strain 300 |
|---|---|---|
| Adenosine 2-monophosphate |  | x |
| Adenosine 2,3 cyclic monophosphate | x | x |
| Adenosine 5 monophosphate |  | x |
| Adenosinee 3,5 cyclic monophosphate | x | x |
| B-glycerol phosphate |  | x |
| Cysteamine-S-Phosphate | x | x |
| Cytidine 2 monophosphate |  | x |
| Cytidine 2,3 cyclic monophosphate |  | x |
| Cytidine 3 monophosphate |  | x |
| Cytidine 5 monophosphate |  | x |
| D,L-lipoamide | x | x |
| D-glucosamine 6 phosphate |  | x |
| D-glucose-6-phosphate |  | x |
| Dithiophosphate | x | x |
| D-l-a-glycerol phosphate |  | x |
| D-Mannose-1-phosphate | x |  |
| D-mannose-6-phosphate |  | x |
| Guanosine 2 monophosphate |  | x |
| Inositol hexaphosphate (phytate) | x | x |
| L-cysteine |  | x |
| O-phospho-L-serine |  | x |
| Phosphate | x | x |
| Phosphoenol pyruvate | x | x |
| Phospho-glycolic acid |  | x |
| Phosphoryl choline |  | x |
| Thiophosphate | x | x |
| Thiosulfate | x | x |

A list of unique nutritional utilization observed for DFM strain 86 and DFM strain 300 is presented in Table 18.

TABLE 18

Unique Nutritional Utilization.

|  | DFM strain 86 | DFM strain 300 |
|---|---|---|
| Menadione (Vitamin K precursor) | x | x |
| Tween 80 (Polyoxyethylene sorbitan monooleate) | x | x |
| Tween 60 (Polyoxyethylene sorbitan monostearate) | x | x |
| Tween 40 (Polyoxyethylene sorbitan monopalmitate) |  | x |
| 2-deoxyuridine |  | x |
| 2-deoxycytidine |  | x |
| Gultathione |  | x |
| (5) 4 amino-imidazole-4(5)-caroxamide |  | x |

TABLE 18-continued

Unique Nutritional Utilization.

|  | DFM strain 86 | DFM strain 300 |
|---|---|---|
| Thymidine | x | x |
| m-inositol | x | x |
| D-alanine |  | x |
| D-asparagine |  | x |
| D-glutamatic acid |  | x |
| D-aspartic acid | x | x |

As shown in Tables 16-18, both DFM strains appeared to utilize an extremely wide array of amino acids and dipeptide bonds. DFM strain 86 and DFM strain 300 utilized 123 and 149 amino acids and dipeptide bonds, respectively. DFM strain 300 does appear to be more versatile, as this strain used 26 more amino acids and dipeptide bonds than DFM strain 86, including several D-amino acids which are not often found in microbes.

Both strains use a very wide variety of carbon sources, but DFM strain 86 appears to use a number of α-galactosides such as meliobiose, stachyose and raffinose. Furthermore, DFM strain 86 is able to utilize maltose and maltotriose, which was not observed for DFM strain 300.

In addition, DFM strain 86 and strain 300 are both able to use a variety of phosphate and sulfur sources, including phytate. Both strains are able to use the phytate breakdown product m-inositol. DFM strain 300 appears to be broader regarding the array of phosphate compound utilization.

Finally, DFM strain 86 and strain 300 are both able to use a variety of Tween compounds, which is indicative of the ability to breakdown long chain fatty acids such as palmitic, oleic and stearic acids. Other data suggest that the observed activities on long chain fatty acids may differ depending on the presence in an aerobic or an anaerobic environment.

Example 6

Antimicrobial Screening with the Cross-Streak Method and Stab-Streak Method

This example describes the use of the cross-streak plating method and the stab-streak method to screen DFM strains of interest, including DFM strain 86 and DFM strain 300, for antimicrobial activity against a range of other organisms.

Bacillus strains of interest (including DFM strain 86 and DFM strain 300) obtained from frozen glycerol stocks were inoculated in a single 1 cm wide streak (cross-streak) across the center of plates of a suitable nutrient medium. Tryptic soy agar was used when screening for activity against most non-fastidious organisms (for screening against Clostridium strains, reinforced clostridial agar was found to support satisfactory growth of the Bacillus strains as well as the Clostridium strains tested). Bacillus-streaked plates were incubated for 24 hours at 32° C., until a heavy streak of growth was present.

Figure 4A:
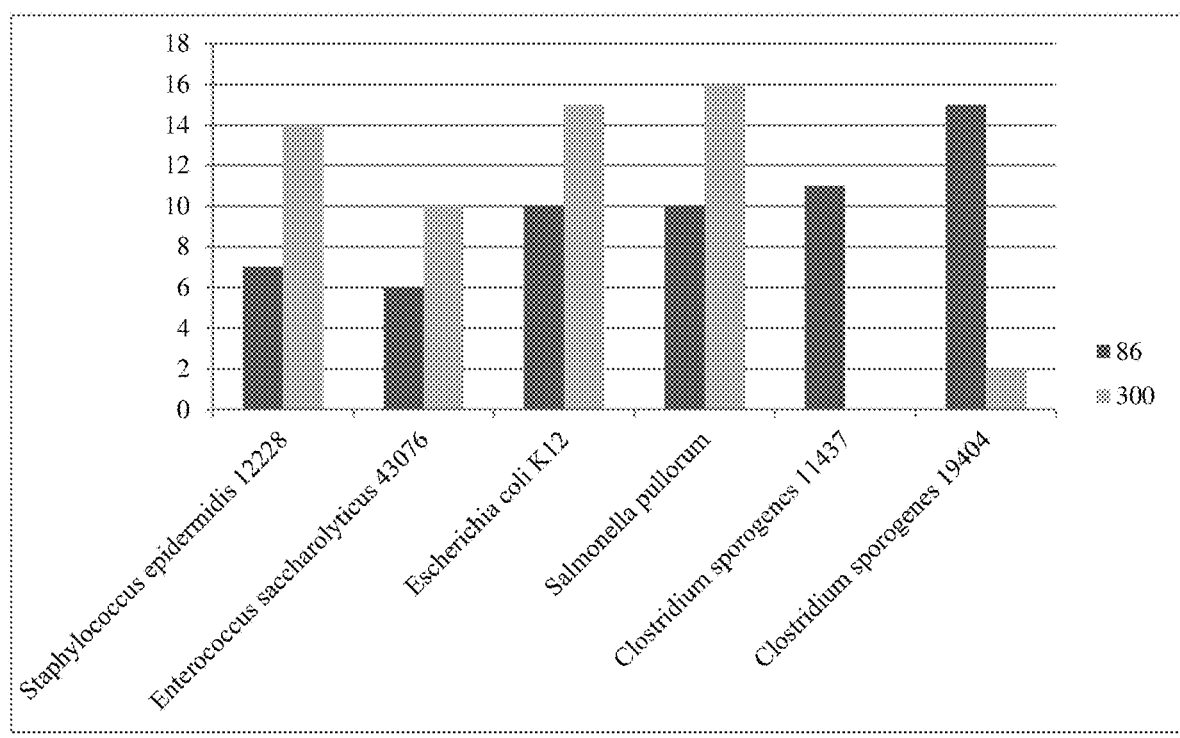
FIGS. 4A and B show antimicrobial activities against various bacterial strains for *Bacillus* strains 86 and 300.

Organisms to be tested for susceptibility, such as Clostridium, Salmonella, and E. coli (from frozen glycerol stocks) were streaked in lines perpendicular to the Bacillus streak and incubated for 24 hours under their optimal growth conditions. After incubation, plates were examined for zones of inhibition around the initial Bacillus streak, and the width of each zone of inhibition was measured. As shown in FIG. 4A, DFM strains 86 and 300 produce antimicrobial substances which inhibit pathogenic organisms including, but not limited to, Staphylococcus, Enterococcus, E. coli, Salmonella, and Clostridium. As shown in FIG. 4B, DFM strains 86 and 300 produce antimicrobial substances which inhibit additional pathogenic organisms. This example describes the stab streak plating method used to screen the DFM strains of interest, including DFM strain 86 and DFM strain 300, for antimicrobial activity against other organisms. Bacillus strains of interest (including DFM strain 86 and DFM strain 300) obtained from frozen glycerol stocks were inoculated by puncturing the center of a nutrient rich medium plate with an inoculum needle. Brain heart infusion agar was utilized for the simultaneous growth of both Bacillus species and anaerobic or microaerophilic microorganisms (Clostridium perfringens, Clostridium difficile, Campylobacter jejuni). Bacillus inoculated plates were incubated for 16-24 hours at 37° C. depending on the colony size and proliferation tendencies of each Bacillus strain. Once incubation had concluded, lids were removed and plates were inverted over 1 ml of concentrated chloroform for 15 minutes to kill the Bacillus colonies. The chloroform was contained via an absorbent material which also served as the platform for the plates to rest upon. After 15 minutes, the plates were placed face up in a biological safety cabinet in order to allow excess chloroform to evaporate while maintaining plate sterility for an additional 15 minutes. BHI (0.7%) agar was prepared in 5 ml aliquots and utilized for top agar overlays of recently killed Bacillus strains. These tubes were inoculated with 100 µl of a pathogenic liquid media suspension, vortexed, applied topically to plates inoculated with Bacillus, and allowed to solidify. Plates were then inverted and incubated under varying pathogen specific growth conditions (37° C. with atmospheric growth paks provided by BD). After incubation, zones of inhibition were observed around the Bacillus colonies and measured in mm for relative quantitative purposes. As shown in FIG. 4B, strains 86 and 300 produce antimicrobial substances which inhibit pathogenic organisms including, but not limited to, Staphylococcus, Enterococcus, E. coli, Salmonella, Clostridium, Vibrio, and Campylobacter.

Example 7

Antibiotic Susceptibility and Tolerance Screening

Bacillus strains of interest (including DFM strains 86 and 300) from 24 hour-old cultures in tryptic soy broth were combined with molten Muller-Hinton agar II, poured into petri plates, and allowed to solidify. After plates containing Bacillus were hardened, an Etest strip (Biomerieux) containing a concentration gradient of an antibiotic was placed on the surface of each Bacillus-inoculated plate. After incubation for 24 hours at 32° C., plates were covered with a uniform lawn of bacterial growth, with zones of inhibition surrounding the Etest strips. A minimum inhibitory concentration of each antibiotic was determined by reading the test strips according to the Etest protocol.

As shown in FIG. 5, DFM strains 86 and 300 were tested for antibiotic sensitivity using various antibiotics and they are susceptible to a number of antibiotics.

Example 8

Antibiotic Susceptibility and Tolerance Screening

Antibiotic media plates were prepared with five antibiotics of agricultural importance at either 1×, ¹⁄₁₀×, or ¹⁄₁₀₀× their recommended dose rates (Pulmotil™, 181 g/ton; BMD™, 30 g/ton; Stafac™, 10 g/ton; Tylan™, 20 g/ton, chlortetracycline (CTC)+Denagard™, 400 g/ton CTC+35 g/ton Denagard™). Bacillus isolates were screened by spotting 5 µl of fresh overnight culture onto antibiotic media plates and incubating for 24 hours. The presence or absence of colony growth was noted and used as a rough measure of antibiotic susceptibility for screening purposes.

As shown in FIG. 6, the presence of CTC+Denagard™ at the recommended dose, BMD™ at 1/10 the recommended dose, and Stafac™ at 1/10 the recommended dose caused minimal sized zones of inhibition against DFM strains 86 and 300. Therefore, these antibiotics should not interfere with the growth of DFM strains 86 and 300. These strains were also tolerant to Formaldehyde (Sal CURB, Termin-8) and minimal inhibition was observed with Carbadox™ (113.4 g/ton).

Example 9

Distilled Grain Minimal Medium Screening

To screen *Bacillus* isolates (including DFM strains 86 and 300) for their ability to utilize dried distiller's grains with solubles (DDGS) as a nutritional source, a minimal medium was prepared with DDGS as the main carbon and nitrogen source: 0.023% $K_2HPO_4$, 0.01% $MgSO_4*7H_2O$, 0.1% trace element stock, 0.05% yeast extract, 0.0002% $MnCl_2*4H_2O$, 0.002% $FeCl_3$, and 0.2% DDGS. Sterile 10 ml tubes of this medium were inoculated with these *Bacillus* strains, incubated 72 hours at 25° C., and scored for growth. Tubes with strong growth were used for 10× serial dilutions in the same medium, incubated for 24 hours at 25° C., and scored again for growth, with turbidity at later dilution steps serving as a rough indicator of initial cell count.

Figures 7, 8:
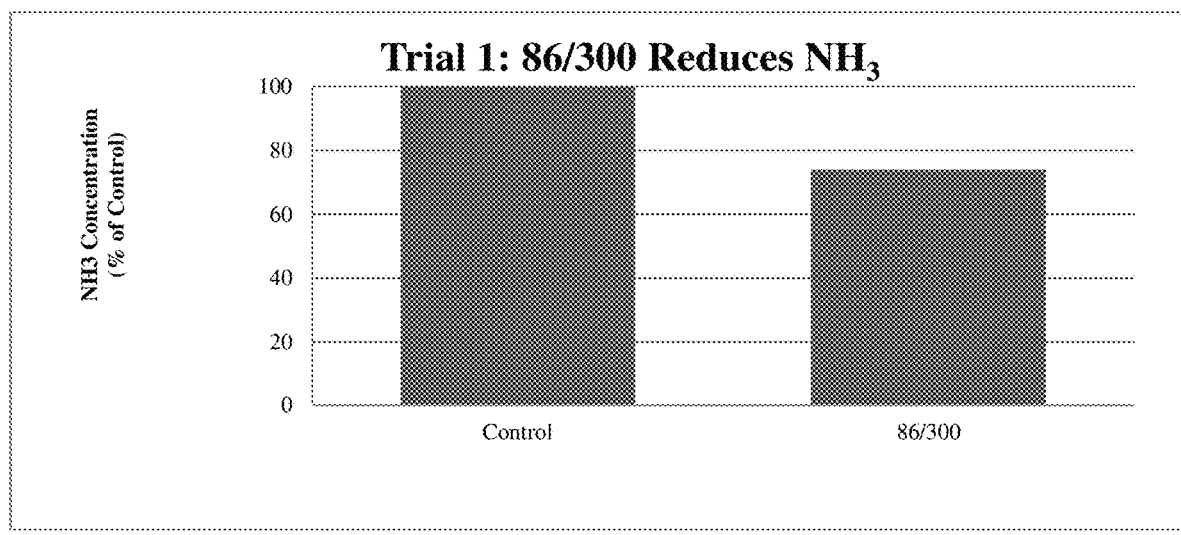
FIG. 7 shows the ability of *Bacillus* strains 86 and 300 to utilize dried distillers grain solubles.
FIGS. 8 and 9 show the ability of *Bacillus* strains 86 and 300 to reduce pH and free ammonia in manure.

As shown in FIG. 7, with DDGS as a sole carbon source, both DFM strains 86 and 300 exhibited ability to grow and digest DDGS. DFM strain 86 was among the strains with the highest growth, with turbidity in the $10^{-8}$ dilution tube after the secondary screening. DFM strain 300 showed moderate growth at 72 hours with turbidity in the $10^{-4}$ dilution tube after the secondary screening.

Example 10

Evaluation of DFM Strains Relative to Manure pH

This example describes the use of *Bacillus* DFM strains 86 and 300 to decrease the pH and free ammonia of liquid hog manure in vitro. Liquid manure collected from deep pit systems in several swine production facilities was divided into 50 ml portions and inoculated with freeze-dried cultures of DFM strains 86, 300. All freeze-dried cultures were enumerated by the plate count method, and inocula were prepared by suspending spores in a solution of 0.1% peptone.

Inoculated manure sample tubes were capped loosely and incubated at 25° C. without shaking under stagnant, non-aerated conditions for a minimum of 24 hours. At 24 hours (and in some cases, at additional 24-hour intervals afterward), the pH was determined using a pH electrode and total ammonia nitrogen (TAN) was determined by diluting a portion of the manure sample 1/20 in Millipore water for analysis with the Hach ISENH4 ammonium ion-sensitive electrode. All measurements were taken at 25° C. The fraction and concentration of free ammonia were derived from the pH, temperature, and TAN of the sample.

Figure 9:
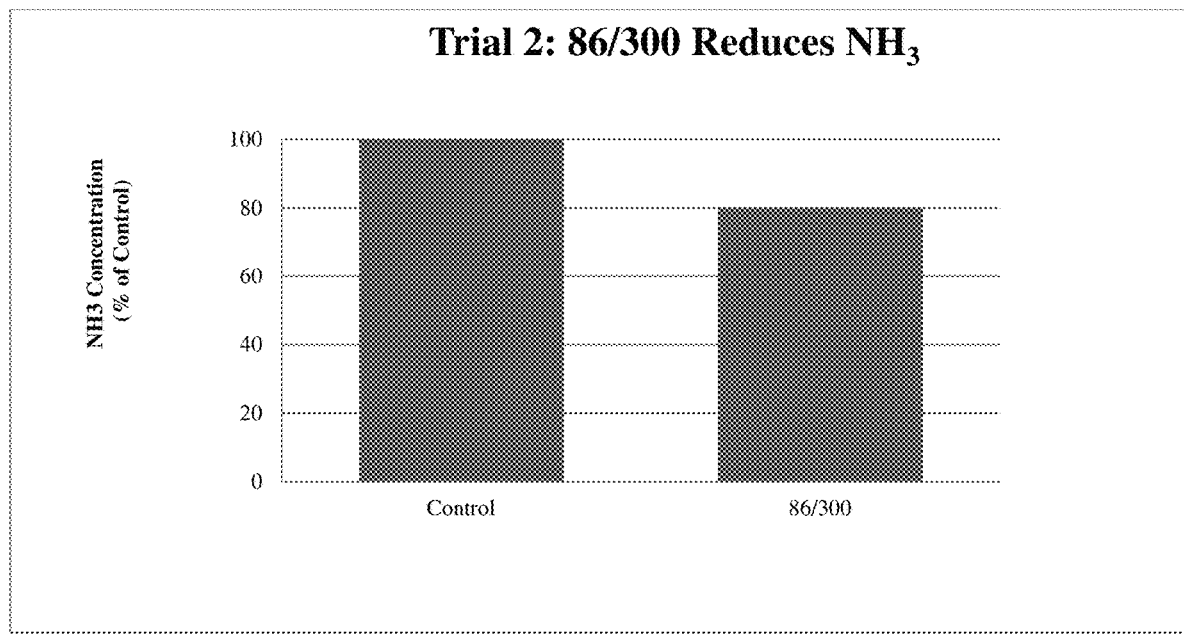

As shown in FIGS. 8 and 9, treatment with strain blends containing DFM strains 86 and 300 was associated with lowered pH and lowered free ammonia in multiple trials. The size of the effect varied between manure types.

Example 11

Digestion of Long Chain Fatty Acids by DFM Strains 86, 300

To determine whether DFM strains 86 and 300 were able to utilize long-chain fatty acids as an energy source, minimal media were prepared with either no carbon source, or oleic, palmitic, or stearic acid as the sole carbon source (2× mineral stock, 10 mM phosphate buffer, and 0.1% fatty acid, adjusted to pH 7.0, 7.5, 8.0.) DFM strains 86 and 300 obtained from frozen glycerol stocks were inoculated into each type of minimal medium and incubated at 37° C. for 48 hours with or without shaking. Growth was determined by measuring optical density at 600 nm with a spectrophotometer.

Figure 10:
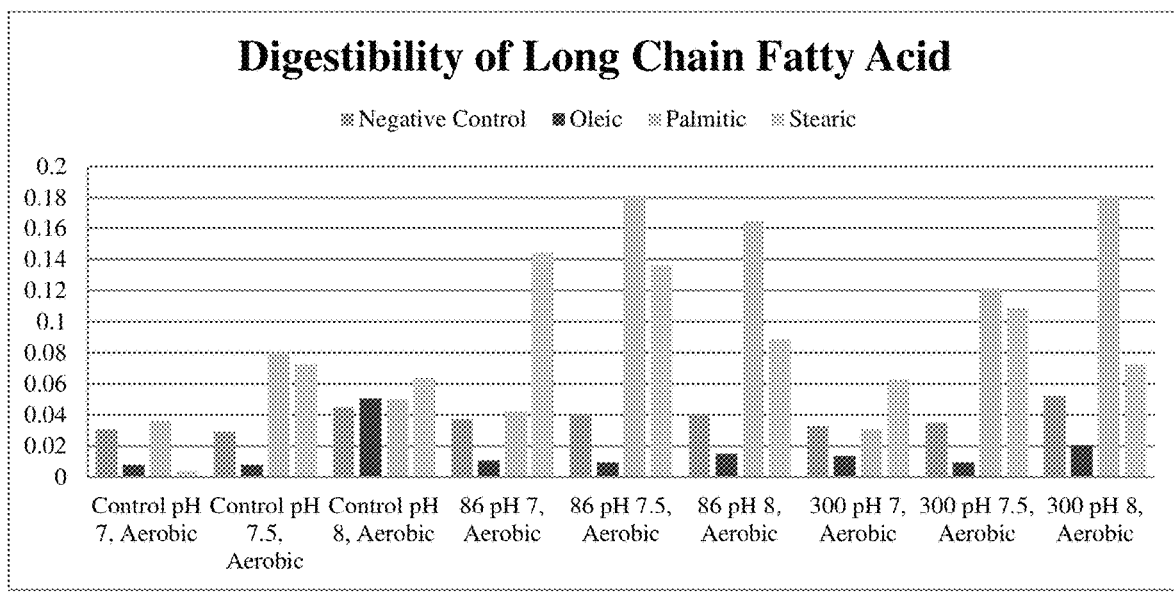
FIGS. 10 and 11 show the ability of *Bacillus* strains 86 and 300 to digest long chain fatty acids (the four legends at the top of the graphs from left to right correspond to the bars from left to right in each group of four bars).
Figure 11:
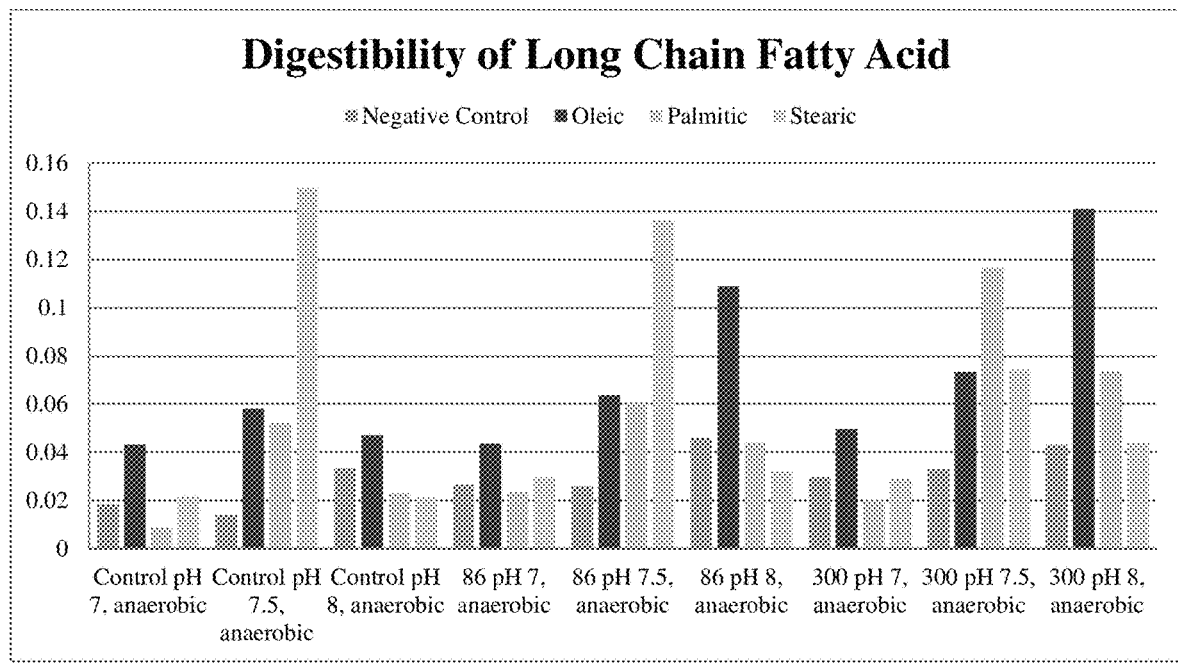

As shown in FIG. 10, under aerobic conditions, DFM strain 86 showed substantial growth (change in $A_{600}$>0.1) with palmitic acid and stearic acid at different pHs and DFM strain 300 showed substantial growth with palmitic acid and stearic acid at pHs of 7.5 and 8.0. As shown in FIG. 11, under anaerobic conditions, DFM strain 86 showed substantial growth (change in $A_{600}$>0.1) with palmitic acid and oleic acid at pHs of 7.0, 7.5 and 8.0 and DFM strain 300 showed substantial growth with palmitic acid and oleic acid at pHs of 7.5 and 8.0.

Example 12

RAPD (Randomly Amplified Polymorphic DNA) Analysis of DFM Strains 86 and 300

Figure 12:
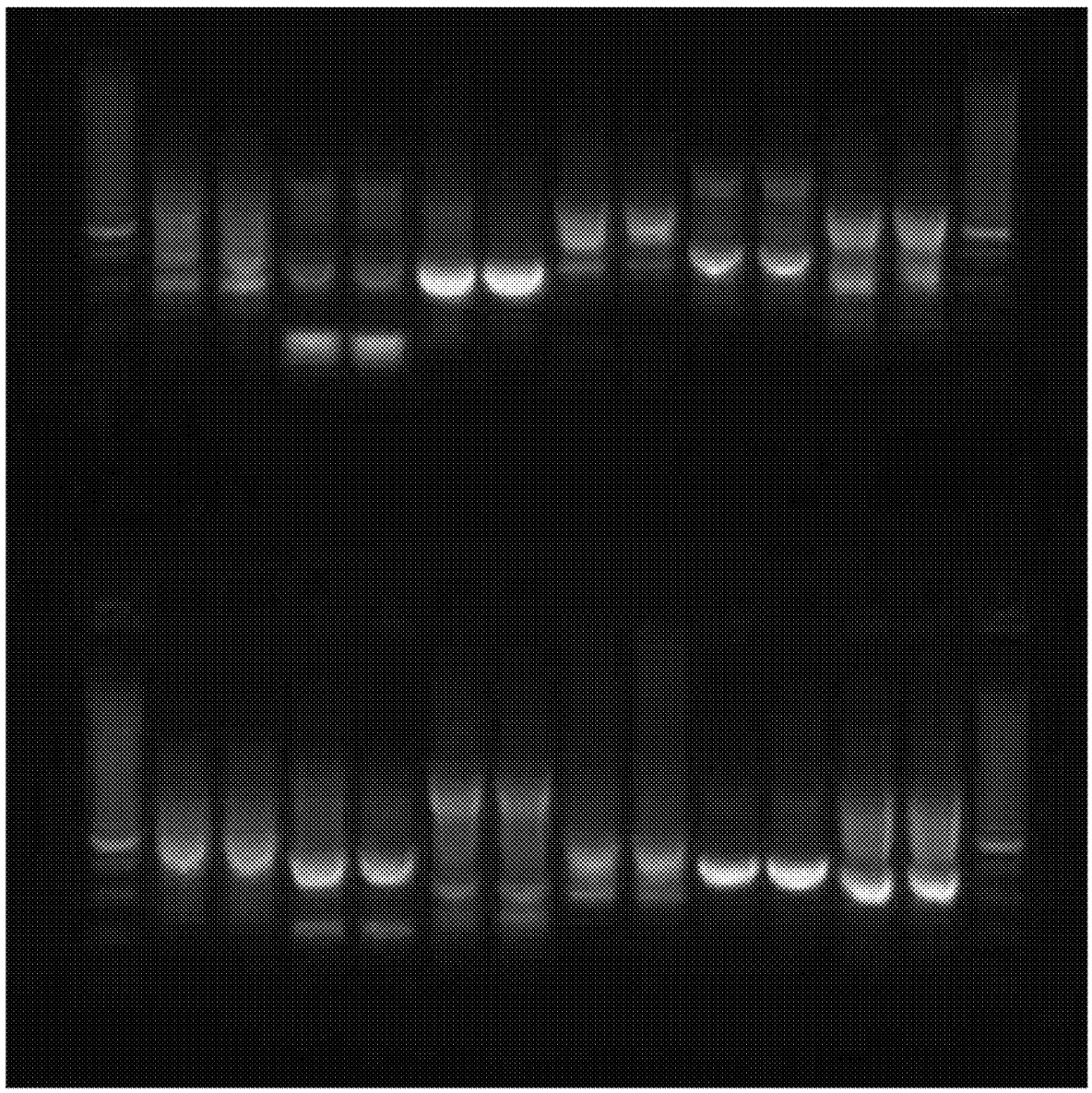
FIG. 12 shows a photograph of a gel displaying RAPD PCR profiles (Primer 1 to 6) for *Bacillus* strains 86 and 300. Strain 86 has the top profile and strain 300 has the bottom profile. The leftmost and rightmost lanes have markers and each set of two consecutive lanes between the markers corresponds to Primers 1 to 6 going from left to right.

In order to obtain genetic barcodes or "fingerprints" of the *Bacillus* strains collected in the strain library, RAPD (randomly amplified polymorphic DNA) analysis was performed with each strain from the *Bacillus* library. Each isolate was cultured overnight in 10 ml of tryptic soy broth at 32° C. Thereafter, DNA was extracted from these cultures using Qiagen's DNeasy Mini kit, following the protocol provided for Gram-positive bacteria. A GE Healthcare Illustra Ready-To Go RAPD kit was used to perform RAPD-PCR with each DNA sample to amplify genetic fragments of arbitrary length. PCR products were separated via gel electrophoresis, and banding patterns were detected and matched using BioNumerics software. As shown in FIG. 12, although some bands were observed to be shared by the DFM strains, a common DNA fingerprint was not observed between the two DFM strains. Therefore, FIG. 12 demonstrates that DFM Strains 86 and 300 are different strains, each having a unique DNA fingerprint.

Example 13

Culture Growth of DFM Strains 86 and 300

In the instant example, growth of DFM strains 86 and 300 can be achieved by culturing. On a small scale, TSB or nutrient broth can be utilized to culture DFM strains 86 and 300.

Agar medium may be produced using 23 grams Nutrient Agar (BD 213000) and 1000 ml of DI water, followed by autoclaving at 121° C. Broth medium may be produced using 8.0 grams of Nutrient Broth (BD 234000) and 1000 ml of DI water, followed by autoclaving at 121° C.

For culturing DFM strain 86, a pure culture of DFM strain 86 was streaked on a nutrient agar plate and allowed to grow for 48 hours at 32° C. Thereafter, a single colony was inoculated in nutrient broth medium. The single colony was incubated at 37° C. and at 230-240 rpm, for 16 to 24 hours. Finally, the culture was streaked on a nutrient agar plate to check morphology.

For culturing DFM strain 300, a pure culture of DFM strain 300 was streaked on a nutrient agar plate and allowed to grow for 48 hours at 32° C. Thereafter, a single colony was inoculated in nutrient broth medium. The single colony was incubated at 37° C. and at 230-240 rpm, for 16 to 24 hours. Finally, the culture was streaked on a nutrient agar plate to check morphology.

Example 14

Growth Performance Responses to Varying Strategies of Utilizing DFM in Broilers

The objective of the instant example was to determine the response in weight gain, caloric efficiency, and survivability of broiler chickens to multiple utilization strategies of a DFM. The effect of selected DFM combinations on increased weight gain, reduced feed conversion ratio, and improved survival of broiler chickens reared to 7 weeks (49 days) of age was investigated in which growth and carcass data was analyzed using a randomized complete-block design, live weight (by pen) as the replication factor, and 10 replicates.

For this investigation, a total of 60 pens (6×6 ft, 35 ft²/pen—subtracting 1 sq ft for feeder space) were utilized, with a group size of 35 birds per pen. The pens were equipped with a dry tube feeder (30-lb feed capacity) with a total feeder space of 50 in. (1.7 in./bird) and 5 nipple drinkers/pen (7 birds/nipple).

Approximately 2100 hatch rooster chickens (Cobb 500 genetics) were evaluated. The start weight of the chickens was about 40 grams, and the end weight of the chickens was about 3.2 kg.

In the investigation, the chickens were divided into six groups as shown in Table 19:

TABLE 19

Experimental Treatment Groups

| Treatment Group | Experimental Treatment |
|---|---|
| A | Corn-SBM-5% Dried Distillers Grain Solubles (DDGS; Positive Control) |
| B | As A + 7.35 × 10⁴ CFU/g (0.15 lbs/ton) MDG.DFM in starter phase only |
| C | As A + 7.35 × 10⁴ CFU/g (0.15 lbs/ton) MDG.DFM in starter & grower phases only |
| D | As A + 7.35 × 10⁴ CFU/g (0.15 lbs/ton) MDG.DFM continuously |
| E | As A + 5.50 × 10⁴ CFU/g (0.1125 lbs/ton) MDG.DFM continuously |
| F | As A + 7.35 × 10⁴ CFU/g (0.224 lbs/ton) MDG.DFM-v2 continuously |

MDG.DFM denotes 80% strain 86 and 20% strain 300; MDG.DMF-v2 denotes 50% strain 86 and 50% strain 300 (Microbial Discovery Group, Franklin, WI).

Experimental procedures were as follows:

Animal care protocol: Care was provided following an approved Animal Use Protocol. Environmental conditions were monitored 3 times daily. Age appropriate temperature was provided and regulated by a Rodem Plantium Junior. Heat was provided with multiple force draft heaters. Houses were tunnel ventilated with cool pads on one end and 3-60 inch fans on the other end.

Allotment of animals to the experiment: Birds were assigned to pen based on day old chick weight. Initial pen weight of all replicate pens had a maximum of range of 30 grams. Pens were then randomly allotted to dietary treatment from within replicate and immediately started on the study. Pens remained on dietary treatments until the end of the experiment.

Measurements:
 Live performance:
  Total pen weights—start, wk 2, wk 4, wk 6, & wk 7 post-hatch.
  Feed disappearance—wk 2, wk 4, wk 6, & wk 7 post-hatch.
  Feed/gain ratio was adjusted for mortality by the following equation:

$$\text{Total feed consumed}/(\text{pen weight gain}+\text{mortality weight}).$$

Caloric efficiency (kcal/lb gain):—wk 2, wk 4, wk 6, & wk 7 post-hatch.
  Morbidity and mortality.
 Carcass performance: A subset of each replicate-pen was processed for the determination of carcass, fat pad, and breast meat yield. Six broilers per replicate pen were randomly selected for yield determination.

Experimental Diet Formulation:

Feedstuffs were: Corn—yellow-dent, soybean meal, corn low-oil DDGS, and porcine meat and bone meal (Producers Cooperative, Bryan, TX) and fat was poultry fat (Griffin Industries).

Experimental test materials: MDG.DFM (80% strain 86 and 20% strain 300) 9.8×10⁸ CFU/g; MDG.DFM-v2 (50% strain 86 and 50% strain 300) 6.55×10⁸ CFU/g.

Experimental diet specifications: Four dietary phases—wk 1-2, wk 3-4, wk 5-6, wk 7. The control diet contained at least 2% supplemental fat (poultry fat), 5% DDGS, and 5% meat-and-bone meal. All diets were formulated to be adequate in SID Lys (%, NRC, 1994) and the other essential AA, available P, and Ca. The test materials were supplemented to the final diets at the expense of corn (Table 20). Diet components were mixed in a horizontal mixer.

Each diet was pelleted at 185° F. following 30 s of conditioning. The diets for Wk 1-2 were crumbled following pelleting. In the starter phase the pellet stability of the DFM formulation was determined. The samples were obtained as follows and sent for analysis: A 2-lb sample of Mash was obtained at the start and 5 samples (1-lb per sample) of pelleted feed were obtained during the course of each pelleting run for each DFM-containing treatment. Samples of pelleted feed were collected following a brief acclimation in each new pelleting run and 1.0 lb from each 2.0 lb sample combined to form a pooled sample for each treatment. Pelleted feed samples were allowed to cool to room temperature before they were sealed for shipping. Both Mash & Pelleted feed samples were sent for analysis.

Diet sampling: Each feedstuff was sampled for nutrient and mycotoxin analyses at each point of manufacturing of experimental diets, and final experimental diets were sampled.

Statistical Procedures were carried out as follows: Prior to analysis, all data was checked for outliers. Any observation >3 standard deviations in difference from the grand mean for that metric was removed from the dataset. Cumulative body weight, growth, carcass, and economic performance were analyzed as a RCBD with six (6) treatments and 10 replicates. Morbidity, mortality, and other health-related metrics were analyzed as non-parametric data. Data were subjected to a one-way ANOVA and separated using Fisher's LSD.

Dietary formulations for experimental diets are shown in Table 20.

TABLE 20

Dietary formulations for experimental diets.

| Feed Composition (%) | Starter | Grower | Finisher | Finisher II |
|---|---|---|---|---|
| Corn | 58.306 | 63.228 | 67.590 | 71.277 |
| Soybean Meal | 27.005 | 23.093 | 18.759 | 16.369 |
| DL - Methionine | 0.263 | .250 | .165 | .159 |
| Lysine HCL | 0.265 | .233 | .202 | .248 |
| Fat, Blended | 2.705 | 2.710 | 3.131 | 2.238 |
| Limestone | .675 | .639 | .629 | .630 |
| Biofos 16/21% | .047 | N/A | N/A | N/A |
| Salt | .322 | .239 | .141 | .105 |
| Sodium Bicarbonate | .100 | .228 | .369 | .424 |
| Trace Minerals | .050 | .050 | .050 | .050 |
| Vitamins | .250 | .250 | .250 | .250 |
| LO - DDGS | 5.000 | 5.000 | 5.000 | 5.000 |
| MBM | 5.000 | 4.069 | 3.702 | 3.237 |
| Phytase | .013 | .013 | .012 | .013 |

Results are shown in following Tables 21-30 based on Treatments A-F of Table 19, summarized as below:

| TRT | TREATMENT |
|---|---|
| A | Control |
| B | C + 7.35 × $10^4$ MDGDFM starter only |
| C | C + 7.35 × $10^4$ MDGDFM starter and grower only |
| D | C + 7.35 × $10^4$ MDGDFM continuously |
| E | C + 5.50 × $10^4$ MDGDFM continuously |
| F | C + 7.35 × $10^4$ MDGDFM-v2 continuously |

TABLE 21

Body weight of male broilers fed different DFMs.

| TRT | DAY 0 (g) | DAY 14 (g) | DAY 28 (kg) | DAY 42 (kg) | DAY 48 (kg) |
|---|---|---|---|---|---|
| A | 41.8 | 366.0 ± 3.1 | 1.432 ± $0.011^b$ | 2.682 ± $0.053^b$ | 3.057 ± $0.079^b$ |
| B | 42.0 | | 1.468 ± $0.015^a$ | 2.802 ± $0.059^a$ | 3.215 ± $0.097^{ab}$ |
| C | 42.0 | | | 2.749 ± $0.048^{ab}$ | 3.173 ± $0.088^{ab}$ |
| D | 42.1 | 370.2 ± 2.5 | 1.462 ± $0.010^a$ | 2.840 ± $0.051^a$ | 3.297 ± $0.072^a$ |
| E | 41.8 | 365.4 ± 3.3 | 1.453 ± $0.009^{ab}$ | 2.707 ± $0.042^b$ | 3.075 ± $0.080^b$ |
| F | 41.8 | 368.9 ± 4.9 | 1.460 ± $0.013^{ab}$ | 2.815 ± $0.055^a$ | 3.279 ± $0.096^a$ |
| Pooled SEM | 0.1 | 0.002 | 0.005 | 0.022 | 0.033 |
| Pooled CV | 1.1 | 3.4 | 2.8 | 6.2 | 7.8 |

$^{a,b}$Means with different groupings differ significantly at P ≤ 0.05.

For D14 body weight, no significant differences were observed.

For D28 body weight, treatments B and D showed significantly higher average body weights when compared to the control diet with all remaining treatments being intermediate.

For D42 body weight, treatments B, D, and F had significantly higher average body weight when compared to the control and treatment E, with treatment C being intermediate.

On D48, treatments D and F yielded higher body weights when compared to the control diet with all remaining treatments being intermediate.

TABLE 22

Feed consumed (g/bird/day) of male broilers fed different DFMs.

| TRT | STARTER | GROWER | FINISHER | FINISHER II |
|---|---|---|---|---|
| A | 30.1 ± 0.3 | 116.7 ± $1.6^b$ | 178.0 ± $4.2^b$ | 142.1 ± $7.7^b$ |
| B | | 118.4 ± $1.3^{ab}$ | 185.2 ± $5.0^{ab}$ | 151.3 ± $9.0^{ab}$ |
| C | | | 181.5 ± $3.7^{ab}$ | 146.5 ± $8.0^b$ |
| D | 30.1 ± 0.2 | 118.9 ± $1.0^{ab}$ | 189.5 ± $3.4^a$ | 162.4 ± $6.3^a$ |
| E | 30.2 ± 0.3 | 118.6 ± $1.3^{ab}$ | 180.1 ± $3.3^b$ | 139.3 ± $7.9^b$ |
| F | 29.9 ± 0.3 | 120.4 ± $1.2^a$ | 186.3 ± $4.2^{ab}$ | 163.6 ± $8.6^a$ |
| Pooled SEM | 0.1 | 0.5 | 1.7 | 3.3 |
| Pooled CV | 3.1 | 3.7 | 6.8 | 12.8 |

$^{a,b}$Means with different groupings differ significantly at P ≤ 0.05.

For feed consumed during the starter phase, no significant differences were observed.

During the grower phase, treatment F consumed the most feed per bird, which was significantly higher than the control diet. All other treatments were intermediate.

For feed consumed during the finisher phase, treatment D had the highest feed consumption rate out of all treatments and was significantly higher than the control and treatment E diets with all remaining diets being intermediate.

During the finisher II phase, treatments D and F had the highest feed consumption rates which were significantly higher than the control, treatment C and E diets with treatment B remaining intermediate.

For cumulative FCR on day 0-28, broilers fed the treatment B diet had significantly improved cumulative FCR compared to the control and treatment F fed broilers with all other treatments being intermediate.

For cumulative FCR of broilers fed different DFMs on day 0-42, treatment D had a significantly lower FCR when compared to the control diet with all other treatments remaining intermediate.

Cumulative FCR of broilers fed different DFMs on day 0-48 resulted in no significant differences observed.

TABLE 23

Feed consumed (g/bird/day) of male broilers fed different DFMs.

| TRT | TREATMENT | Day 1-28 | Day 1-42 | Day 1-48 |
|---|---|---|---|---|
| A | Control | 73.2 ± 0.9 | 107.8 ± 1.9 | 111.4 ± 2.5 |
| B | C + 7.35 × $10^4$ MDGDFM starter only | 73.5 ± 0.8 | 109.6 ± 2.0 | 112.9 ± 3.0 |
| C | C + 7.35 × $10^4$ MDGDFM starter and grower only | | 109.6 ± 1.7 | 110.8 ± 2.7 |
| D | C + 7.35 × $10^4$ MDGDFM continuously | 73.7 ± 0.7 | 111.2 ± 1.6 | 114.9 ± 2.4 |
| E | C + 5.50 × $10^4$ MDGDFM continuously | 74.2 ± 0.8 | 109.1 ± 1.3 | 111.9 ± 2.2 |
| F | C + 7.35 × $10^4$ MDGDFM-v2 continuously | 74.9 ± 0.7 | 111.3 ± 1.8 | 116.7 ± 2.7 |
| | Pooled SEM | 0.3 | 0.7 | 1.1 |
| | Pooled CV | 3.7 | 4.9 | 7.0 |

$^{a,b}$Means with different groupings differ significantly at P ≤ 0.05.

For feed consumed of broilers fed different DFMs, no considerable differences were observed.

TABLE 24

Feed conversion ratio of male broilers fed different DFMs.

| TRT | STARTER | GROWER | FINISHER | FINISHER II |
|---|---|---|---|---|
| A | 1.313 ± 0.012 | 1.538 ± 0.013 | 2.010 ± $0.050^{ab}$ | 2.998 ± 0.230 |
| B | | 1.540 ± 0.014 | 1.949 ± $0.047^{ab}$ | 3.121 ± 0.240 |
| C | | | 1.963 ± $0.049^{ab}$ | 2.860 ± 0.252 |
| D | 1.316 ± 0.008 | 1.544 ± 0.009 | 1.911 ± $0.036^{b}$ | 2.736 ± 0.103 |
| E | 1.320 ± 0.013 | 1.529 ± 0.016 | 2.026 ± $0.033^{a}$ | 3.100 ± 0.222 |
| F | 1.292 ± 0.015 | 1.555 ± 0.009 | 1.927 ± $0.049^{ab}$ | 2.643 ± 0.137 |
| Pooled SEM | 0.006 | 0.005 | 0.019 | 0.090 |
| Pooled CV | 3.3 | 2.6 | 7.0 | 21.0 |

$^{a,b}$Means with different groupings differ significantly at P ≤ 0.05.

For FCR of broilers fed different DFMs, no significant differences were observed during the starter, grower, and finisher II.

Inclusion of the DFM at 7.35×$10^4$ in treatment D during the finisher phase significantly reduced FCR when compared to treatment E with all other treatments being intermediate.

TABLE 25

Cumulative feed conversion ratio of male broilers fed different DFMs.

| TRT | TREATMENT | DAY 0-28 | DAY 0-42 | DAY 0-48 |
|---|---|---|---|---|
| A | Control | 1.480 ± $0.008^{a}$ | 1.737 ± $0.019^{a}$ | 1.864 ± 0.017 |
| B | C + 7.35 × $10^4$ MDGDFM starter only | 1.457 ± $0.009^{b}$ | 1.699 ± $0.021^{ab}$ | 1.833 ± 0.016 |
| C | C + 7.35 × $10^4$ MDGDFM starter and grower only | | 1.716 ± $0.022^{ab}$ | 1.832 ± 0.018 |
| D | C + 7.35 × $10^4$ MDGDFM continuously | 1.477 ± $0.006^{ab}$ | 1.697 ± $0.014^{b}$ | 1.821 ± 0.014 |
| E | C + 5.50 × $10^4$ MDGDFM continuously | 1.477 ± $0.010^{ab}$ | 1.739 ± $0.015^{a}$ | 1.867 ± 0.008 |
| F | C + 7.35 × $10^4$ MDGDFM-v2 continuously | 1.487 ± $0.007^{a}$ | 1.707 ± $0.016^{ab}$ | 1.823 ± 0.015 |
| | Pooled SEM | 0.004 | 0.006 | 0.008 |
| | Pooled CV | 2.1 | 2.8 | 3.0 |

$^{a,b}$Means with different groupings differ significantly at P ≤ 0.05.

TABLE 26

Uniformity of male broilers (Coefficient of Variation) fed different DFMs.

| TRT | DAY 14 | DAY 28 | DAY 42 | DAY 48 |
|---|---|---|---|---|
| A | 9.83 ± 0.52 | 3.52 ± 0.37 | 9.11 ± 0.49 | 10.15 ± 0.55$^{ab}$ |
| B | | 9.20 ± 0.33 | 9.19 ± 0.42 | 9.51 ± 0.65$^{ab}$ |
| C | | | 9.24 ± 0.34 | 9.87 ± 0.68$^{ab}$ |
| D | 10.15 ± 0.20 | 10.29 ± 0.56 | 8.54 ± 0.42 | 9.25 ± 0.57$^{ab}$ |
| E | 10.61 ± 0.32 | 9.96 ± 0.39 | 8.98 ± 0.52 | 10.43 ± 0.71$^{a}$ |
| F | 9.98 ± 0.47 | 9.89 ± 0.38 | 8.47 ± 0.48 | 8.83 ± 0.35$^{b}$ |
| Pooled SEM | 0.16 | 0.23 | 0.18 | 0.26 |
| Pooled CV | 12.3 | 17.2 | 15.6 | 18.7 |

$^{a,b}$Means with different groupings differ significantly at P < 0.05.

For uniformity of broilers fed different DFMs on D14, D28, and D42, no significant differences were observed.

Uniformity of broilers fed different DFMs on D48, treatment E had a significantly higher uniformity when compared to treatment F with all other diets being intermediate.

TABLE 27

Litter pH and ammonium ion concentration collected on day 44 from broilers fed different DFMs. Parameters were determined by dilution of 12 g of litter material into 60 mL of distilled water. Duplicate samples were measured for each replicate pen.

| TRT | TREATMENT | pH | Ammonium Ion (mg/L) |
|---|---|---|---|
| A | Control | 8.73 ± 0.08$^{ab}$ | 125.5 ± 5.8 |
| B | C + 7.35 × 10$^4$ MDGDFM starter only | 8.83 ± 0.08$^{ab}$ | 112.8 ± 10.0 |
| C | C + 7.35 × 10$^4$ MDGDFM starter and grower only | 8.64 ± 0.08$^{b}$ | 126.7 ± 6.5 |
| D | C + 7.35 × 10$^4$ MDGDFM continuously | 8.78 ± 0.07$^{ab}$ | 120.5 ± 8.3 |
| E | C + 5.50 × 10$^4$ MDGDFM continuously | 8.82 ± 0.04$^{ab}$ | 111.1 ± 8.4 |
| F | C + 7.35 × 10$^4$ MDGDFM-V2 continuously | 8.86 ± 0.05$^{a}$ | 113.7 ± 8.0 |
| | Pooled SEM | 0.16 | 0.23 |
| | Pooled CV | 2.6 | 19.3 |

$^{a,b}$Means with different groupings differ significantly at P ≤ 0.05.

For Litter pH, treatment C had a significantly lower pH when compared to treatment F with all other diets being intermediate.

Ammonium ion concentration resulted in no significant differences being observed.

TABLE 28

Processing weights (g) of male broilers fed different DFMs.

| TRT | TREATMENT | Live Wt | WOG Wt | Fat Pad Wt | Filet Wt |
|---|---|---|---|---|---|
| A | Control | 3143 ± 46$^{d}$ | 2485 ± 35$^{d}$ | 61.9 ± 2.6 | 615.2 ± 12.8$^{b}$ |
| B | C + 7.35 × 10$^4$ MDGDFM starter only | 3303 ± 44$^{abc}$ | 2594 ± 32$^{abc}$ | 59.9 ± 2.4 | 648.0 ± 11.5$^{ab}$ |
| C | C + 7.35 × 10$^4$ MDGDFM starter and grower | 3289 ± 39$^{bc}$ | 2572 ± 31$^{bcd}$ | 62.4 ± 2.3 | 637.9 ± 12.0$^{b}$ |
| D | C + 7.35 × 10$^4$ MDGDFM continuously | 3418 ± 44$^{a}$ | 2682 ± 35$^{a}$ | 67.7 ± 2.3 | 676.5 ± 11.9$^{a}$ |
| E | C + 5.50 × 10$^4$ MDGDFM continuously | 3213 ± 43$^{cd}$ | 2537 ± 33$^{cd}$ | 64.4 ± 2.4 | 630.8 ± 11.7$^{b}$ |
| F | C + 7.35 × 10$^4$ MDGDFM-v2 continuously | 3378 ± 47$^{ab}$ | 2650 ± 36$^{ab}$ | 66.9 ± 2.2 | 680.5 ± 13.2$^{a}$ |
| | Pooled SEM | 18 | 14 | 1.0 | 5.1 |
| | Pooled CV | 10.4 | 10.2 | 2.8 | 14.5 |

$^{a,b,c}$Means with different groupings differ significantly at P ≤ 0.05.

For processing weights of broilers fed different DFMs, treatment D had the highest average live weight. Treatments B, C, and F were significantly higher than the control. Treatment E was not different form the control.

For WOG weights, treatments B, D, and F were significantly higher than the control with treatment D being the largest. Treatment C and E were greater than the control but not at a significant level.

For fat pad weights, no significant differences were observed.

For filet weights (breast meat weights), treatments D and F were significantly higher when compared to the control, treatment C, and E with all other treatments being intermediate.

TABLE 29

Processing yield (%) of male broilers fed different DFMs

| TRT | TREATMENT | WOG Yield | Fat Pad Yield | Filet Yield |
|---|---|---|---|---|
| A | Control | 79.11 ± 0.32 | 2.50 ± 0.11 | 24.66 ± 0.24[b] |
| B | C + 7.35 × 10$^4$ MDGDFM starter only | 78.63 ± 0.26 | 2.32 ± 0.09 | 24.92 ± 0.22[ab] |
| C | C + 7.35 × 10$^4$ MDGDFM starter and grower | 78.22 ± 0.25 | 2.42 ± 0.08 | 24.74 ± 0.27[b] |
| D | C + 7.35 × 10$^4$ MDGDFM continuously | 78.49 ± 0.30 | 2.52 ± 0.08 | 25.18 ± 0.22[ab] |
| E | C + 5.50 × 10$^4$ MDGDFM continuously | 78.98 ± 0.24 | 2.54 ± 0.09 | 24.80 ± 0.23[b] |
| F | C + 7.35 × 10$^4$ MDGDFM-v2 continuously | 78.47 ± 0.25 | 2.51 ± 0.07 | 25.60 ± 0.26[a] |
| | Pooled SEM | 0.11 | 0.04 | 0.10 |
| | Pooled CV | 2.6 | 26.3 | 7.2 |

[a,b]Means with different groupings differ significantly at P ≤ 0.05.

For processing yield of broilers fed different DFMs, no differences were observed between treatment groups on WOG and fat pad yield.

For filet yield (breast meat yield), treatment F was significantly higher when compared to the control, treatment C and E with all other treatment groups being intermediate.

TABLE 30

Mortality rate (%) of male broilers fed different DFMs.

| TRT | DAY 0-14 | DAY 15-28 | DAY 29-42 | DAY 43-48 | DAY 0-48 |
|---|---|---|---|---|---|
| A | 3.43 ± 1.40 | 1.22 ± 0.69 | 0.60 ± 0.40 | 0.94 ± 0.48[b] | 6.19 ± 2.02 |
| B | | 0.00 ± 0.0 | 2.05 ± 0.62 | 0.60 ± 0.40[b] | 4.49 ± 1.05 |
| C | | | 1.82 ± 0.69 | 0.89 ± 0.63[b] | 7.23 ± 1.48 |
| D | 2.34 ± 0.43 | 1.34 ± 0.40 | 1.80 ± 0.79 | 1.51 ± 0.50[ab] | 8.27 ± 1.61 |
| E | 2.00 ± 0.63 | 1.18 ± 0.78 | 2.98 ± 1.00 | 1.51 ± 0.67[ab] | 7.83 ± 1.93 |
| F | 1.40 ± 0.64 | 2.81 ± 2.49 | 0.62 ± 0.41 | 3.09 ± 0.63[a] | 8.04 ± 2.92 |
| Pooled SEM | 0.35 | 0.46 | 0.29 | 0.24 | 0.77 |

[a,b]Means with different groupings differ significantly at P ≤ 0.05.

For mortality rate of broilers fed different DFMs, no significant differences were observed on days 0-14, 15-28, 29-42, and 0-48.

For days 43-48, treatment F had a significantly higher mortality rate when compared to the control, treatment B and C with all other treatments being intermediate.

In conclusion for the experiments in this investigation, the addition of DFMs to broiler diets in this study improved overall broiler performance and processing parameters in some capacity, particularly at the inclusion level of 7.35×10$^4$ continuously throughout the trial. Significant differences in performance parameters occurred in later phases of the trial with no differences being observed in the starter phase.

Example 15

Growth Performance Effects of a Direct-Fed Microbial (86/300) in the Diets of Broiler Chickens The object of the instant example was to compare the performance in a 35 day floor pen trial broilers fed with and without 86/300 DFM (80% strain 86 and 20% strain 300) to compare broiler performance to those fed the antibiotic growth promotant (AGP) program of bacitracin MD (BMD) shuttled to virginiamycin (VM) and to those not receiving any supplements.

The feed supplements tested were as follows: 86/300 DFM test material with 80% strain 86 and 20% strain 300 DFM strains was provided by Microbial Discovery Group (Franklin, WI). BMD (bacitracin methylene disalicylate). VM (virginiamycin).

For this investigation, a total of 56 pens were utilized, with an initial group size of 30 birds per pen. The experiment was conducted in a building which is a wood and cinder block structure with a metal roof and clay floor. Each study pen contained 1 water fountain and a 75 lb. capacity feed tube. The dimensions of the pens were 4'×5' which provided a stocking density of 0.67 ft$^2$ per bird when there were 30 birds per pen. Each pen had a polymer slatted floor covered with a 3 mil thick plastic sheet topped with approximately 3 inches of new wood shavings at Day 0. On Day 7, each pen was top dressed with 4 pounds of previously used broiler from a flock having no disease issues or exposure to direct fed microbials. Continuous lighting was provided.

All pens were checked at least daily during the study. Observations included availability of feed and water, and brooder control for maintaining desired temperatures.

Approximately 2520 hatch straight-run broiler chickens (Cobb 500 genetics) were evaluated. The initial age of the chickens at Day 0 was one day.

Diets: A 2 phase custom broiler diet program of which all were formulated to be consistent with current industry specifications was used and are located in Appendix A.

Study Design: There were 4 treatment groups with each group replicated 14 times for a total of 56 pens (30 chicks/pen at placement) as shown in Table 31. Salinomycin 60 g/ton was present in all starter and grower feeds.

TABLE 31

Study Design

| Group No. | Treatment | Pen Numbers | | | | | | |
|---|---|---|---|---|---|---|---|---|
| 1 | BMD in Starter/VM in Grower | 3 | 10 | 15 | 19 | 25 | 32 | 37 |
| | | 46 | 51 | 57 | 66 | 68 | 77 | 79 |
| 2 | nCON | 4 | 11 | 17 | 22 | 29 | 34 | 41 |
| | | 47 | 54 | 59 | 61 | 70 | 76 | 80 |

TABLE 31-continued

Study Design

| Group No. | Treatment | Pen Numbers | | | | | | |
|---|---|---|---|---|---|---|---|---|
| 3 | 86/300 Continuously | 6 | 7 | 13 | 24 | 26 | 33 | 40 |
| | | 43 | 62 | 60 | 62 | 72 | 78 | 83 |
| 4 | 86/300 Starter Only | 2 | 9 | 14 | 23 | 30 | 31 | 42 |
| | | 48 | 49 | 55 | 65 | 69 | 73 | 82 |

1. BMD in Starter/VM in Grower - Positive control with BMD (50 g/ton d 1-28) and virginiamycin (20 g/ton d 29-35).
2. nCON—Negative control w/o feed-grade antibiotic addition.
3. 86/300 Continuously - Same as Group 2 + 7.35 × 10$^4$ CFU/g 86/300 DFM continuously.
4. 86/300 Starter Only - Same as Group 2 + 7.35 × 10$^4$ CFU/g 86/300 DFM in starter (d 1~14) only.

Animal Placement: On the first day of the trial, 10 stacks of 3 hatchery crates containing at least 100 chicks in each crate were set on a row of tables. Thirty (30) chicks from each of the 10 stacks were placed into a transport crate, those 30 chicks were group weighed and then placed into the pen 1. This was repeated for all 56 pens. Remaining chicks were used to replace any unthrifty or lame chicks found during days 1 through 7.

Data Collected: Pen body weights and feed weights (for feed conversions) at Days 0, 14, 28 and 35. At Day 35 all birds were individually weighed and each bird's gender determined by phenotype. All deaths and removed birds (mortality) were documented. No feeds were removed from pens until Day 35 to ensure all pens received the same plane of nutrition throughout the study. Each response variable was evaluated by One-Way ANOVA and means separated by Tukey HSD Test (Statistix 10, Analytical Software, Tallahassee, FL).

Live Bird Weights: All birds were weighed by pen at Days 14 (by pen), 28 (by pen), and 35 (by gender, by pen) as shown in Table 32.

TABLE 32

| | Live Bird Weights (lb) | | | | |
|---|---|---|---|---|---|
| | D 14 WT/BIRD | D 28 WT/BIRD | D 35 WT/BIRD[1] | D 35 WT/MALE[1] | D 35 WT/FEMALE[1] |
| BMD in Starter/VM in Grower | 1.013$^b$ | 3.061$^{abc}$ | 4.318$^a$ | 4.582$^a$ | 4.146$^a$ |
| nCON | 0.938$^c$ | 2.986$^c$ | 4.111$^c$ | 4.253$^c$ | 3.979$^b$ |
| 86/300 Continuously | 1.044$^{ab}$ | 3.099$^{abc}$ | 4.255$^{ab}$ | 4.540$^{ab}$ | 4.109$^a$ |
| 86/300 Starter Only | 1.046$^a$ | 3.116$^{ab}$ | 4.282$^a$ | 4.491$^{ab}$ | 4.171$^a$ |

NOTE:
Column data having different superscripts are different (p ≤ 0.05). 1. Individual D 35 body weights by pen and gender for a pen within a treatment group were used for statistical analysis.

DAY 14 Live Weight/Bird (lb) was heavier (p≤0.05) for BMD/VM, and 86/300 in starter or continuously, compared to nCON. The 86/300 in starter only gave heavier (p≤0.05) weight than the BMD/VM diets. The treatments containing 86/300 (starter or continuously) gave highest body weights and were in the same statistical grouping.

DAY 28 Live Weight/Bird (lb): The 86/300 in starter only gave heavier (p≤0.05) weights than nCON diets.

DAY 35 Live Weight/Bird (lb) averages for males and females combined were heavier (p≤0.05) for BMD/VM and 86/300 in starter only compared to nCON treatment, with 86/300 continuously treatment being intermediate. This same statistical pattern was evident for the male body weights. For females, diets with BMD/VM, 86/300 in starter only or continuously gave heavier (p≤0.05) broilers than nCON diets.

Feed Conversion Ratio: Feed conversion and Feed Conversion Adjusted for Mortality (Table 33) were calculated using the following equations:

Day 0-14, 0-28, or 0-35 Feed Conversion (Unadjusted)=Total Pen Feed Intake÷Total Pen Live Weight Day 0-35 Feed Conversion (Adjusted for Mortality)=Total Pen Feed Intake÷(Total Pen Live Weight+Mortality Weight)

TABLE 33

| | Feed Conversion Ratios | | | |
|---|---|---|---|---|
| TREATMENT | D 14 FD Conv | D 28 FD CONV | D 35 FD CONV | D 35 MORT ADJ FD CONV |
| BMD in Starter/VM in Grower | 1.169$^{ab}$ | 1.615$^a$ | 1.684$^{ab}$ | 1.634$^{ab}$ |
| nCON | 1.196$^a$ | 1.586$^a$ | 1.694$^{ab}$ | 1.635$^{ab}$ |
| 86/300 Continuously | 1.147$^b$ | 1.627$^a$ | 1.680$^{ab}$ | 1.644$^{ab}$ |
| 86/300 Starter Only | 1.153$^b$ | 1.612$^a$ | 1.737$^a$ | 1.709$^a$ |

NOTE:
Column data having different superscripts are different (p ≤ 0.05).

DAY 0-14 Feed Conversion Ratio (unadjusted) of 86/300 starter only or continuously was lower (p≤0.05) than nCON, with BMD/VM intermediate.

DAY 0-28 Feed Conversion Ratio (unadjusted) results were not significantly different (p>0.05).

DAY 0-35 Mortality Adjusted Feed Conversion Ratios followed the same statistical pattern as described for the unadjusted Feed Conversion Ratios.

Mortality (%): Mortality (%) results by treatment group are shown in Table 34.

TABLE 34

Mortality (%)

| TREATMENT | D 0-14 Mort | D 28 MORT (%) | D 35 MORT (%) |
|---|---|---|---|
| BMD in Starter/VM in Grower | a<br>0.00% | a<br>4.29% | A<br>6.67% |
| nCON | a<br>0.00% | a<br>5.48% | A<br>7.38% |
| 86/300 Continuously | a<br>0.00% | a<br>5.24% | A<br>5.71% |
| 86/300 Starter Only | a<br>0.00% | a<br>4.29% | A<br>5.24% |

NOTE:
Column data having different superscripts are different (p ≤ 0.05).

DAY 0-14 Mortality (%) was not significantly different (p>0.05) between treatment groups. No mortality was observed in any treatments during the first 2 weeks.

DAY 0-28 Mortality (%) was not significantly different (p>0.05) between treatment groups. Overall average mortality % from 0-28 days was 4.73%.

DAY 0-35 Mortality (%) was not significantly different (p>0.05) between treatment groups. Overall average mortality % from 0-28 days was 5.95%.

Carcass and Breast Yields (% Live Weight): Results for carcass yield and breast yield as a % of live weight by gender and by sexes combined are shown in Table 35 and Table 36, which shows combined average weights and percent yields.

As a side point, all broilers for processing were carefully observed for breast blisters. Only one of the birds processed was found with blisters (a female from the 86/300 Starter Only group) while all other broilers' breasts were found to be without blemishes.

TABLE 35

Carcass and Breast Yields (% Live Weight)

| TREATMENT | Average Carcass Yield | Male Carcass Yield | Female Carcass Yield | Average Breast Yield | Male Breast Yield | Female Breast Yield |
|---|---|---|---|---|---|---|
| BMD in Starter/VM in Grower | a<br>78.02% | a<br>78.24% | a<br>77.81% | ab<br>27.16% | a<br>27.52% | a<br>26.80% |
| nCON | b<br>76.77% | a<br>77.73% | b<br>75.81% | b<br>26.93% | a<br>27.32% | a<br>26.55% |
| 86/300 Continuously | ab<br>77.42% | a<br>78.13% | ab<br>76.71% | a<br>28.18% | a<br>28.53% | a<br>27.82% |
| 86/300 Starter Only | ab<br>77.71% | a<br>78.02% | ab<br>77.39% | ab<br>28.10% | a<br>28.55% | a<br>27.65% |

NOTE:
Column data having different superscripts are different (p ≤ 0.05).

TABLE 36

Combined Average Carcass and Breast Yields

| Treatment | Live wt (g) | Carcass wt (g) | Breast wt (g) | Carcass yield (%) | Breast yield (%) |
|---|---|---|---|---|---|
| BMD in Starter/VM in Grower | 1,891 | 1,477 | 515 | 78.02% | 27.16% |
| nCON | 1,844 | 1,418 | 498 | 76.77% | 26.93% |
| 86/300 Continuously | 1,926 | 1,493 | 544 | 77.42% | 28.18% |
| 86/300 Starter Only | 1,952 | 1,518 | 549 | 77.71% | 28.10% |

Carcass Yield (% Live Weight) was significantly (p≤0.05) greater for BMD/VM fed broilers than for nCON broilers, with other treatment values being intermediate. Female carcass yield results were statistically similar to combined sexes results. There were no significant differences between treatments for male carcass yield (p>0.05).

Breast Yields (% Live Weight) average for combined sexes was significantly greater (p≤0.05) for birds in the 86/300 continuously treatment group than for nCON birds, with other groups intermediate. By individual sexes, no significant differences (p>0.05) were detected in breast yield.

In conclusion for the experiments in this 35-day pen trial with 4 treatments and 14 replicate pens (with 30 chicks/pens), the DFM supplemented groups 86/300 in starter only or continuously gave final body weights statistically equivalent to BMD/VM and greater (p≤0.05) than nCON group. Therefore, BMD/VM or 86/300 (either in starter or all phases) broilers had the most improved 35-day body weight of broiler chickens on this study. No significant treatment effects on mortality (%) were found. Diets supplemented with BMD/VM had greater (p≤0.05) carcass yield as a % of live weight than nCON diets, with other experimental diets being intermediate. For combined sexes, breast yield as a % of live weight was greater (p≤0.05) for DFM product 86/300 continuously than for nCON, with other treatment results being intermediate.

Example 15, Appendix A: Feed Formulas

| | Broiler Starter (0-21 Days) | | | | |
|---|---|---|---|---|---|
| INGREDIENT | PERCENT | WEIGHT | COST | MIN | MAX |
| Corn, Yel 7.5% | 59.588 | 1191.77 | 164.29 | | |
| Soy Meal 47.9% | 26.250 | 525.00 | 600.00 | | |
| Meat&Bone 50% | 5.000 | 100.00 | 550.00 | 5.00 | 5.00 |
| Corn DDGS 26% | 5.000 | 100.00 | 243.00 | 5.00 | 5.00 |
| Soybean Oil | 1.895 | 37.90 | 780.00 | | |
| Limestone Fine | 0.654 | 13.07 | 50.86 | | |
| Dical 21/18.5% | 0.328 | 6.56 | 685.00 | | |
| Salt | 0.249 | 4.98 | 145.00 | | 0.50 |
| Choline Cl 60% | 0.080 | 1.60 | 1240.00 | 0.08 | 0.08 |
| VDRp VitPremix | 0.040 | 0.80 | 3700.00 | 0.04 | 0.04 |
| Sodium Bicarb | 0.250 | 5.00 | 320.00 | 0.25 | 0.25 |
| VDRp TraMin Px | 0.085 | 1.70 | 1750.00 | 0.09 | 0.09 |
| L-Lysine HCl | 0.245 | 4.91 | 2220.00 | | 0.25 |
| DL-Meth 99% | 0.264 | 5.28 | 3954.00 | | 0.35 |
| L-Threonine98% | 0.054 | 1.07 | 2340.00 | | 0.10 |
| RonozymeP5000 | 0.018 | 0.36 | 1500.00 | 0.02 | 0.02 |
| TOTALS | 100.000 | 2000.00 | 334.93 | 10.47 | |

-continued

| NO | NUTRIENT | UNITS | MIN | ACT | MAX |
|---|---|---|---|---|---|
| 1 | WEIGHT | LBS | 100.000 | 2000.000* | 100.000 |
| 2 | CR PROTEIN | PCT | 21.300 | 21.300* | |
| 3 | CR FAT | PCT | | 5.397 | |
| 4 | CR FIBER | PCT | | 2.939 | |
| 6 | POULME | KCAL/LB | 1400.000 | 1399.999* | |
| 7 | DIG ARGIN | PCT | 1.202 | 1.273 | |
| 8 | DIG LYSINE | PCT | 1.160 | 1.160* | |
| 9 | DIG METH | PCT | 0.511 | 0.578 | |
| 10 | DIG METCYS | PCT | 0.861 | 0.861* | |
| 11 | DIG HISTID | PCT | | 0.507 | |
| 12 | DIG LEUCIN | PCT | 1.233 | 1.633 | |
| 13 | DIG ISOLEU | PCT | 0.800 | 0.826 | |
| 14 | DIG THREON | PCT | 0.756 | 0.756* | |
| 15 | DIG VALINE | PCT | 0.928 | 0.948 | |
| 16 | ARGININE | PCT | | 1.422 | |
| 17 | LYSINE | PCT | | 1.308 | |
| 18 | METHIONINE | PCT | | 0.609 | |
| 19 | MET&CYS | PCT | | 0.961 | |
| 20 | TRYPTOPHAN | PCT | | 0.241 | |
| 21 | GLYCINE | PCT | | 1.124 | |
| 22 | HISTIDINE | PCT | | 0.549 | |
| 23 | LEUCINE | PCT | | 1.875 | |
| 24 | ISOLEUCINE | PCT | | 0.916 | |
| 25 | PHENYLALAN | PCT | | 1.015 | |
| 26 | PHE&TYR | PCT | | 1.730 | |
| 27 | THREONINE | PCT | | 0.870 | |
| 28 | VALINE | PCT | | 1.064 | |
| 29 | GLY&SER | PCT | | 2.212 | |
| 30 | ASH | PCT | | 4.838 | |
| 32 | CALCIUM | PCT | 0.850 | 0.850* | 0.850 |
| 33 | PHOS-TOTAL | PCT | | 0.631 | |
| 34 | PHOS-AVAIL | PCT | 0.420 | 0.420* | 0.420 |
| 35 | POTASSIUM | PCT | | 0.819 | |
| 36 | SODIUM | PCT | 0.230 | 0.230* | 0.230 |
| 37 | CHLORIDE | PCT | 0.230 | 0.306 | |
| 38 | MAGNESIUM | PCT | | 0.169 | |
| 39 | IRON | PPM | | 160.152 | |
| 40 | ZINC | PPM | | 97.533 | |
| 41 | MANGANESE | PPM | | 107.421 | |
| 42 | COPPER | PPM | | 14.584 | |
| 43 | ADDED Se | PPM | | 0.300 | |
| 44 | IODINE | PPM | | 1.709 | |
| 45 | LINOLEIC | PCT | | 2.665 | |
| 46 | XANTHO | MG/LB | | 4.805 | |
| 47 | SULFUR | PCT | | 0.265 | |
| 48 | VIT A | KIU/LB | | 4.000 | |
| 49 | VIT E | IU/LB | | 16.000 | |
| 50 | VIT B12 | MCG/LB | | 6.000 | |
| 51 | RIBOFLAV | MG/LB | | 3.600 | |
| 52 | PANTO AC | MG/LB | | 7.200 | |
| 53 | NIACIN | MG/LB | | 32.000 | |
| 54 | CHOLINE | MG/LB | | 712.033 | |
| 55 | FOLIC AC | MG/LB | | 0.880 | |
| 56 | PYRIDOXN | MG/LB | | 1.880 | |
| 57 | THIAMINE | MG/LB | | 1.200 | |
| 58 | BIOTIN | MG/LB | | 0.080 | |
| 59 | VIT D3 | KIU/LB | | 1.800 | |
| 60 | MENADION | MG/LB | | 0.800 | |
| 81 | DIG TRYPT | PCT | 0.204 | 0.206 | |
| 82 | DIG CRPROT | PCT | | 18.429 | |

Broiler Grower (21-35 Days)

| INGREDIENT | PERCENT | WEIGHT | COST | MIN | MAX |
|---|---|---|---|---|---|
| Corn, Yel 7.5% | 63.372 | 1267.44 | 164.29 | | |
| Soy Meal 47.9% | 22.038 | 440.75 | 600.00 | | |
| Meat&Bone 50% | 5.000 | 100.00 | 550.00 | 5.00 | 5.00 |
| Corn DDGS 26% | 5.000 | 100.00 | 243.00 | 5.00 | 5.00 |
| Soybean Oil | 2.583 | 51.65 | 780.00 | | |
| Limestone Fine | 0.588 | 11.76 | 50.86 | | |
| Dical 21/18.5% | 0.251 | 5.03 | 685.00 | | |
| Salt | 0.224 | 4.47 | 145.00 | | 0.50 |
| Choline Cl 60% | 0.080 | 1.60 | 1240.00 | 0.08 | 0.08 |
| VDRp VitPremix | 0.040 | 0.80 | 3700.00 | 0.04 | 0.04 |
| Sodium Bicarb | 0.250 | 5.00 | 320.00 | 0.25 | 0.25 |
| VDRp TraMin Px | 0.085 | 1.70 | 1750.00 | 0.09 | 0.09 |
| L-Lysine HCl | 0.216 | 4.33 | 2220.00 | | 0.25 |
| DL-Meth 99% | 0.227 | 4.53 | 3954.00 | | 0.35 |
| L-Threonine98% | 0.028 | 0.57 | 2340.00 | | 0.10 |
| RonozymeP5000 | 0.018 | 0.36 | 1500.00 | 0.02 | 0.02 |
| TOTALS | 100.000 | 2000.00 | 317.95 | 10.47 | |

| NO | NUTRIENT | UNITS | MIN | ACT | MAX |
|---|---|---|---|---|---|
| 1 | WEIGHT | LBS | 100.000 | 2000.000* | 100.000 |
| 2 | CR PROTEIN | PCT | 19.500 | 19.500* | |
| 3 | CR FAT | PCT | | 6.184 | |
| 4 | CR FIBER | PCT | | 2.858 | |
| 6 | POULME | KCAL/LB | 1435.000 | 1434.998* | |
| 7 | DIG ARGIN | PCT | 1.110 | 1.147 | |
| 8 | DIG LYSINE | PCT | 1.032 | 1.032* | |
| 9 | DIG METH | PCT | 0.498 | 0.521 | |
| 10 | DIG METCYS | PCT | 0.785 | 0.785* | |
| 11 | DIG HISTID | PCT | | 0.466 | |
| 12 | DIG LEUCIN | PCT | 1.104 | 1.524 | |
| 13 | DIG ISOLEU | PCT | 0.732 | 0.744 | |
| 14 | DIG THREON | PCT | 0.670 | 0.670* | |
| 15 | DIG VALINE | PCT | 0.826 | 0.866 | |
| 16 | ARGININE | PCT | | 1.288 | |
| 17 | LYSINE | PCT | | 1.163 | |
| 18 | METHIONINE | PCT | | 0.549 | |
| 19 | MET&CYS | PCT | | 0.875 | |
| 20 | TRYPTOPHAN | PCT | | 0.216 | |
| 21 | GLYCINE | PCT | | 1.045 | |
| 22 | HISTIDINE | PCT | | 0.503 | |
| 23 | LEUCINE | PCT | | 1.754 | |
| 24 | ISOLEUCINE | PCT | | 0.827 | |
| 25 | PHENYLALAN | PCT | | 0.929 | |
| 26 | PHE&TYR | PCT | | 1.581 | |
| 27 | THREONINE | PCT | | 0.775 | |
| 28 | VALINE | PCT | | 0.974 | |
| 29 | GLY&SER | PCT | | 2.039 | |
| 30 | ASH | PCT | | 4.501 | |
| 32 | CALCIUM | PCT | 0.800 | 0.800* | 0.800 |
| 33 | PHOS-TOTAL | PCT | | 0.599 | |
| 34 | PHOS-AVAIL | PCT | 0.400 | 0.400* | 0.400 |
| 35 | POTASSIUM | PCT | | 0.747 | |
| 36 | SODIUM | PCT | 0.220 | 0.220* | 0.220 |
| 37 | CHLORIDE | PCT | 0.220 | 0.291 | |
| 38 | MAGNESIUM | PCT | | 0.161 | |
| 39 | IRON | PPM | | 145.383 | |
| 40 | ZINC | PPM | | 95.917 | |
| 41 | MANGANESE | PPM | | 105.605 | |
| 42 | COPPER | PPM | | 13.785 | |
| 43 | ADDED Se | PPM | | 0.300 | |
| 44 | IODINE | PPM | | 1.704 | |
| 45 | LINOLEIC | PCT | | 3.068 | |
| 46 | XANTHO | MG/LB | | 5.090 | |
| 47 | SULFUR | PCT | | 0.242 | |
| 48 | VIT A | KIU/LB | | 4.000 | |
| 49 | VIT E | IU/LB | | 16.000 | |
| 50 | VIT B12 | MCG/LB | | 6.000 | |
| 51 | RIBOFLAV | MG/LB | | 3.600 | |
| 52 | PANTO AC | MG/LB | | 7.200 | |
| 53 | NIACIN | MG/LB | | 32.000 | |
| 54 | CHOLINE | MG/LB | | 669.266 | |
| 55 | FOLIC AC | MG/LB | | 0.880 | |
| 56 | PYRIDOXN | MG/LB | | 1.880 | |
| 57 | THIAMINE | MG/LB | | 1.200 | |
| 58 | BIOTIN | MG/LB | | 0.080 | |
| 59 | VIT D3 | KIU/LB | | 1.800 | |
| 60 | MENADION | MG/LB | | 0.800 | |
| 81 | DIG TRYPT | PCT | 0.178 | 0.183 | |
| 82 | DIG CRPROT | PCT | | 16.855 | |

Example 16

Enzymatic Activity Screening

To confirm the presence of galactomannan-degrading enzymes in DFM strains via the dinitrosalicylic acid (DNS) reducing sugar assay, this example describes the use of plate media screening methods to detect enzymatic activity in DFM strains 86, 101, 290, and 300 and other related isolates.

The DNS reducing sugar assay was performed as in the manufacturer's protocol, inoculating the 0.5% guar gum solution with overnight cultures of MDG strains 86, 101, 290, and 300 grown in TSB+0.5% guar gum. The reducing sugar assay was performed with samples taken after 30 minutes and 18 hours of incubation at 37° C. Standard curves were prepared with solutions of D-mannose and D-galactose at concentrations between 1M and 1 μM to determine the relation between free reducing sugar reacted and OD 575. Negative control samples (NC) consisted of guar gum substrate inoculated with buffer only or with sterile media (TSB+guar gum).

Figure 13:
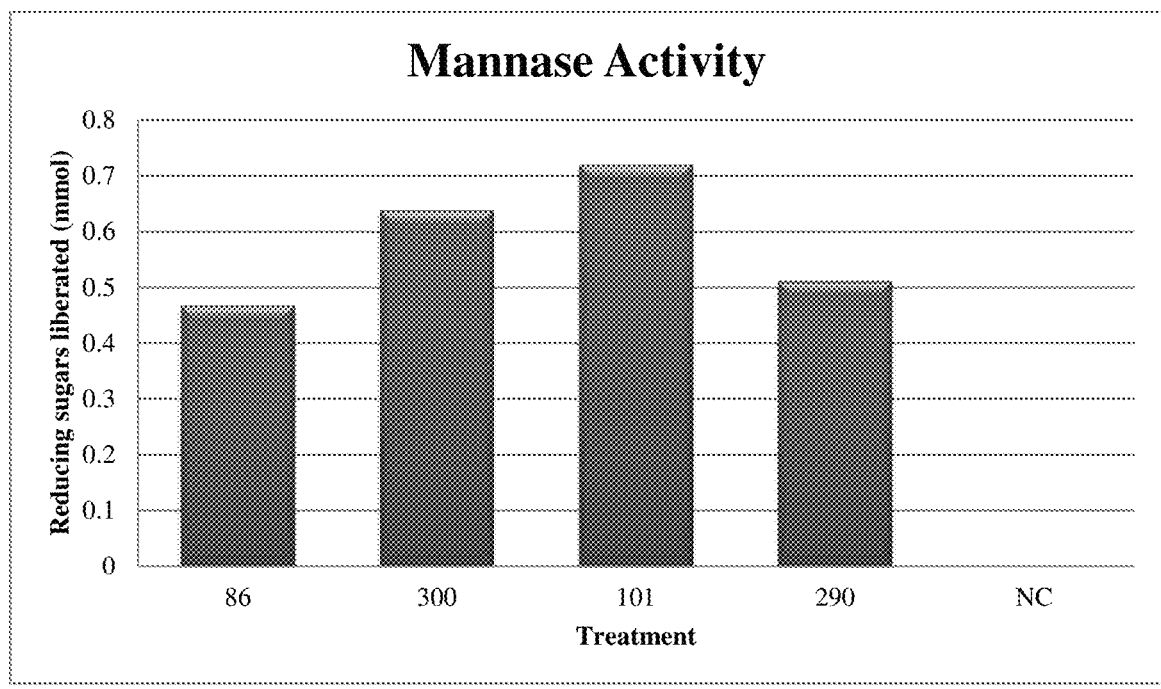
FIG. 13 shows mannanase enzymatic activity in DFM strains 86, 101, 290, and 300.

As shown in FIG. 13, *Bacillus* strains 86, 101, 290, and 300 showed mannanase activity in the range of about 0.467 mmol to about 0.720 mmol in 24 hours.

Example 17

Substrate Testing Summary

In the instant example, a comparison of DFM strains was performed to determine the variations in substrate utilization. DFM strains 86, 101, 290, and 300 were individually tested, and were tested with various strain combinations. For example, two-strain combinations included, but were not limited to, a combination of strain 1/strain 2 as follows: 86/101; 86/290; 86/300; 101/290; 101/300, and 290/300. Three-strain combinations included, but were not limited to, a combination of strain 1/strain 2/strain 3 as follows: 86/101/290; 101/290/300; 86/290/300; and 86/101/300. A combination of all four strains (i.e., 86/101/290/200) was also tested. A negative control that included no *Bacillus* was also assessed with the strains.

In particular, a substrate utilization assay was conducted to determine whether the *Bacillus* strains exhibited growth in a minimal medium with linoleic acid as the only carbon source.

Figure 14:
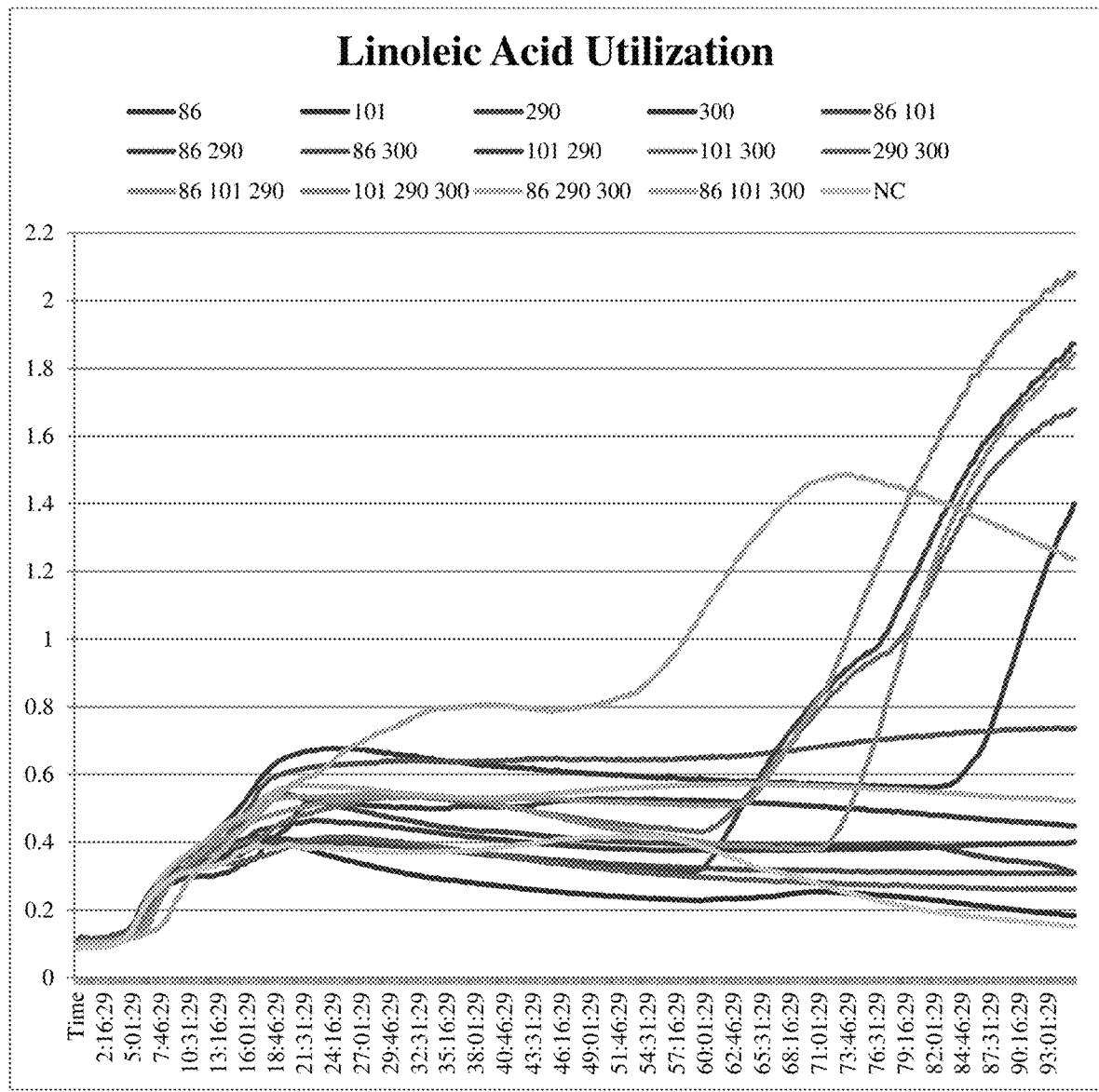
FIG. 14 shows linoleic acid utilization as the sole carbon source by DFM strains 86, 101, 290, and 300, as well as linoleic acid utilization by various combinations of those DFM strains. The strain combinations with the highest linoleic acid utilization were (top curve to bottom) 86/101/300, 86/101/290, 101/290, 86/290, 101/300, 300, and 86/300. All other combinations had similar utilization.

In performing the substrate utilization assay, each microtiter plate well contained 2 μl of linoleic acid and 200 μl of minimal medium inoculated with a respective *Bacillus* strain or strain combination. The substrate utilization test was run at 37° C. for 4 days with medium shaking. As shown in FIG. 14, The most effective strains or strain combinations for using linoleic acid as the only carbon source were: 86/300; 86/101/290; 86/101/300; 101/290; 101/290/300; 101/300; and 300.

Example 18

Genomic Analysis of DFM Strains 86 and 300

In order to obtain genomic "fingerprints" of *Bacillus* strains 86 and 300 collected in the strain library, Next Generation Sequencing analysis was performed according to the manufacturer's instructions with each *Bacillus* strain. The raw sequencing data was assembled de novo into contigs and consensus sequences. Gene prediction using the microbial genome was then followed by functional annotation of novel sequences.

Figure 15:
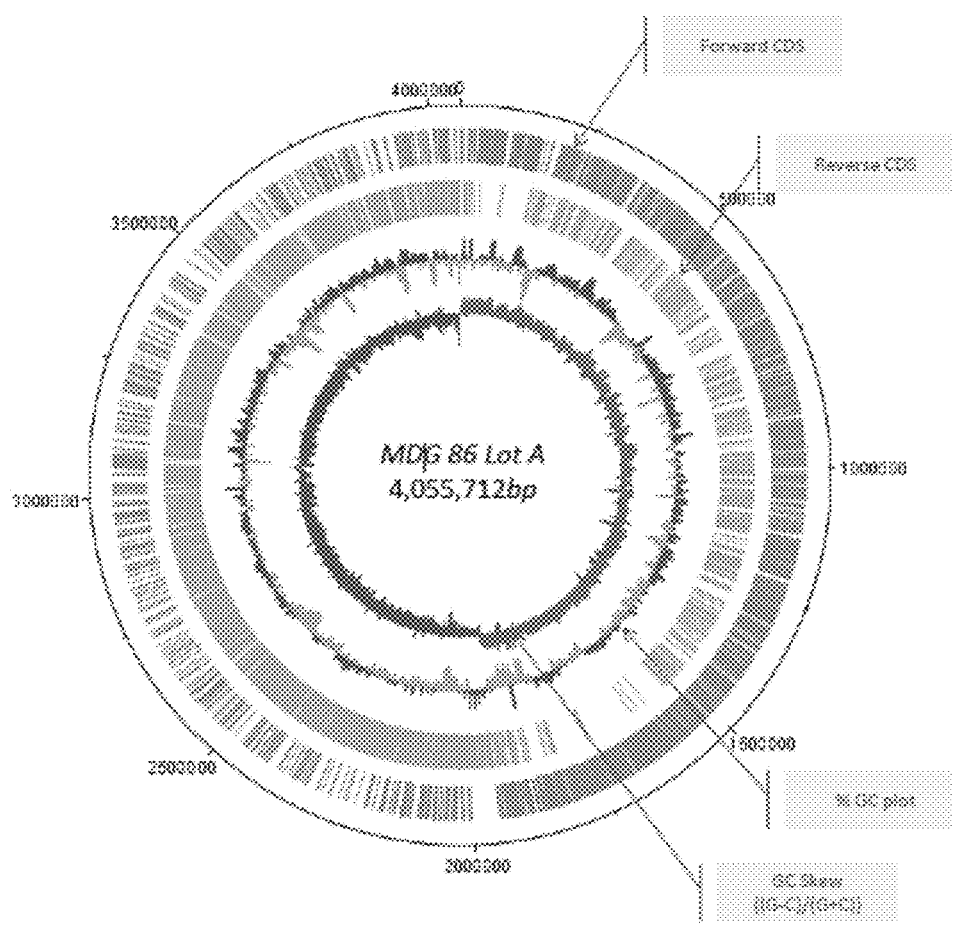
FIGS. 15 and 16 show genomic annotation of DFM strains 86 and 300, respectively.
Figure 16:
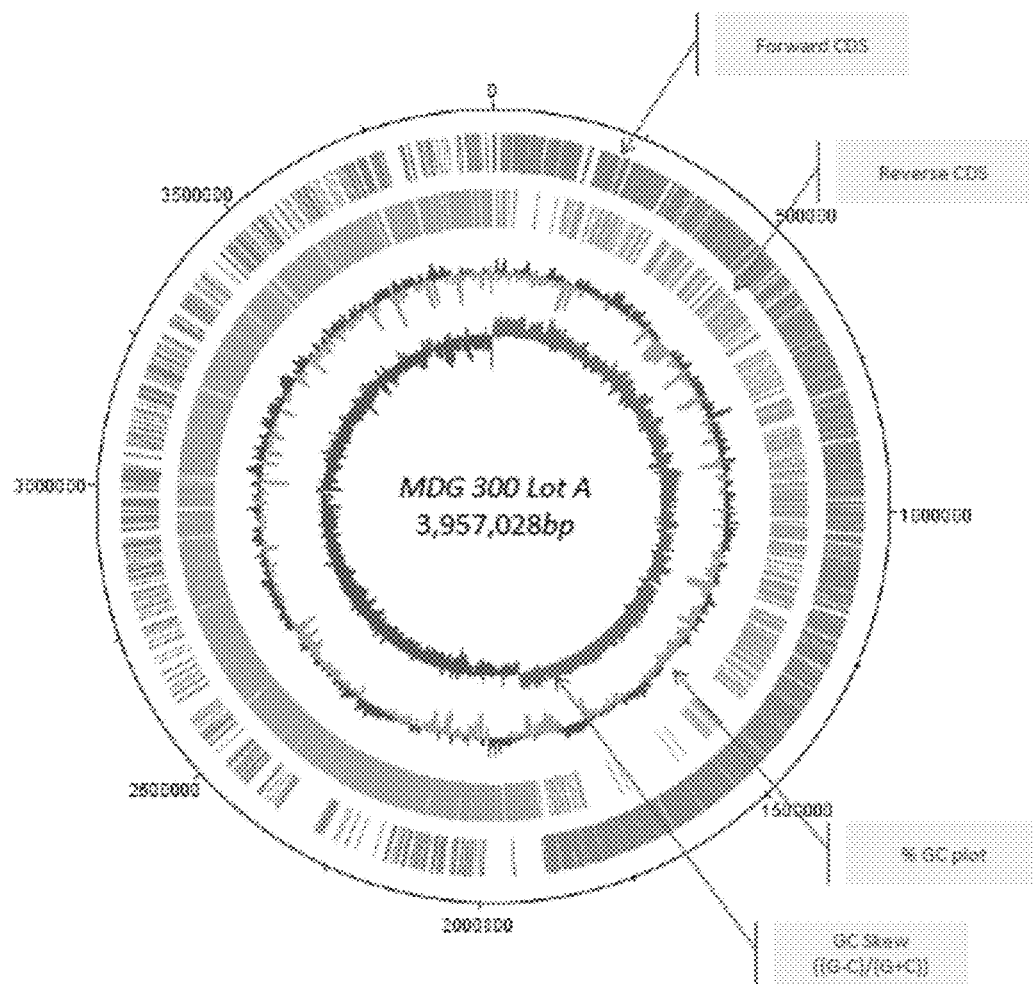

FIGS. 15 and 16 show genomic annotation of DFM strains 86 and 300, respectively. As shown in FIG. 15, strain 86 comprises approximately 4,055,712 bp (i.e., about 4056 kb) of genomic sequence. DFM strain 300 was slightly smaller comprising about 3,957,082 bp (i.e., about 3957 kb) of genomic sequence. Therefore, FIGS. 15 and 16 demonstrate that DFM Strains 86 and 300 are different strains, each having a unique DNA fingerprint.

In addition, sequencing of DFM strains 86 and 300 identified many different genes within the strains. Genes identified in strains 86 and 300 included, but were not limited to, antimicrobial genes, such as bacilysin, bacilyosin, antlisterial subtilisin, sufactin, Lantibiotic lichenidicin, streptomycin, lactococcin, polyketides, plipastatin, and macrolactin. Sequencing also identified additional genes that were incorporated into strains 86 and 300 including, but not limited to antimicrobial tolerance genes, such as bacitracin, β-lactams, penicillin, erythromycin, cephalosporin, lincomycin, tetracycline, tunicamycin, fosmidomycin, and fosmomycin. Sequencing also identified five unnamed bacteriocins, genetic redundancies within the strains, multi-drug efflux transporters, and different compounds.

Example 19

Analysis of Growth Performance of Nursery Pigs Fed Different Direct-Fed Microbial Combinations This multi-experiment test was conducted to determine the growth performance of nursery pigs fed different direct-fed microbial diet combinations. One Experiment (Experiment 1 below) was performed to assess different direct-fed microbial diet treatments on nursery pigs. Specific parameters regarding the experimental methods and details, and the statistical procedures are described below, along with the results of the experiment as shown in Table 38.

Experiment 1

1. Genetics: PIC 337×C29
2. Study Animal Start Weight: 13.9±2.3 lb
3. Replicates: 12 replicates of 23-26 mixed-sex pigs/pen (6.7 ft²/pig stocking density)
4. Feeder: 3-space dry box feeder and 2 swinging water nipples
5. Four (4) treatments
    i. Non-DFM control
    ii. As 1+0.75 lb/ton Bs 86/300 combo (80/20%) (5.5× $10^4$ CFU/g)
    iii. As 1+1 lb/ton Bs 86/300 combo (80/20%) (7.35×$10^4$ CFU/g)
    iv. As 1+1 lb/ton Bs 86/300 combo (50/50%) (7.35×$10^4$ CFU/g)
6. Corn-SBM-DDGS experimental diets fed from weaning to 6 wk postweaning (Table 37)

Experimental Procedures:

Allotment of animals to the experiment: At the start of each experiment, mixed-sex pens of pigs were sorted by weight into replicates based on body weight. Pens were then randomly allotted to dietary treatment from within replicate and immediately started on the study. Pens remained on dietary treatments until the end of the experimental period.

Daily management: Daily management followed standard operating procedures within each farm. Pigs were visually inspected daily to ensure that individual pigs were meeting the standard for body condition and criteria for the standard operating procedures of the farm. Pigs not meeting such criteria were medicated per standards of the farm and recommendations of the attending veterinarian. Any pig requiring medicinal treatment for 3 consecutive days and not showing signs of improvement was immediately removed from the experiment.

Measurements of Live performance and Morbidity Rates: Total pen weights were recorded at allotment of the experiment and at regular intervals during the experimental period.

Period feed intakes corresponded with pen weight periods. Pen weights, feed delivered, and feed-in-feeder for each pen were used to calculate ADG, ADFI, and F/G ratio. All morbidity and mortality was recorded, along with any major health issues.

Statistical Procedures: Each experiment was statistically analyzed individually. Initial data analysis was performed for all metrics to determine normality of distribution and outliers (±>3 standard deviations in difference from the grand mean) using the Univariate procedure of SAS. Body weights and cumulative growth rates, feed intakes, and feed/gain ratios were analyzed according to randomized complete-block designs using the Mixed procedure of SAS, with the main effect of diet and random effect of replicate. Serial body weights, growth rates, feed intakes, and feed/gain ratios were analyzed similarly, with week or period included as a repeated measure. Morbidity, mortality, and other health-related metrics were analyzed as nonparametric data using the NPar1 way procedure of SAS.

Results:

Experiment 1 Results (See Table 38):
1. Final body weights and growth rates were increased (P<0.05) with the supplementation of MDG Bs 86/300, with the 50/50 proportion effecting the greatest response (P<0.01; 8% compared to 3% for the 80/20 proportion).
2. Feed/gain ratios were higher (Diet, P=0.34; 1 lb/ton vs. 0.75 lb/ton, P<0.05) in the group fed the lower dose of 86/300 by 3.4%.

Conclusions: MDG Bacillus strains 86 & 300 supplemented to diets at 1 lb/ton increased ADG and reduced F/G.

TABLE 37

Animal Diets for Experiment #1.

| Ingredient | Phase 1 | Phase 2 | Phase 3 | Phase 4 |
|---|---|---|---|---|
| Corn | to 2,000 | to 2,000 | to 2,000 | to 2,000 |
| Soybean meal | 332.64 | 498.09 | 524.96 | 380.12 |
| Flex Start | 935.00 | 450.00 | 200.00 | |
| Flex Start Add Pak | 110.00 | 25.00 | | |
| DDGS | | 150.00 | 300.00 | 450.00 |

TABLE 37-continued

Animal Diets for Experiment #1.

| Ingredient | Phase 1 | Phase 2 | Phase 3 | Phase 4 |
|---|---|---|---|---|
| R&D HD190 | | 99.76 | 151.23 | 190.00 |
| Choice white grease | | | | 50.00 |
| DFM | | +/− | +/− | +/− |
| Total | 2,000 | 2,000 | 2,000 | 2,000 |
| Budget (wks fed) | 1 | 2 | 3 | 4-6 |
| Nutrient composition | | | | |
| ME, kcal/lb | 1,475 | 1,437 | 1,418 | 1,461 |
| Crude protein, % | 21.67 | 23.15 | 24.19 | 22.44 |
| Crude fat, % | 3.45 | 3.26 | 3.26 | 5.83 |
| NDF, % | 4.72 | 7.39 | 7.39 | 11.07 |
| P, bioavailable, % | 0.56 | 0.48 | 0.46 | 0.44 |
| Ca, % | 0.88 | 0.80 | 0.75 | 0.68 |
| Na, % | 0.54 | 0.40 | 0.36 | 0.35 |
| Lysine | | | | |
| Total, % | 1.49 | 1.51 | 1.53 | 1.37 |
| SID, % | 1.34 | 1.34 | 1.34 | 1.19 |
| SID, g/Mcal ME | 4.12 | 4.23 | 4.29 | 3.70 |
| AA/Lys ratios, SID, % | | | | |
| SAA | 55 | 57 | 59 | 64 |
| Thr | 64 | 69 | 73 | 80 |
| Trp | 19 | 19 | 19 | 18 |
| Ile | 54 | 60 | 63 | 62 |
| Val | 72 | 72 | 73 | 75 |

TABLE 38

Growth performance responses of nursery pigs to dietary supplementation of experimental Bacillus subtilis strain combinations at different concentrations and strain proportions Experiment #1[1].

| Dietary treatment[2,3] | Body weights (lbs) | | ADG | ADFI | F/G | Feed cost[4] | Margin[4] |
|---|---|---|---|---|---|---|---|
| | d 1 | d 41 | (lbs) | (lbs) | (lb/lb) | ($/lb gain) | ($/pig) |
| 1. Non-DFM control | 13.9 | 44.7 | 0.74 | 1.08 | 1.45 | 0.246 | 28.17 |
| 2. As 1 + 1 lb/ton 86/300 (80/20) | 13.9 | 45.2 | 0.76 | 1.09 | 1.44 | 0.245 | 28.41 |
| 3. As 1 + 0.75 lb/ton 86/300 (80/20) | 13.9 | 45.1 | 0.76 | 1.14 | 1.50 | 0.260 | 27.61 |
| 4. As 1 + 1 lb/ton 86/300 (50/50) | 13.9 | 46.7 | 0.80 | 1.15 | 1.45 | 0.247 | 29.02 |
| Pooled SEM | 0.7 | 1.9 | 0.04 | 0.06 | 0.03 | 0.004 | 1.14 |
| Levels of significance | | | | | | | |
| Dietary treatment | 0.520 | 0.028 | 0.024 | 0.038 | 0.337 | 0.019 | 0.029 |
| 86/300 (80/20) dose (trt 2 vs 3) | 0.615 | 0.946 | 0.783 | 0.055 | 0.025 | 0.001 | 0.032 |
| 86/300 strain proportion (trt 2 vs 4) | 0.336 | 0.011 | 0.008 | 0.022 | 0.668 | 0.602 | 0.097 |

[1]Data are means of 11 replicates of 23-26 mixed-sex pigs per pen fed experimental diets starting at d 1 post-weaning and continuing to the end of the experiment.
[2]Experimental diets were based on corn & SBM, and included DDGS at 0, 7.5, 15, & 22.5% in Phases 1-4, respectively. The DFM materials were added to the experimental diets at the expense of corn.
[3]The experiment was designed with a treatment where the pigs were fed 1 lb/ton of 86/300 (80/20 proportion) during the nursery period. In this table, the treatments fed the common diets have been combined, resulting in Trt 1 & 2 made up of 22 pens each, and Trt 3 & 4 made up of 11 pens each.
[4]Feed costs were calculated using common corn, soybean meal, and DDGS costs, and a cost of $3.75/treated ton for 86/300 DFM. Margin over feed was calculated as the difference between pig value ($0.80/lb live weight) and feed cost ($/pig).

What is claimed is:

1. A method of controlling detrimental environmental effects of manure, the method comprising the steps of administering to an animal a feed composition or drinking water comprising an effective amount of an additive comprising an isolated Bacillus strain selected from the group consisting of Bacillus subtilis strain 86 (NRRL No. B-50944), Bacillus subtilis strain 300 (NRRL No. B-50943), and combinations thereof, and controlling the detrimental environmental effects of the manure.

2. The method of claim 1 wherein the strain administered is Bacillus subtilis strain 86 (NRRL No. B-50944).

3. The method of claim 1 wherein the strain administered is *Bacillus subtilis* strain 300 (NRRL No. B-50943).

4. The method of claim 1 wherein the animal is selected from the group consisting of a poultry species, a porcine species, a bovine species, an ovine species, and an equine species.

5. The method of claim 1 wherein the *Bacillus* strain causes an effect that contributes to said control of detrimental environmental effects of manure, said effect being selected from the group consisting of reducing the pH of manure, reducing the long chain fatty acid content of manure, reducing ammonia in manure, reducing manure pit foaming, reducing explosive gases in manure, reducing ammonia volatilization, and combinations thereof.

6. The method of claim 5 wherein the reduction in ammonia in the manure reduces ammonia flashing in a barn.

7. The method of claim 5 wherein the reduction in long chain fatty acid content in the manure results in a reduction in explosive gases in the manure wherein the gases are selected from the group consisting of methane gas, hydrogen gas, phosphine gas, and combinations thereof.

8. The method of claim 5 wherein the reduction in ammonia in the manure improves nitrogen value in the manure wherein the manure is used as a fertilizer.

9. The method of claim 1 further comprising the step of administering to the animal another bacterial strain selected from the group consisting of another *Bacillus* strain, a lactic acid bacterial strain, and combinations thereof.

10. The method of claim 1 wherein said additive comprises *Bacillus subtilis* strain 86 (NRRL No. B-50944) and *Bacillus* strain 300 (NRRL No. B-50943).

11. The method of claim 1 wherein the *Bacillus* strain is administered in the feed composition at a dose of about $1.0 \times 10^3$ CFU/gram of the feed composition to about $5.0 \times 10^{12}$ CFU/gram of the feed composition.

12. The method of claim 1 wherein the *Bacillus* strain is administered in the feed composition at a dose of about $1.0 \times 10^3$ CFU/gram of the feed composition to about $1.0 \times 10^7$ CFU/gram of the feed composition.

13. The method of claim 1 wherein the *Bacillus* strain is administered in the feed composition at a dose greater than about $7.0 \times 10^4$ CFU/gram of the feed composition.

14. The method of claim 1 wherein the strain is in the form of a pellet, a gel, a freeze-dried composition or a dried powder.

15. The method of claim 1 wherein said additive further comprises a binder selected from the group consisting of clay, yeast cell wall components, aluminum silicate, glucan, and combinations thereof.

16. The method of claim 1 wherein said additive further comprises a carrier selected from the group consisting of a bran, rice hulls, a salt, a dextrin, and combinations thereof.

17. The method of claim 1 wherein said additive further comprises an enzyme selected from the group consisting of a galactosidase, a phytase, a protease, a lipase, an amylase, a hemicellulase, an arabinoxylanase, a xylanase, a cellulase, an non-starch polysaccharidease, combinations thereof.

* * * * *